US007587069B2

(12) United States Patent
Movellan et al.

(10) Patent No.: US 7,587,069 B2
(45) Date of Patent: Sep. 8, 2009

(54) WEAK HYPOTHESIS GENERATION APPARATUS AND METHOD, LEARNING APPARATUS AND METHOD, DETECTION APPARATUS AND METHOD, FACIAL EXPRESSION LEARNING APPARATUS AND METHOD, FACIAL EXPRESSION RECOGNITION APPARATUS AND METHOD, AND ROBOT APPARATUS

(75) Inventors: Javier R. Movellan, La Jolla, CA (US); Marian S. Bartlett, La Jolla, CA (US); Gwendolen C. Littlewort, La Jolla, CA (US); John Hershey, La Jolla, CA (US); Ian R. Fasel, La Jolla, CA (US); Eric C. Carlson, La Jolla, CA (US); Josh Susskind, La Jolla, CA (US); Kohtaro Sabe, Tokyo (JP); Kenta Kawamoto, Tokyo (JP); Kenichi Hidai, Tokyo (JP)

(73) Assignees: Sony Corporation, Tokyo (JP); San Diego, University of California, Oakland, CA (US)

( * ) Notice: Subject to any disclaimer, the term of this patent is extended or adjusted under 35 U.S.C. 154(b) by 0 days.

(21) Appl. No.: 12/075,080

(22) Filed: Mar. 7, 2008

(65) Prior Publication Data

US 2008/0247598 A1    Oct. 9, 2008

Related U.S. Application Data

(62) Division of application No. 10/871,494, filed on Jun. 17, 2004, now Pat. No. 7,379,568.

(60) Provisional application No. 60/490,316, filed on Jul. 24, 2003.

(51) Int. Cl.
G06K 9/00    (2006.01)

(52) U.S. Cl. .................. 382/118; 382/155; 382/224; 706/12; 706/25

(58) Field of Classification Search ................. 382/100, 382/103, 118, 155, 159, 181, 224; 706/12, 706/17, 25, 59; 375/150, 343; 702/181; 707/1

See application file for complete search history.

(56) References Cited

U.S. PATENT DOCUMENTS 5,479,575 A    12/1995    Yoda (Continued)

*Primary Examiner*—Sheela C Chawan
(74) *Attorney, Agent, or Firm*—Frommer Lawrence & Haug LLP; William S. Frommer

(57) ABSTRACT

A facial expression recognition system that uses a face detection apparatus realizing efficient learning and high-speed detection processing based on ensemble learning when detecting an area representing a detection target and that is robust against shifts of face position included in images and capable of highly accurate expression recognition, and a learning method for the system, are provided. When learning data to be used by the face detection apparatus by Adaboost, processing to select high-performance weak hypotheses from all weak hypotheses, then generate new weak hypotheses from these high-performance weak hypotheses on the basis of statistical characteristics, and select one weak hypothesis having the highest discrimination performance from these weak hypotheses, is repeated to sequentially generate a weak hypothesis, and a final hypothesis is thus acquired. In detection, using an abort threshold value that has been learned in advance, whether provided data can be obviously judged as a non-face is determined every time one weak hypothesis outputs the result of discrimination. If it can be judged so, processing is aborted. A predetermined Gabor filter is selected from the detected face image by an Adaboost technique, and a support vector for only a feature quantity extracted by the selected filter is learned, thus performing expression recognition.

8 Claims, 31 Drawing Sheets

U.S. PATENT DOCUMENTS

| | | |
|---|---|---|
| 5,819,247 A | 10/1998 | Freund et al. |
| 6,272,231 B1 * | 8/2001 | Maurer et al. ............... 382/103 |
| 6,287,765 B1 | 9/2001 | Cubicciotti |
| 6,317,700 B1 | 11/2001 | Bagne |
| 6,374,197 B1 | 4/2002 | Ganesh et al. |
| 6,876,364 B2 * | 4/2005 | Buddemeier et al. ........ 345/473 |
| 7,106,887 B2 * | 9/2006 | Kinjo ........................ 382/118 |
| 7,130,446 B2 | 10/2006 | Rui et al. |
| 7,187,786 B2 * | 3/2007 | Kee ............................ 382/118 |
| 7,203,669 B2 | 4/2007 | Lienhart et al. |
| 7,254,257 B2 * | 8/2007 | Kim et al. ................... 382/118 |
| 2004/0013286 A1 * | 1/2004 | Viola et al. ................. 382/118 |

\* cited by examiner $$I(x,y) = \sum_{x'<x, y'<y} S(x',y')$$

FILTER OUTPUT

FILTER OUTPUT anger joy surprise

WEAK HYPOTHESIS GENERATION APPARATUS AND METHOD, LEARNING APPARATUS AND METHOD, DETECTION APPARATUS AND METHOD, FACIAL EXPRESSION LEARNING APPARATUS AND METHOD, FACIAL EXPRESSION RECOGNITION APPARATUS AND METHOD, AND ROBOT APPARATUS

This application claims priority of U.S. Preliminary Application No. 60/490,316, filed on Jul. 24, 2003 and Japanese Patent Application No. 2003-417191, filed on Dec. 15, 2003, the entireties of which are incorporated by reference herein.

This is a division of application Ser. No. 10/871,494, filed Jun. 17, 2004, now U.S. Pat. No. 7,379,568 which is entitled to the priority filing dates of Japanese application 2003-417191 filed on Dec. 15, 2003 and U.S. application 60/490,316 filed on Jul. 24, 2003, the entirety of which is incorporated herein by reference.

BACKGROUND OF THE INVENTION

1. Field of the Invention

This invention relates to a detection apparatus and method for detecting, for example, a face image as a detection target image from an image in real time, a learning apparatus and method for learning data to be used by the detection apparatus, a weak hypothesis generation apparatus and method for generating a weak hypothesis in learning, and a robot apparatus equipped with the detection apparatus. This invention also relates to a facial expression recognition apparatus and method for recognizing a facial expression of a face image by detecting a specific expression from the face image, a facial expression learning apparatus and method for learning data to be used by the facial expression recognition apparatus, and a robot apparatus equipped with the facial expression recognition apparatus.

2. Description of the Related Art

Face to face communication is a real-time process operating at a time scale in the order of 40 milliseconds. The uncertainty of recognition level at this time scale is extremely high, making it necessary for humans and machines to rely on sensory rich perceptual primitives rather than slow symbolic inference processes. Thus, fulfilling the idea of machines that interact face to face with humans requires development of robust and real-time perceptual primitives.

Charles Darwin was one of the first scientists to recognize that facial expression is one of the most powerful and immediate means for human beings to communicate their emotions, intentions, and opinions to each other. In addition to providing information about affective state, facial expressions also provide information about cognitive state such as interest, boredom, confusion, and stress, and conversational signals with information about speech emphasis and syntax. Recently, a number of groundbreaking systems have appeared in the computer vision literature for facial expression recognition. (See, M. Pantic and J. M. Rothcrantz, Automatic analysis of facial expressions: State of the art, IEEE Transactions on Pattern Analysis and Machine Intelligence, 22 (12): 1424-1445, 2000.)

To recognize facial expressions in real time, first, it is necessary to detect a face area from an input image in real time. Conventionally, many face detection techniques using only variable density patterns of image signals without using any motion from complicated image scenes have been proposed. For example, a face detector described in the following non-patent reference 1 includes a cascade of classifiers, each of which contains a filter such as Haar Basis function as a discriminator. When generating the discriminator based on learning, high-speed learning is realized by using images called integral images, which will be described later, and rectangle features.

FIGS. 1A to 1D are schematic views showing rectangle features described in the following non-patent reference 1. In the technique described in non-patent reference 1, as shown in FIGS. 1A to 1D, in input images 200A to 200D, plural filters (also referred to as rectangle features) are prepared, each of which finds the sum of brightness values in adjacent rectangular boxes of the same size and outputs the difference between the sum of brightness values in one or plural rectangular boxes and the sum of brightness values in the other rectangular boxes. For example, as shown in FIG. 1A, in the input image 200A, a filter 201A is shown, which subtracts the sum of brightness values in a shaded rectangular box 201A-2 from the sum of brightness values in a rectangular box 201A-1 is shown. Such a filter including two rectangular boxes is called two-rectangle feature. As shown in FIG. 1C, in the input image 200C, a filter 201C is shown, which is made up of three rectangular boxes 201C-1 to 201C-3 formed by dividing one rectangular box into three boxes, and which subtracts the sum of brightness values in the shaded central rectangular box 201C-2 from the sum of brightness values in the rectangular boxes 201C-1 and 201C-3. Such a filter including three rectangular boxes is called three-rectangle feature. Moreover, as shown in FIG. 1D, in the input image 200D, a filter 201D is shown, which is made up of four rectangular boxes 201D-1 to 201D-4 formed by vertically and horizontally dividing one rectangular box into four boxes, and which subtracts the sum of brightness values in the shaded rectangular boxes 201D-2 and 201D-4 from the sum of brightness values in the rectangular boxes 201D-1 and 201D-3. Such a filter including four rectangular boxes is called four-rectangle feature.

For example, judging a face image shown in FIG. 2 as a face image by using rectangle features as described above will now be described. A two-rectangle feature (filter) 211B includes two rectangular boxes 211B-1 and 211B-2 formed by vertically bisecting one rectangular box, and subtracts the sum of brightness values in the shaded rectangular box 211B-1 from the sum of brightness values in the lower rectangular box 211B-2. If the fact that the brightness value is lower in the eye area than in the cheek area is utilized with respect to a human face image (detection target) 210, whether an input image is a face image or not (correct or incorrect) can be estimated with certain probability from an output value of the rectangle feature 211B.

The three-rectangle feature (filter) 211C is a filter that subtracts the sum of brightness values in the left and right rectangular boxes 211C-1 and 211C-3 from the sum of brightness values in the central rectangular box 211C-2. Similar to the above-described case, if the fact that the brightness value is higher in the nose area than in the both of the eye areas is utilized with respect to the human face image 210, whether an input image is a face image or not can be judged to a certain degree from an output value of the rectangle feature 211C.

At the time of detection, in order to detect face areas of various sizes included in an input image, it is necessary to cut out areas of various sizes (hereinafter referred to as search windows) for judgment. However, an input image made up of, for example, 320×240 pixels contains search windows of approximately 50,000 sizes, and arithmetic operations on all these window sizes are very time-consuming.

Thus, according to non-patent reference 1, images called integral images are used. An integral image can be generated, for example, by carrying out an operation to add the pixel value of a position to the sum of the pixel value of the position that is immediately above and the pixel value of the position that is immediately left in the image, sequentially from the upper left part. It is an image in which the pixel value of an arbitrary position is the sum of brightness values in a rectangular box that is upper left side of this position. If integral images are found in advance, the sum of brightness values in a rectangular box in an image can be calculated simply by adding or subtracting the pixel values of the four corners of the rectangular box, and therefore the sum of brightness values in the rectangular box can be calculated at a high speed.

Moreover, in non-patent reference 1, a strong discrimination machine is used as a face detection apparatus, which uses many training data (learning samples), sequentially generates a discriminator based on the result of calculation using integral images, and discriminates whether an input image is a face image or not by weighted vote among outputs from many discriminators. FIG. 3 shows an essential part of the face detection apparatus described in non-patent reference 1. As shown in FIG. 3, all window images (subwindows) 241 cut out from an input image are inputted to the face detection apparatus. Then, one discriminator sequentially outputs "correct" (=1) or "incorrect" (=−1). If the result of weighted addition of these results in accordance with the reliability (lowness of error rate) of the discriminator is a positive value, it is assumed that a face exists in the window image and face detection is carried out. Since the face detector includes many discriminators, it is time-consuming to cut out window images of difference sizes from the input image and then take weighted vote among the results of discrimination by all the discriminators with respect to all the window images. Thus, in non-patent reference 1, plural classifiers 240A, 240B, 240C, . . . are prepared, each of which has plural discriminators, and these plural classifiers are cascaded. Each of the classifiers 240A, 240B, 240C, . . . once judges whether a window image is a face image or not from its output. With respect to data 242A, 242B, 242C, . . . judged as non-face images, judgment processing is interrupted at this point and only data 2 judged as a face image by one classifier is supplied to the next-stage classifier. The plural discriminators constituting the next-stage classifier newly perform weighted addition and majority vote. As such processing is repeated, high-speed processing in face detection is realized.

Non-Patent Reference 1: Paul Viola and Michael Jones, Robust real-time object detection, Technical Report CRL 2001/01, Cambridge Research Laboratory, 2001.

However, with respect to the rectangle features described in the above-described non-patent reference 1, there are 160,000 or more possible filters to be selected, depending on the number of pixels constituting the filters (sizes of filters) and the types of filters such as two-, three- and four-rectangle features, even if a target area (window image) is limited to, for example, a 24×24-pixel area. Therefore, in learning, an operation to select, for example, one filter that provides a minimum error rate from the 160,000 or more filters, for example, for several hundred labeled training data and thus generate a discriminator must be repeated, for example, several hundred times corresponding to the number of weighted votes. Therefore, an extremely large quantity of arithmetic operation is required and learning processing is very time-consuming.

Moreover, in the case of discriminating a face from an input image by using a final hypothesis made up of many weak hypotheses acquired by learning, as discrimination is made by a classifier made up of plural weak hypotheses, as described above, the quantity of arithmetic operation is reduced, compared with the case of making weighted vote among sum values of all the weak hypotheses, and the discrimination processing speed can be improved. However, since each classifier needs to similarly take weighted vote, the processing is time-consuming.

SUMMARY OF THE INVENTION

In view of the foregoing status of the art, it is an object of this invention to provide a weak hypothesis generation apparatus and method that enable generation of weak hypotheses constituting a discriminator at a high speed without lowering the discrimination performance when learning data to be used by the discriminator that discriminates whether it is a detection target or not by ensemble learning.

It is another object of this invention to provide a detection apparatus and method that enable discrimination of a detection target at a high speed without performing any redundant operation by sequentially learning output values of weak hypotheses for learning samples in advance, when learning data to be used by a discriminator by boosting, and a learning apparatus and method that enable such high-speed discrimination.

It is still another object of this invention to provide a facial expression recognition apparatus and method that are robust against deviation in face position contained in an image and that enable accurate and quick recognition of facial expressions, and a facial expression learning apparatus and method for learning data to be used by a facial expression recognition apparatus.

It is still another object of this invention to provide a robot apparatus equipped with a detection apparatus capable of detecting a detection target accurately in real time from an input image, and a robot apparatus equipped with a facial expression recognition apparatus capable of recognizing expressions of face images accurately at a high speed.

A weak hypothesis generation apparatus according to this invention is adapted for generating a weak hypothesis for estimating whether provided data is a detection target or not by using a data set including plural learning samples, each of which has been labeled as a detection target or non-detection target. The weak hypothesis generation apparatus includes: a selection unit for selecting a part of plural hypotheses and selecting one or plural weak hypotheses having higher estimation performance than others with respect to the data set of the selected part of the hypotheses, as high-performance weak hypotheses; a new weak hypothesis generation unit for generating one or more new weak hypotheses formed by adding a predetermined modification to the high-performance weak hypotheses, as new weak hypotheses; and a weak hypothesis selection unit for selecting one weak hypothesis having the highest estimation performance with respect to the data set, from the high-performance weak hypotheses and the new weak hypotheses.

In this invention, using a part of all the selectable weak hypotheses instead of all the selectable weak hypotheses, one or plural weak hypotheses having high discrimination performance (estimation performance), that is, having a low error rate, are selected as high-performance weak hypotheses. Then, a new weak hypothesis or hypotheses formed by adding a predetermined modification to the selected high-performance weak hypotheses are generated, and a weak hypothesis having the highest discrimination performance is selected from these, thus generating a weak hypothesis. This enables reduction in the quantity of arithmetic operation without lowering the accuracy, compared with the case of selecting a weak hypothesis of the highest discrimination performance from all the selectable weak hypotheses.

The new weak hypothesis generation unit can generate new weak hypotheses from the high-performance weak hypotheses on the basis of statistical characteristics of the detection target. For example, in the case of detecting a human face, it generates new weak hypotheses by utilizing left-and-right symmetry of the face. This enables generation of new weak hypotheses that are expected to have a low estimation error rate and high performance equivalent to those of the high-performance weak hypotheses. As a weak hypothesis is selected from these weak hypotheses by the weak hypothesis selection unit, a weak hypothesis having high discrimination performance can be generated while reducing the quantity of arithmetic operation compared with the case of selecting one of all the selectable weak hypotheses.

Moreover, data weighting is set for each learning sample of the data set, and the estimation performance with respect to the data set can be calculated on the basis of the data weighting set for each learning sample of the data set. An apparatus that generates a weak hypothesis used for boosting can be realized.

Furthermore, the apparatus also has a data weighting update unit for updating the data weighting of each of the learning samples on the basis of the estimation performance with respect to the data set, of the weak hypothesis selected by the weak hypothesis selection unit. Every time the data weighting is updated by the data weighting update unit, the processing to generate a weak hypothesis by selecting one of the plural weak hypothesis can be repeated. This enables construction of a learning apparatus that updates the distribution of the data weighting every time a weak hypothesis is generated and learns a final hypothesis by boosting in which a weak hypothesis is generated in accordance with the updated distribution of the data weighting.

The data weighting update unit updates the data weighting in such a manner that the data weighting of a learning sample on which the estimation value outputted by the weak hypothesis is incorrect becomes relatively larger than the data weighting of a learning sample on which the estimation value is correct. Thus, it is possible to sequentially generate a weak hypothesis whereby a learning sample that is hard to discriminate and has large data weighting becomes correct.

Moreover, the weak hypothesis can deterministically output the estimation value with respect to provided data, and learning in accordance with an algorithm such as Adaboost can be carried out. If the estimation value with respect to provided data is outputted probabilistically, the estimation performance can be improved further.

Furthermore, the data set includes a variable density image representing the detection target and a variable density image representing the non-detection target. The weak hypothesis may estimate whether a variable density image provided as an input is a detection target or not on the basis of the difference between the sum of brightness values in one or plural rectangular boxes and the sum of brightness values in the other rectangular boxes in a group of two or more rectangular boxes contained in the variable density image. If integral images, which will be described later, are used, the feature quantity of the rectangle feature can be calculated at a higher speed.

Another weak hypothesis generation apparatus according to this invention is adapted for generating a weak hypothesis for estimating whether provided data is a detection target or not by using a data set including plural learning samples each of which has been labeled as a detection target or non-detection target. The weak hypothesis generation apparatus includes: a selection unit for selecting a part of plural weak hypotheses; a new weak hypothesis generation unit for generating one or more new weak hypotheses formed by adding a predetermined modification to the part of the weak hypotheses selected by the selection unit, as new weak hypotheses; and a weak hypothesis selection unit for selecting one weak hypothesis having the highest estimation performance with respect to the data set, from the part of the weak hypotheses selected by the selection unit and the new weak hypotheses.

In this invention, a part of many selectable weak hypotheses is randomly selected, and one weak hypothesis having high discrimination performance is selected from the selected part of the weak hypotheses and generated new weak hypotheses, thus generating a weak hypothesis. Therefore, it is possible to generate a weak hypothesis having higher performance than in the case of generating a weak hypothesis by randomly selecting a part of hypotheses and selecting one weak hypothesis of high performance from these.

A learning apparatus according to this invention is adapted for learning data to be used by a detection apparatus, the detection apparatus being adapted for judging whether provided data is a detection target or not by using a data set including plural learning samples each of which has been labeled as a detection target or non-detection target. The learning apparatus includes: a weak hypothesis selection unit for repeating processing to select one weak hypothesis from plural weak hypotheses for estimating whether provided data is a detection target or not; a reliability calculation unit for, every time a weak hypothesis is selected by the weak hypothesis selection unit, calculating reliability of the weak hypothesis on the basis of the result of estimation of the selected weak hypothesis with respect to the data set; and a threshold value learning unit for calculating and adding the product of the result of estimation of the weak hypothesis with respect to the data set and the reliability of the weak hypothesis every time a weak hypothesis is selected by the weak hypothesis selection unit, and learning an abort threshold value for aborting the processing by the detection apparatus to judge whether the provided data is a detection target or not on the basis of the result of the addition.

In this invention, for example, in the case where there are much more non-detection targets than detection targets included in provided data, the abort threshold value that has been learned in advance is used to abort detection processing when it can be judged that the provided data is obviously a non-detection target, or conversely, to abort detection processing when it can be judged that the provided data is obviously a detection target. Thus, the detection apparatus that performs the detection processing very efficiently can be provided.

The threshold value learning unit can learn the abort threshold value on the basis of the result of addition of the product of the result of estimation of the weak hypothesis with respect to positive data labeled as the detection target, of the data set, and the reliability of the weak hypothesis, calculated and added every time a weak hypothesis is selected by the weak hypothesis selection unit. For example, it can store a smaller one of a minimum value of the result of addition with respect to the positive data and a discrimination boundary value, as the abort threshold value, every time the weak hypothesis is selected. This enables provision of a detection apparatus that aborts processing, assuming that obviously non-detection target data is inputted when the result of addition is smaller than the minimum possible value of the positive data.

Moreover, the threshold value learning unit can learn the abort threshold value on the basis of the result of addition of the product of the result of estimation of the weak hypothesis with respect to negative data labeled as the non-detection target, of the data set, and the reliability of the weak hypothesis, calculated and added every time a weak hypothesis is selected by the weak hypothesis selection unit. For example, it can store a larger one of a maximum value of the result of calculation with respect to the negative data and a discrimination boundary value, as the abort threshold value, every time the weak hypothesis is selected. This enables provision of a detection apparatus that aborts processing, assuming that clearly detection target data is inputted when the result of addition is larger than the maximum possible value of the negative data.

A detection apparatus according to this invention is adapted for detecting a detection target by discriminating whether provided data is a detection target or not. The detection apparatus includes: an estimation result output unit including plural weak hypotheses; and a discrimination unit for discriminating whether the provided data is a detection target or not on the basis of the result of output of the estimation result output unit; wherein the estimation result output unit estimates and outputs whether the provided data is a detection target or not for each weak hypothesis on the basis of a feature quantity that has been learned in advance, and the discrimination unit has an abort unit for adding the product of the result of estimation of a weak hypothesis and reliability that has been learned in advance on the basis of estimation performance of the weak hypothesis, every time one hypothesis outputs the result of estimation, and deciding whether or not to abort processing by the estimation result output unit on the basis of the result of the addition.

In this invention, as an abort threshold value that has been learned in advance and the product of the result of estimation and reliability of the weak hypothesis are compared with each other every time one weak hypothesis outputs the result of estimation, whether or not to abort calculation of the weak hypothesis can be decided. Therefore, redundant calculation can be omitted and detection processing can be performed at a higher speed.

The detection target can be a face image. In this case, a system can be provided that has a face feature extraction unit for filtering, with a Gabor filter, a face image detected as the detection target by the discrimination unit and thus extracting a face feature, and a facial expression recognition unit for recognizing an expression of the provided face image on the basis of the face feature, and that detects a face image at a high speed and recognize its expression, thereby recognizing an expression of a human being in real time from dynamic images such as video images.

A facial expression learning apparatus according to this invention is adapted for learning data to be used by a facial expression recognition apparatus, the facial expression recognition apparatus being adapted for recognizing an expression of a provided face image by using an expression learning data set including plural face images representing specific expressions as recognition targets and plural face images representing expressions different from the specific expressions. The facial expression learning apparatus includes a facial expression learning unit for learning data to be used by the facial expression recognition apparatus, the facial expression recognition apparatus identifying the face images representing the specific expressions from provided face images on the basis of the face feature extracted from the expression learning data set by using a Gabor filter.

In this invention, as an output of the Gabor filter that filters an input image by using plural filters having direction selectivity and different frequency components is used as a feature quantity, a feature quantity that is less affected by a shift of the image or environmental changes can be extracted. As data for an expression identifier that identifies specific expression is learned by using expression learning samples labeled with each expression for a desired number of expressions to be identified, a facial expression recognition apparatus capable of recognizing an arbitrary expression form a provided face image can be provided.

The expression learning unit can learn a support vector for identifying a face image representing the specific expression on the basis of the face feature extracted from the expression learning data set by using the Gabor filter. By a support vector machine that once reflects the extracted face feature onto a nonlinear feature space and finds a hyperspace separating in this feature space to identify a face and a non-face object, a facial expression recognition apparatus capable of recognizing a desired expression with high accuracy can be provided.

Moreover, the expression learning unit has a weak hypothesis generation unit for repeating processing to generate a weak hypothesis for estimating whether a provided face image is of the specific expression or not on the basis of the result of filtering by one Gabor filter selected from plural Gabor filters, a reliability calculation unit for calculating reliability of the weak hypothesis generated by the weak hypothesis generation unit on the basis of estimation performance of the weak hypothesis with respect to the expression learning data set, and a data weighting update unit for updating data weighting set for the expression learning data set on the basis of the reliability. The weak hypothesis generation unit can repeat the processing to generate the weak hypothesis while selecting one Gabor filter having the highest estimation performance with respect to the expression learning data set every time the data weighting is updated. One of outputs of the plural Gabor filters decided in accordance with the frequencies and directions of the Gabor filters and pixel positions in the learning sample is selected to generate a weak hypothesis, and as this is repeated, data for an identifier to provide a final hypothesis can be learned.

Furthermore, the expression learning unit has a weak hypothesis generation unit for repeating processing to generate a weak hypothesis for estimating whether a provided face image is of the specific expression or not on the basis of the result of filtering by one Gabor filter selected from plural Gabor filters, a reliability calculation unit for calculating reliability of the weak hypothesis generated by the weak hypothesis generation unit on the basis of estimation performance of the weak hypothesis with respect to the expression learning data set, a data weighting update unit for updating data weighting set for the expression learning data set on the basis of the reliability, and a support vector learning unit for learning a support vector for identifying a face image representing the specific expression on the basis of the face feature extracted form the expression learning data set by a predetermined Gabor filter. The weak hypothesis generation unit repeats the processing to generate the weak hypothesis while selecting one Gabor filter having the highest estimation performance with respect to the expression learning data set every time the data weighting is updated. The support vector learning unit extracts the face feature by using the Gabor filter selected by the weak hypothesis generated by the weak hypothesis generation unit, and thus can learn the support vector. Outputs of all the Gabor filters decided in accordance with the frequencies and directions of the Gabor filters and pixel positions in a learning sample are used as weak hypotheses, and several weak hypotheses having high discrimination performance are selected form these. As the support vector is learned by using these selected weak hypotheses as the feature quantity, the dimension of the vector is lowered and the quantity of arithmetic operation at the time of learning is thus reduced significantly. Also, as ensemble learning and a support vector machine are combined, a facial expression recognition apparatus having higher general-purpose capability can be provided.

A facial expression recognition apparatus according to this invention includes: a face feature extraction unit for filtering a provided face image by using a Gabor filter and extracting a face feature; and an expression recognition unit for recognizing an expression of the provided face image on the basis of the face feature.

In this invention, since a feature quantity is extracted from a provided face image by a Gabor filter that is robust against a shift of the image, the result of recognition that is robust against environment changes can be acquired. The expression recognition unit can be formed by an expression identifier having its data learned by SVM or boosting or by a combination of these. An expression can be recognized from a face image very accurately.

A robot apparatus according to this invention is an autonomously acting robot apparatus. The robot apparatus includes: an image pickup unit for picking up an image of its surroundings; a cut-out unit for cutting out a window image of an arbitrary size from the image picked up by the image pickup unit; and a detection apparatus for detecting whether the window image is an image representing a detection target or not. The detection apparatus has an estimation result output unit including plural weak hypotheses, and a discrimination unit for discriminating whether the window image is an image representing a detection target or not on the basis of the result of estimation outputted from the estimation result output unit. The estimation result output unit estimates and outputs whether the provided data is a detection target or not for each weak hypothesis on the basis of a feature quantity that has been learned in advance. The discrimination unit has an abort unit for adding the product of the result of estimation of a weak hypothesis and reliability learned on the basis of estimation performance of the weak hypothesis every time one weak hypothesis outputs the result of estimation, and deciding whether or not to abort processing by the estimation result output unit on the basis of the result of the addition.

In this invention, using an abort threshold value when detecting a detection target from an input image, detection processing to detect whether a provided image is a detection target or not can be omitted, and a target object can be detection in real time from an inputted static image or dynamic image.

A robot apparatus according to this invention is an autonomously acting robot apparatus. The robot apparatus includes: an image pickup unit for picking up an image of its surroundings; a face image detection apparatus for detecting a predetermined area as a face image from the image picked up by the image pickup unit; and a facial expression recognition apparatus for recognizing an expression of the face image. The facial expression recognition apparatus has a face feature extraction unit for filtering the face image detected by the face image detection apparatus by using a Gabor filter and thus extracting a face feature, and an expression recognition unit for recognizing an expression of the provided face image on the basis of the face feature.

In this invention, even an autonomously acting robot apparatus can accurately recognize an expression from a face image by using a feature quantity that is robust against environmental changes.

With the weak hypothesis generation apparatus and method according to this invention, when estimating whether provided data is a detection target or not by using a data set including plural learning samples each of which has been labeled as a detection target or non-detection target, first, a part of plural weak hypotheses is selected and one or plural weak hypotheses having higher estimation performance with respect to the data set, of the selected part of weak hypotheses, are selected as high-performance weak hypotheses. Next, one or more new weak hypotheses formed by adding a predetermined modification to the high-performance weak hypotheses are generated as new weak hypotheses. Then, one weak hypothesis having the highest estimation performance with respect to the data set is selected from the high-performance weak hypotheses and the new weak hypotheses, thus generating a weak hypothesis. By thus selecting weak hypotheses of high discrimination performance from a part of all the selectable weak hypotheses, generating new weak hypotheses with a predetermined modification from the selected high-performance weak hypotheses, and employing a weak hypothesis having the highest discrimination performance from these, it is possible to significantly reduce the quantity of arithmetic operation without lowering the accuracy compared with the case of selecting a weak hypothesis having high discrimination performance from all the selectable weak hypotheses. As a weak hypothesis is thus generated at a high speed, data for a discriminator to provide a final hypothesis can be learned at a high speed and a learning machine with high accuracy can be provided.

With another weak hypothesis generation apparatus and method according to this invention, a part of plural weak hypotheses is selected and one or more new weak hypotheses formed by adding a predetermined modification to the selected part of weak hypotheses are generated. Of these weak hypotheses, a weak hypothesis having a minimum error rate with respect to a learning data set is selected, thus generating a weak hypothesis. Therefore, a weak hypothesis can be generated at a high speed, compared with the case of selecting a weak hypothesis having high discrimination performance from all the selectable weak hypotheses, and a weak hypothesis having higher performance than a weak hypothesis selected from a part of the weak hypotheses can be generated.

With the learning apparatus and method according to this invention, data for a detection apparatus that judges whether a provided data is a detection target or not is learned by using a data set including plural learning samples each of which has been labeled as a detection target or non-detection target. In learning, processing to select one of plural weak hypotheses for estimating whether provided data is a detection target or not is repeated. In this processing, every time a weak hypothesis is selected, reliability of the weak hypothesis is calculated on the basis of the result of estimation of the selected weak hypothesis with respect to the data set, and the product of the result of estimation of the weak hypothesis with respect to the data set and the reliability of the weak hypothesis is calculated and added every time a weak hypothesis is selected. Then, an abort threshold value for aborting the processing by the detection apparatus to judge whether the provided data is a detection target or not on the basis of the result of addition is learned. Therefore, in detecting a target object, it is possible to abort the detection processing on the basis of a judgment that a provided image is obviously not a detection target or to abort the detection processing on the basis of a judgment that a provided image is obviously a detection target in accordance with the abort threshold value. Redundant processing can be omitted and a detection apparatus capable of performing detection processing at a high speed can be provided.

With the detection apparatus and method according to this invention, when detecting a detection target by discriminating whether provided data is a detection target or not, whether or not provided data is a detection target or not is estimated and outputted for each weak hypothesis on the basis of a feature quantity that has been learned in advance with respect to plural weak hypotheses, and whether the provided data is a detection target or not is discriminated on the basis of the result of output. In this case, the product of the result of estimation of the weak hypothesis and reliability that has been learned in advance on the basis of the estimation performance of the weak hypothesis is added every time one weak hypothesis outputs the result of estimation, and whether or not to abort the estimation processing of the weak hypothesis is decided on the basis of the result of addition. Therefore, for example, in the case where there are much more non-detection targets than detection targets, whether or not provided data is obviously a non-detection target is judged in accordance with an abort threshold value that has been learned in advance. When it can be judged that the provided data is obviously a non-detection target, the detection processing can be aborted. Thus, the detection processing can be performed very efficiently and a higher speed. Moreover, if a face image is detected as a detection target, a face can be detected from a dynamic image or the like in real time. Combined with a facial expression recognition apparatus that recognizes an expression of this face image, it is possible to recognize an expression of a human being from an input image in real time.

With the facial expression learning apparatus and method according to this invention, data for a facial expression recognition apparatus that recognizes an expression of a provided face image is learned by using an expression learning data set including plural face images representing specific expressions as recognition targets and plural face images representing expressions different from the specific expressions. In this case, face features are learned for the facial expression recognition apparatus to identify a face image representing the specific expressions from provided face images on the basis of face features extracted from the expression learning data set by a Gabor filter. Since an output of the Gabor filter is used as a feature quantity, the apparatus is robust against a shift of the image. As data for an expression identifier that identifies a specific expression of an identification target is learned for a desired number of expressions by using expression learning samples labeled for each expression, a facial expression recognition apparatus that recognizes a desired expression from a provided face image can be provided. Moreover, if a support vector for identifying a specific expression is learned, the expression identifier can be a support vector machine and a facial expression recognition apparatus with very high accuracy can be provided. Furthermore, if ensemble learning is performed by a technique such as boosting using an expression identifier that identifies a specific expression as a final hypothesis, a facial expression recognition apparatus capable of high-speed operation with high accuracy can be provided. As the dimension of a vector to be learned is lowered by performing feature selection for learning a support vector by boosting, it is possible to realize high-speed operation at the time of learning and to provide a facial expression identification apparatus that operates at a high-speed and has very high general-purpose performance.

With the facial expression recognition apparatus and method according to this invention, a provided face image is filtered by a Gabor filter to extract a face feature, and an expression of the provided face image is recognized on the basis of this face feature. Therefore, a feature quantity robust against environmental changes can be extracted and a facial expression can be recognized accurately.

With the robot apparatus according to this invention, when equipped with a detection apparatus capable of high-speed detection processing or a facial expression recognition apparatus that recognizes an expression of a face image as described above, a robot apparatus of excellent entertainment quality that can recognize an expression of a human being in real time and present an action in accordance with the emotion of the user can be provided.

DESCRIPTION OF THE PREFERRED EMBODIMENTS

Figure 1A:
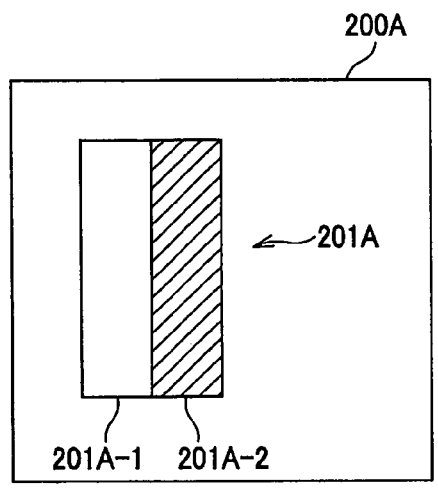
FIGS. 1A to 1D are schematic views showing rectangle features described in non-patent reference 1.
Figure 1B:
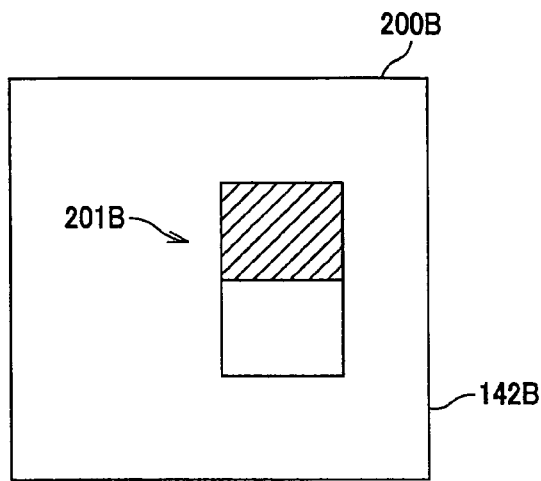
Figure 1C:
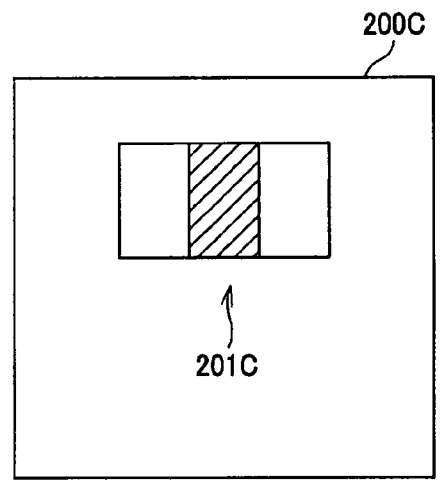
Figure 1D:
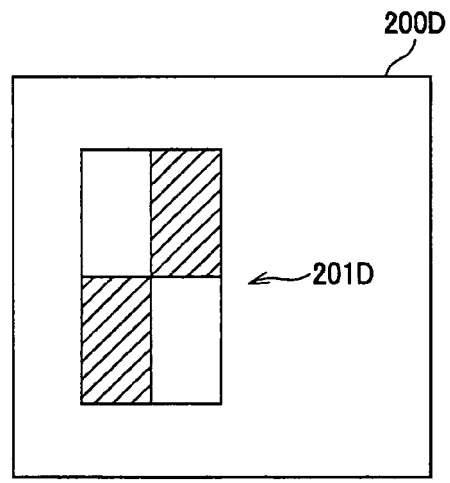
Figure 2:
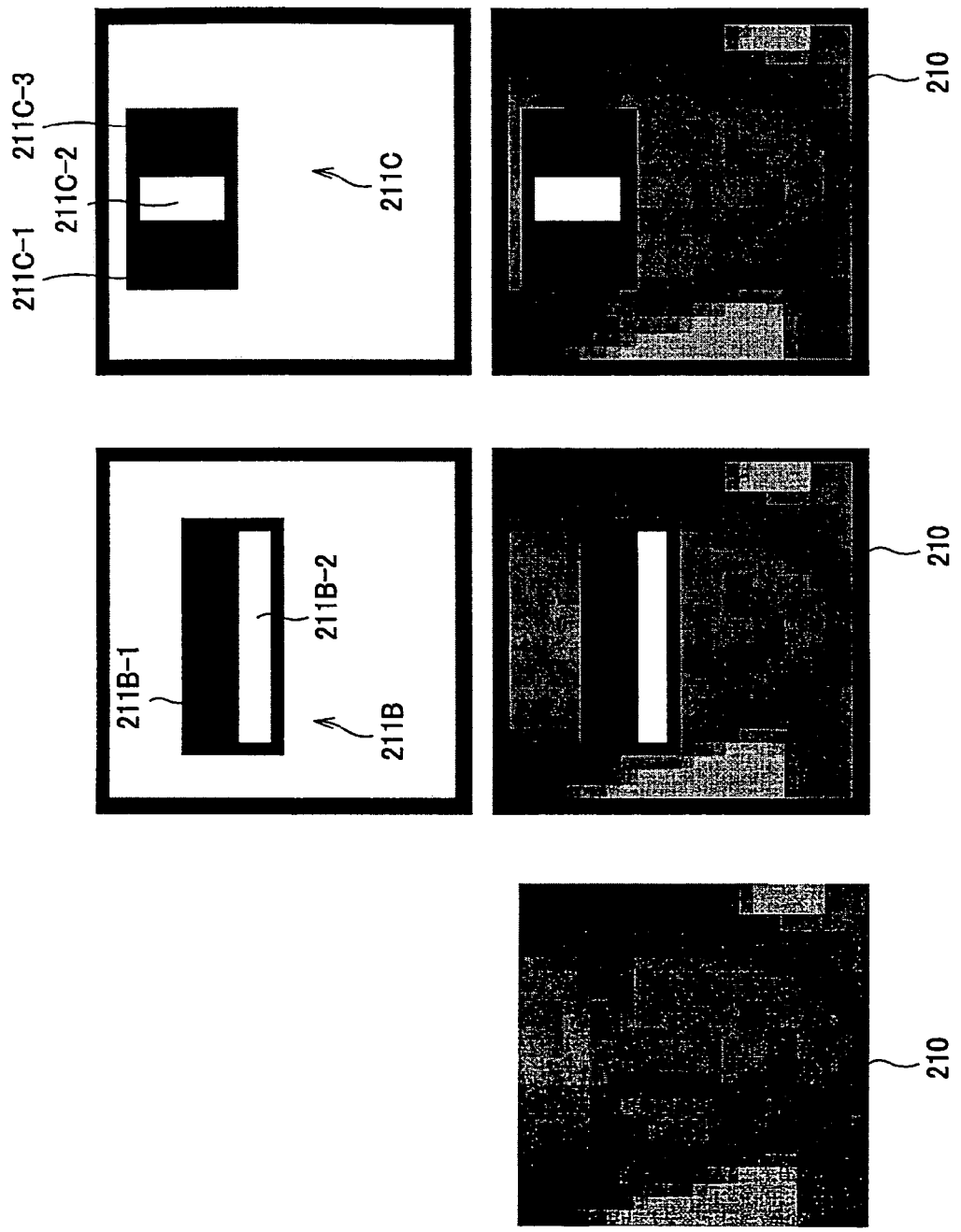
FIG. 2 is a view described in non-patent reference 1 for explaining a face image judgment method using rectangle features.
Figure 3:
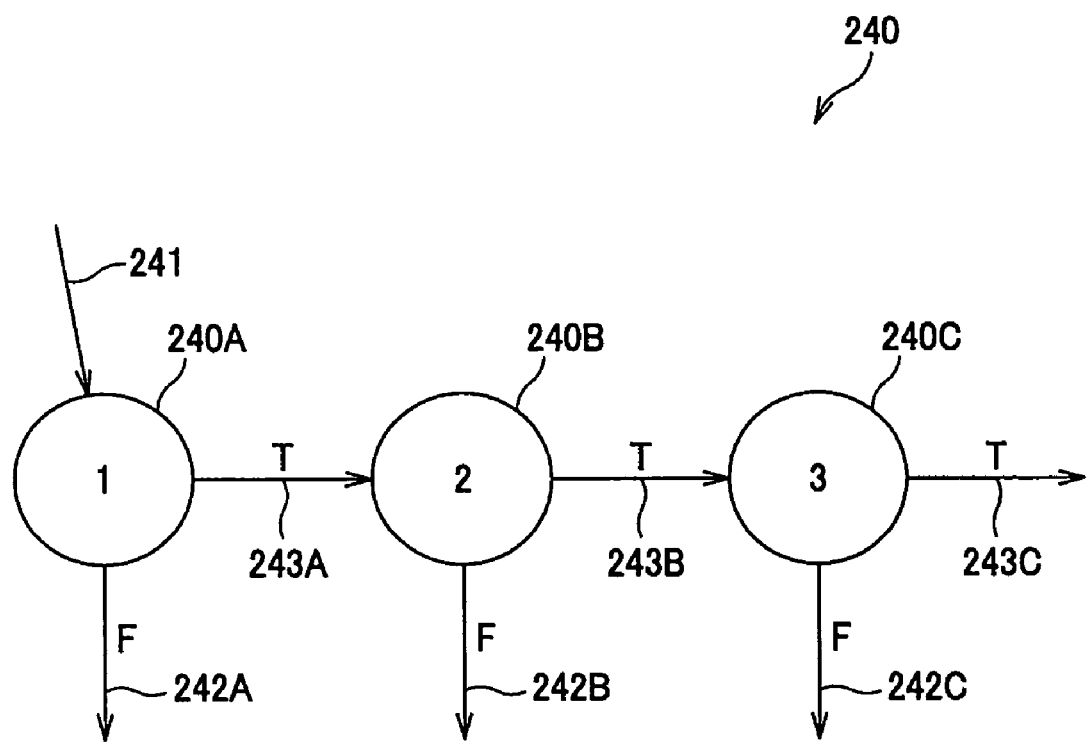
FIG. 3 is a schematic view showing a part of cascaded discriminators described in non-patent reference 1.

An embodiment of this invention will now be described in detail with reference to the drawings. In this embodiment, this invention is applied to a facial expression recognition system including a detection apparatus that detects a face image as a detection target from an inputted image or video and a facial expression recognition apparatus that recognizes an expression of the face image detected by the detection apparatus.

This facial expression recognition system can detect a face image from a video and can carry out user-independent and fully automatic real-time recognition of basic emotional expressions. Moreover, this facial expression recognition system automatically detects frontal faces in video streams and codes them to identify plural emotions such as neutral, anger, disgust, fear, joy, sadness, and surprise.

Data for the detection apparatus has been learned by ensemble learning using a data set including plural face images as learning samples representing detection targets and plural non-face images as learning samples representing non-detection targets. The facial expression recognition apparatus is an apparatus that identifies plural facial expressions by support vector machines (SVM), or learners acquired by ensemble learning, or a combination of these, using an output of a Gabor filter of the face image detected by the detection apparatus as a feature quantity. That is, data for both of these apparatuses have machine-learned by using learning samples called teacher data or training data.

First, prior to the explanation of this embodiment, ensemble learning will be described, which is one of learning algorithms used in this embodiment. Ensemble learning is described, for example, in Hideki Ado, et al., "Statistics of pattern recognition and learning: new concepts and techniques", Iwanami.

A hypothesis deterministically or probabilistically predicts one response y to an input x. When a hypothesis is expressed by a parameter $\theta$, it is described as $y=h(x,\theta)$. A learning algorithm is to select an appropriate estimation value of the parameter $\theta$, using a learning sample from a hypothesis set $\{h(x,\theta)\}$, which is called a learning model.

An algorithm called ensemble learning is aimed at selecting various hypotheses in accordance with the difference in the weighting and initial values of provided learning samples and combining these to construct a final hypothesis, by using a relatively simple learning model and a learning rule of a reasonable quantity of calculation. Thus, it is aimed at learning equivalent to learning with a complicated learning model.

In ensemble learning, since many hypotheses are combined to improve performance, a learning algorithm used for ensemble learning is called a weak learning algorithm or weak learner, and a hypothesis is called a weak hypothesis, weak discriminator, weak judgment unit or the like.

Attempts to combine simple learners to produce a complicated one have long been carried out in the field of neural networks. A learner produced in this manner or its algorithm is referred to as a combining predictor, combining learner, committee machine, modular network, voting network, ensemble learning or the like. In this specification, a term "ensemble learning" is used.

When plural different parameters are given by learning as described above, a final output is decided by taking majority vote. If weighing wi is given to a hypothesis hi (normally, the sum of weighting is normalized to be 1), this weighting indicates which hypothesis should be outputted preferentially. Majority vote based on this weighting is called weighted vote. Majority vote in the case of equal weighting is called equal vote. If the output is meterage-like, the result of weighting and adding the outputs of hypotheses is the final output.

A learner acquired by ensemble learning is also called a final hypothesis or strong discriminator and it includes many weak hypotheses and a combiner for combining them. Depending on whether the operation of the combiner is dynamic or static with respect to an input and whether the way weak hypotheses are generated is parallel or sequential, classification into several learning algorithms is carried out. In this embodiment, a face detection apparatus and a facial expression recognition apparatus will be described as static combiners that integrate outputs of weak hypotheses with fixed weighting irrespective of input, and as learners acquired by boosting for sequentially generating hypotheses. As a similarly static combiner, there is boosting for generating hypotheses in parallel.

In boosting, for example, several thousand detection targets and non-detection targets, called learning samples, which have been labeled in advance, for example, samples including face images and non-face images are used, and different learners (weak hypotheses) are generated while the weighting of the samples is sequentially changed. Then, these are combined to construct a learner (final hypothesis) having high accuracy. The term "boosting" is used because the accuracy of the learning algorithm is boosted.

In this manner, from a learning model having a very simple structure and made up of a combination of weak hypotheses, each of which has, in itself, low discrimination performance to discriminate a detection target or non-detection target, one hypothesis is selected in accordance with a predetermined learning algorithm such as boosting, thus generating a weak hypothesis. As many weak hypotheses are combined, a final hypothesis (discriminator) having high discrimination performance can be acquired from the weak hypotheses, each of which has low discrimination performance in itself. For example, in Adaboost, weighting is set for learning samples and data weighting is sequentially updated so that large weighting is set for a sample that is difficult to discriminate. For example, a weak hypothesis having the minimum discrimination error with respect to the weighted sample is selected from many weak hypotheses, thus sequentially generating weak hypotheses. Also, reliability indicating the discrimination performance of the generated weak hypotheses is learned. In the following description, plural hypotheses (weak hypotheses) constituting a learning model will also be referred to as filters when necessary, in order to discriminate them from weak hypotheses sequentially generated by learning. The results of discrimination (results of output) of weak hypotheses will also be referred to as estimation values or results of estimation when necessary, in order to discriminate them from the results of discrimination of a discriminator as a final hypothesis.

In this embodiment, a technique for realizing high-speed processing by generating weak hypotheses very efficiently in ensemble learning is proposed. Although depending on a discrimination target (detection target) and its conditions, normally, there are a large number of combinations of weak hypotheses (filter) to be learning models. In learning, since processing to select one filter having the highest possible discrimination performance from these many filters and to generate a weak hypothesis is repeated, the processing itself usually becomes extremely large. On the other hand, with the weak hypothesis generation method according to this embodiment, a weak hypothesis having high discrimination performance can be generated, even reducing the quantity of calculation at the time of generation.

Moreover, the final hypothesis acquired by learning includes many weak hypotheses. In discrimination, a weighted vote acquired by weighted addition of all the outputs of these weak hypotheses is the output of the final hypothesis. Therefore, normally, the outputs of all the weak hypotheses must be acquired. On the other hand, in this embodiment, as an abort threshold value, which will be described later, is learned in learning, whether data provided as an input is a detection target or non-detection target can be sequentially judged, without taking a weighted vote among the outputs of all the weak hypotheses, and the arithmetic operation can be aborted without waiting for the results of output of all the weak hypotheses. Therefore, the detection processing can be performed at a higher speed. The method for generating weak hypotheses in this invention may be applied to ensemble learning other than boosting so as to similarly realize high-speed learning and detection of a learner.

(1) Facial Expression Recognition System

Figure 4:
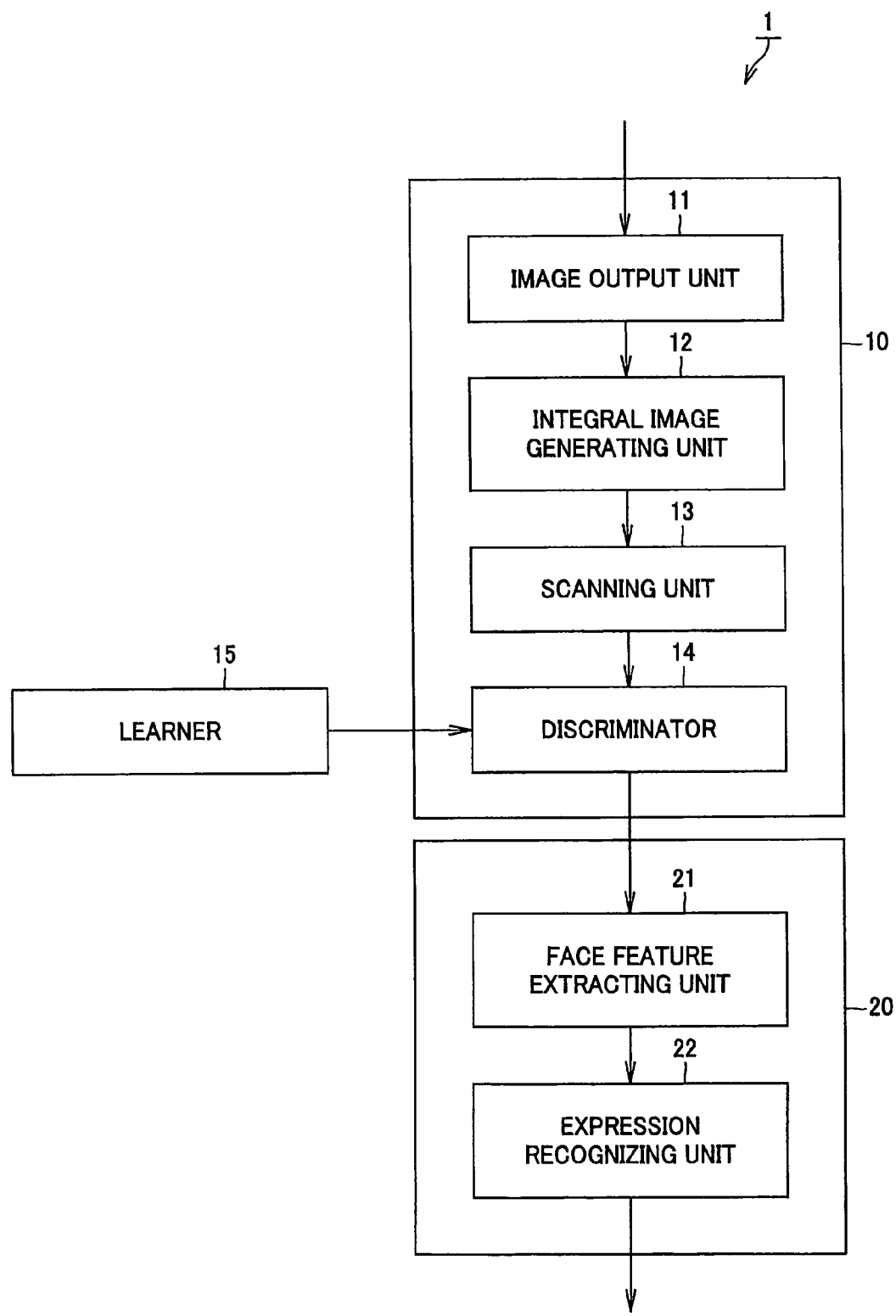
FIG. 4 is a block diagram showing a facial expression recognition system according to an embodiment of this invention.

FIG. 4 is a functional block diagram showing processing functions of a facial expression recognition system in this embodiment. As shown in FIG. 4, a facial expression recognition system 1 has a face detection apparatus 10 that outputs the position and size of a face from a provided input image, and a facial expression recognition apparatus 20 that recognizes the expression of the face image detected by the face detection apparatus.

The face detection apparatus 10 has an image output unit 11 to which a dynamic image such as video image or a static image is inputted and which outputs a variable density image (brightness image), an integral image generation unit 12 for generating an integral image, which will be described later, from the variable density image outputted from the image output unit 11, a scanning unit 13 for sequentially scanning the integral image by using the size of a detection target, for example, from the upper left corner, and a discriminator 14 for discriminating whether each of all the window images sequentially scanned by the scanning unit 13 represents a face or not. The scanning unit 13 sequentially scans each integral window by using a window with the size of a target object to be detected, and cuts out the window image. The discriminator 14 discriminates whether each window image represents a face or not. The position and size of an area representing the detection target in the provided image (input image) are thus outputted.

The discriminator 14 discriminates whether the current window image is a face image or non-face image, referring to the result of learning by an ensemble learner 15 that learns plural weak hypotheses constituting the discriminator 14 by ensemble learning.

When plural face images are detected from an input image, this face detection apparatus 10 outputs area information of plural areas. If there are overlapping areas of the plural areas, processing to output an average area of these or to select an area having a value for taking high weighted vote, which will be described later, as an area evaluated as having the highest probability of being a detection target, can be carried out.

The facial expression recognition apparatus 20 has a face feature extracting unit 21 for extracting a feature quantity for expression recognition from the face image detected by the face detection apparatus 10, and an expression recognizing unit 22 for identifying the inputted face image as one of plural facial expressions that have been learned in advance, using the feature quantity extracted by the face feature extracting unit 21, thus recognizing the expression.

The face feature extracting unit 21 is formed by a Gabor filter for filtering the face image using plural filters having direction selectivity and different frequency components. The expression recognizing unit 22 has expression identifiers corresponding to the types of expressions to be identified, to which the result of extraction of the face feature by the face feature extracting unit 21 is inputted and which identify specific expressions, respectively. In this embodiment, the expression recognizing unit 22 includes seven expression identifiers for identifying seven face images.

Data for the discriminator 14 of the face detection apparatus 10 has been machine-learned by ensemble learning, using a learning data set including plural learning samples each of which has been labeled in advance as a detection target or non-detection target. Data for the facial expression recognition apparatus 20 has been learned, using image samples labeled with predetermined expressions in advance. Therefore, the facial expression recognition system will now be described in detail by the description of a learning method for the face detection apparatus, a detection method by the face detection apparatus, a learning method for the facial expression recognition apparatus, and a recognition method by the facial expression recognition apparatus, in this order.

The face detection apparatus 10 has a function of preprocessing such as generating an integral image and cutting out a predetermined area, before the discriminator 14. The discriminator 14 is adapted for discriminating whether an image provided as an input is a face image or not. Therefore, when preprocessing is not necessary, the discriminator 14 can be used as the face detection apparatus. Although the discriminator 14 described in this embodiment is applied to the face detection apparatus for discriminating a face image from a provided window image, it can also be applied to an apparatus for detecting a desired detection target other than a face.

(2) Discriminator

The discriminator 14 used in the face detection apparatus 10 in this embodiment is adapted for taking a weighted vote among the results of output of plural weak hypotheses so as to discriminate whether an input image is a detection target or not, that is, whether it is a face image or not. The weak hypotheses and weighting on them have been learned in advance by ensemble learning such as boosting.

Figure 5:
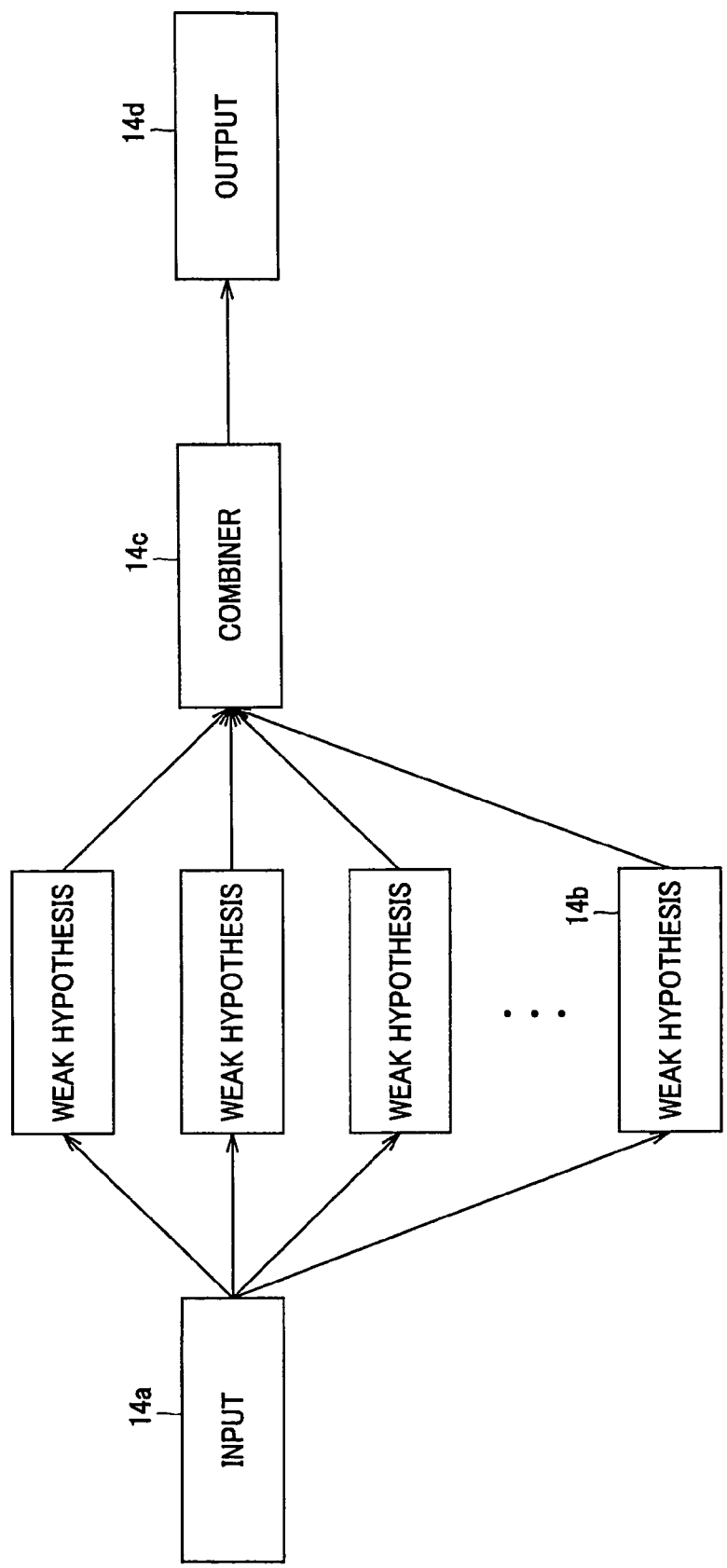
FIG. 5 is a block diagram schematically showing a learner acquired by ensemble learning.

The discriminator 14 as a learner acquired by ensemble learning has plural weak hypotheses (weak hypothesis units) 14b for extracting a feature quantity of an input image provided from an input unit 14a and outputting estimation values with respect to whether the input image is a detection target or not on the basis of the feature quantity, and a combiner 14c for combining the estimation values, which are outputs of these weak hypotheses 14b, as shown in FIG. 5. In the discriminator 14, an output unit 14d discriminates whether the input image is a detection target or not on the basis of the result of output from the combiner 14c. As described above, boosting requires the combiner 14c for integrating the outputs of the weak hypotheses by using fixed weighting irrespective of the input. In boosting, the distribution of learning samples is processed in such a manner that the weighting on difficult learning samples is increased using the result of learning of the previously generated weak hypotheses, and new weak hypotheses are learned on the basis of this distribution. Therefore, the weighting on learning samples that often become incorrect and therefore cannot be discriminated as detection targets is relatively increased, and weak hypotheses that cause the learning samples with large weighting, that is, the learning samples that are hard to discriminate, to be correct, are sequentially selected. That is, weak hypotheses are sequentially generated in learning and weak hypotheses generated later depend on previously generated weak hypotheses.

In detection, the results of detection based on the many weak hypotheses that are sequentially generated as described above and reliability (weighting) of discrimination performance of the weak hypotheses are multiplied and added, and the result of this multiplication and addition is used as a result of discrimination. For example, in the case of Adaboost, all the deterministic values outputted form weak hypotheses generated in this learning, that is, all the values of 1 for detection targets and −1 for non-detection targets, are supplied to the combiner 14c. The combiner 14c performs weighted addition of the reliability calculated for each of the corresponding weak hypotheses at the time of learning, and the output unit 14d outputs the result of a weighted vote based on the sum value. In accordance with whether this output is positive or negative, it is possible to determine an input image is a detection target or not. While the weak hypotheses may deterministically output whether an input image is a detection target or not as in Adaboost, an algorithm such as Gentleboost or Real Adaboost, which will be described later, can be used and weak hypotheses for probabilistically outputting the probability of being a detection target can be used to further improve the discrimination performance.

(3) Learning Method for Face Detection Apparatus

Now, a learning method by the learner 15 for providing the discriminator 14 as a final hypothesis formed by combining many appropriate weak hypotheses in accordance with a learning algorithm will be described. In the learning for the discriminator 14 for performing face detection, weak hypotheses for outputting estimation values indicating whether provided data is a face image or not are generated by using a learning data set including plural learning samples each of which has been labeled as a face image representing a detection target or a non-face image representing a non-detection target such as a scenery image. Data weighting is set for each learning sample, and when a weak hypothesis is generated, an error rate of the estimation value of the generated weak hypothesis with respect to the data set is calculated on the basis of the data weighting and the reliability of the weak hypothesis is calculated on the basis of this error rate. Then, the data weighting of learning samples on which the generated weak hypothesis made an error in estimation is updated so as to be relatively larger than the data weighting of correctly estimated learning samples. After the data weighting is thus updated, the processing to generate a weak hypothesis is repeated.

(3-1) Weak Hypothesis

As described above, in ensemble learning, one filter is selected from a learning model made up of a set of many filters, thereby generating a weak hypothesis. First, a filter to be used as a weak hypothesis used for face detection will be described. In this embodiment, as a learning model (set of weak hypotheses), filters (which will also be referred to as rectangle features) that output the difference between the sum of brightness values in one or plural rectangular boxes, of a rectangular box group including two or more rectangular boxes, and the sum of brightness values in the other rectangular boxes, are used. In this embodiment, weak hypotheses for outputting whether a provided image is a detection target or not are formed in accordance with the outputs of these filters. The filters are not limited to such rectangle features, and any filter can be used to form a weak hypothesis as long as it can form a weak hypothesis capable of discriminating whether an input image is a face image or non-face image at a certain probability when a data set is inputted.

Figure 6:
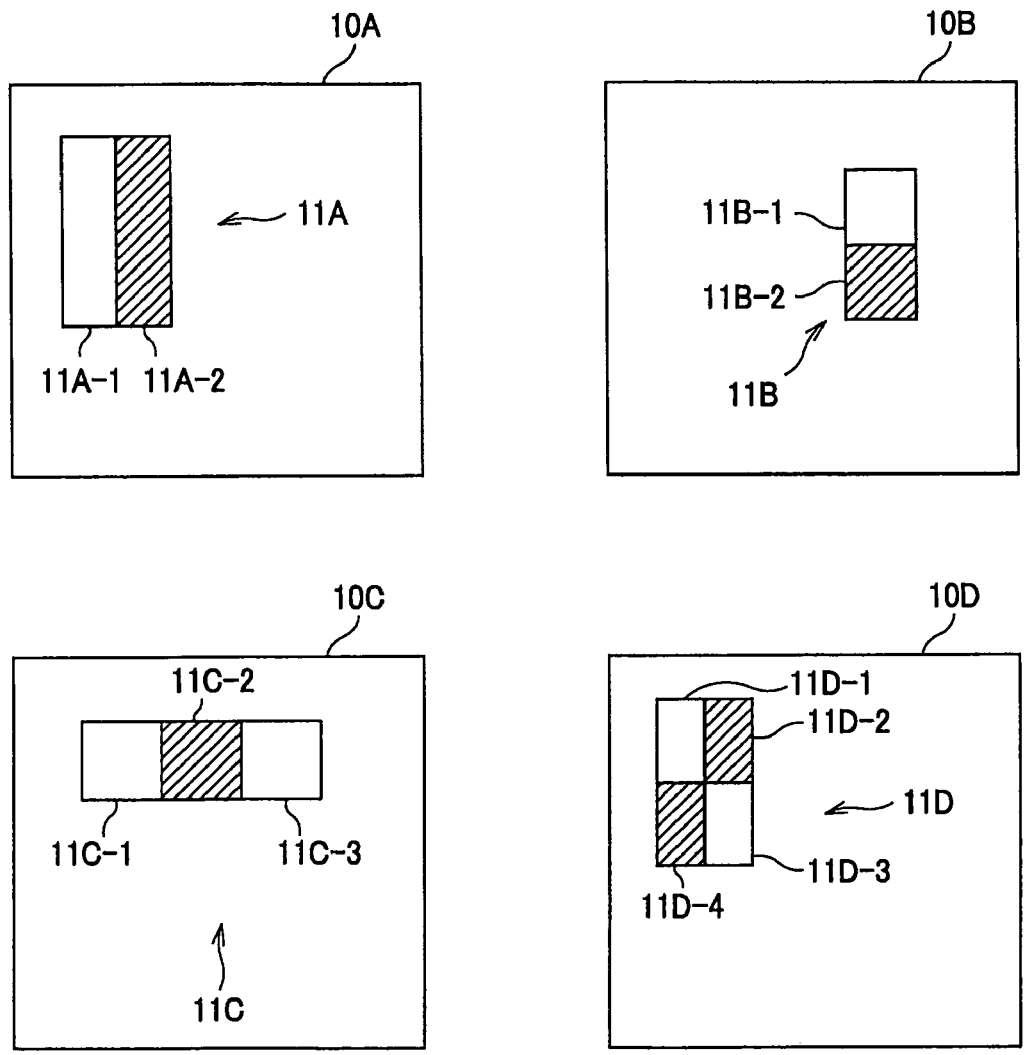
FIG. 6 is a schematic view showing rectangle features used in a face detection apparatus of the facial expression recognition system according to an embodiment of this invention.

FIG. 6 is a schematic view showing filters (rectangle features) used as weak hypotheses for face detection. To provide feature quantities for face detection, filters such as Haar basis functions are used. That is, plural filters are prepared, each of which outputs the difference between the sum of brightness values in one or plural rectangle boxes and the sum of brightness values in the other rectangle boxes of a group of two or more rectangular boxes of the same size in each of input images 10A to 10D. For example, in the input image 10A, a filter 11A is provided that subtracts the sum of brightness values in a shaded rectangular box 11A-2, of rectangular boxes 11A-1 and 11A-2 formed by horizontally bisecting one rectangular box, from the sum of brightness values in the rectangular box 11A-1. In the input image 10B, a filter 11B is provided that subtracts the sum of brightness values in a shaded rectangular box 11B-2, of rectangular boxes 11B-1 and 11B-2 formed by vertically bisecting one rectangular box, from the sum of brightness values in the rectangular box 11B-1. Such a filter including two rectangular boxes is called a two-rectangle feature. In the input image 10C, a filter 11C is provided that subtracts the sum of brightness values in a shaded central rectangular box 11C-2, of three rectangular boxes 11C-1 to 11C-3 formed by dividing one rectangular box into three boxes, from the sum of brightness values in the rectangular boxes 11C-1 and 11C-3. Such a filter including three rectangular boxes is called a three-rectangle feature. In the input image 10D, a filter 11D is provided that subtracts the sum of brightness values in shaded rectangular boxes 11D-2 and 11D-4, of four rectangular boxes 11D-1 to 11D-4 formed by vertically and horizontally dividing one rectangular box, from the sum of brightness values in the rectangular boxes 11D-1 and 11D-3 that are not adjacent to each other. Such a filter including four rectangular boxes is a called four-rectangle feature.

Figure 7:
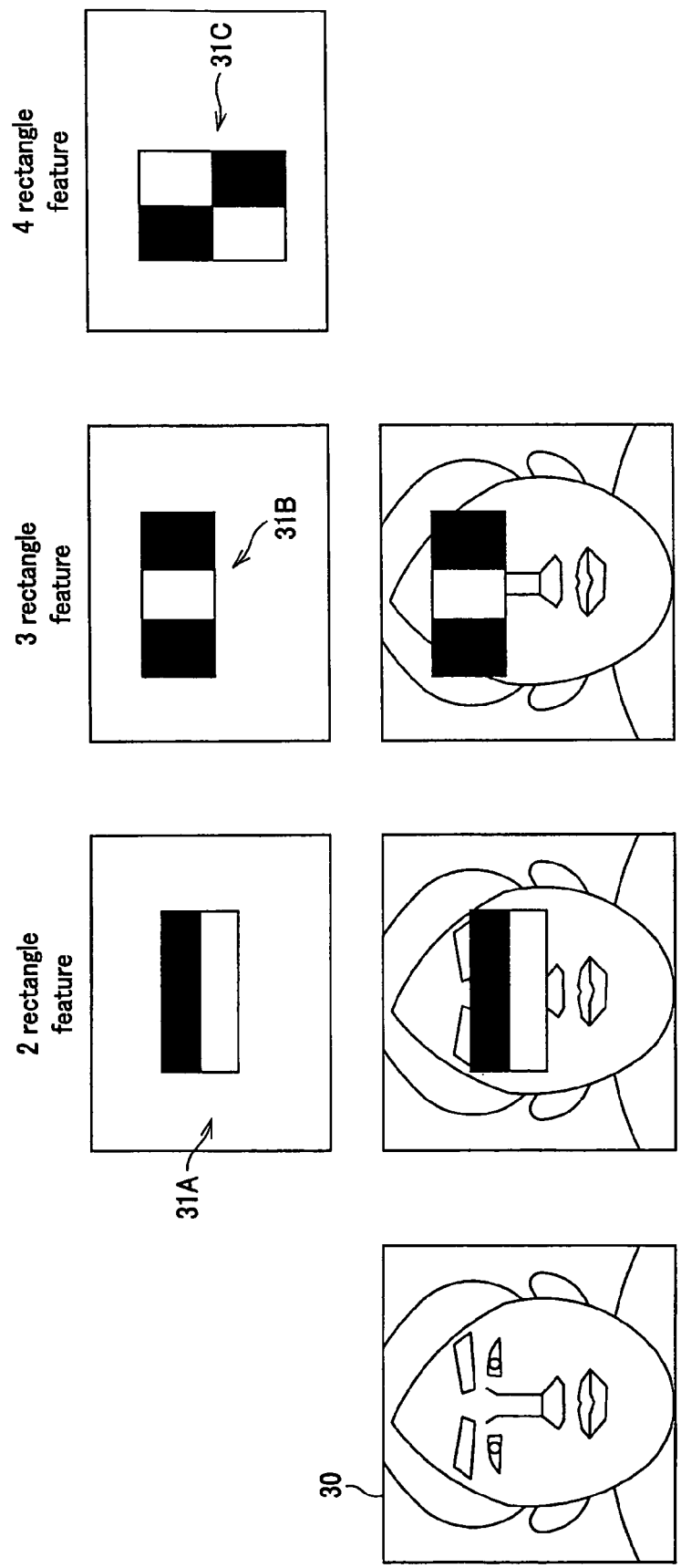
FIG. 7 is a view for explaining a method for detecting a face image using the rectangle features.

For example, a case of judging a face image 30 shown in FIG. 7 as a face image by using rectangle features as described above will be described. A two-rectangle feature 31A is a filter that subtracts the sum of brightness values in a shaded upper rectangular box 31A-2, of two rectangular boxes 31A-1 and 31A-2 formed by vertically bisecting one rectangular box, from the sum of brightness values in the lower rectangular box 31A-2. Utilizing the fact that the brightness value is lower in an eye area than in a cheek area of the human face image (detection target) 30, the rectangle feature 31A can be arranged over an area including the eyes and nose to estimate whether the input image is a face image or not (correct or incorrect) at a certain probability from an output value of the rectangle feature 31A.

A three-rectangle feature 31B is a filter that subtracts the sum of brightness values in left and right rectangular boxes 31B-1 and 31B-3 from the sum of brightness values in a central rectangular box 31B-2. As in the above-described case, utilizing the fact that the brightness value is higher in a nose area than in the areas of the eyes, the rectangle feature 31B can be arranged at the positions of the eyes to judge whether the input image is a face image or not to a certain extent from an output value of the rectangle feature 31B.

In this manner, there are various filters ranging from the filter that takes the difference between two rectangular boxes to the filter that takes the difference between four rectangular boxes such as the rectangle feature 31C. Also a filter including rectangular boxes of arbitrary position and arbitrary size (one or more pixels) can be selected. Even if the target area is limited to a 24×24-pixel area, there are 160,000 or more possible filters to be selected.

Figure 8A:
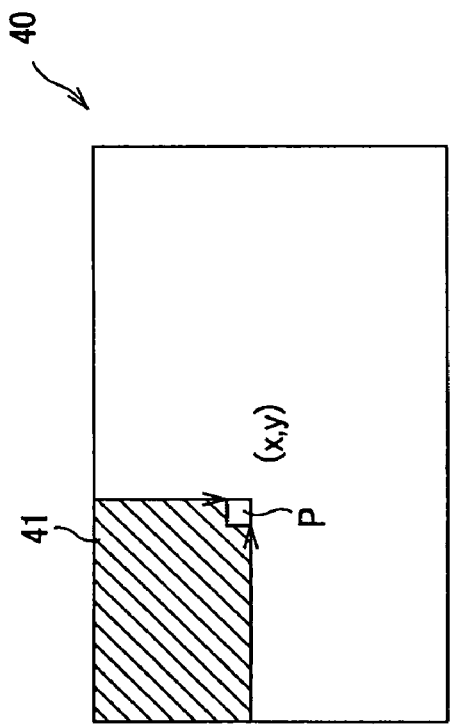
FIG. 8A is a schematic view showing an integral image.

First, images called integral images are used to calculate outputs of such filter at a high speed. An integral image is a image such that the value of a pixel P at (x, y) is the sum of brightness values of the pixels above and to the left of the pixel P in an image 40, as shown in FIG. 8A. That is, the value of the pixel P is the sum of brightness values of the pixels contained in an upper left rectangular box 41 above and to the left of the pixel P. Hereinafter, an image such that each pixel value is the value expressed by the following equation (1) is called an integral image.

$$I(x, y) = \sum_{x'<x, y'<y} S(x', y') \quad (1)$$

Figure 8B:
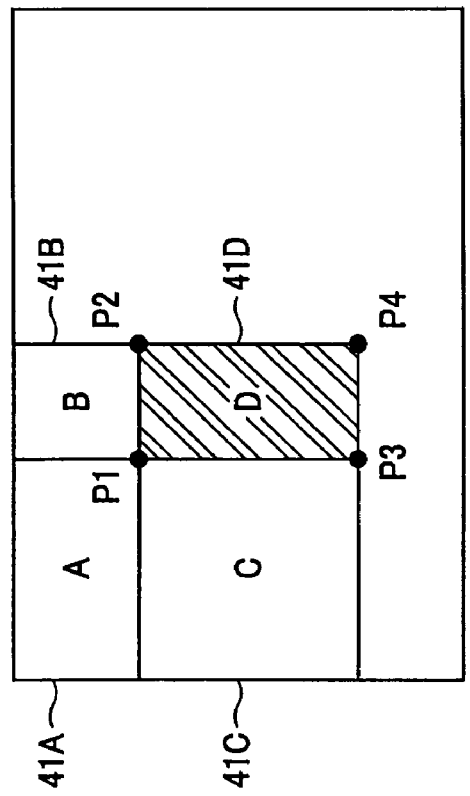
FIG. 8B is a view for explaining a method for calculating the sum of brightness values in a rectangular box, using an integral image.

As this integral image 40 is used, a rectangular box of an arbitrary size can be calculated at a high speed. That is, as shown in FIG. 8B, an upper left rectangular box 41A, a rectangular box 41B on the right side of the rectangular box 41A, a rectangular box 41C below the rectangular box 41A, and a rectangular box 41D below and to the right of the rectangular box 41A are provided, and the four vertexes of the rectangular box 41D are referred to P1, P2, P3 and P4 clockwise from the upper left vertex. In this case, the value at P1 is the sum A of brightness values in the rectangular box 41A (i.e., P1=A). The value at P2 is the sum B of A and brightness values in the rectangular box 41B (i.e., P2=A+B). The value at P3 is the sum B of A and brightness values in the rectangular box 41C (i.e., P3=A+C). The value at P4 is the sum D of A+B+C and brightness values in the rectangular box 41D (i.e., P4=A+B+C+D). The sum of brightness values in the rectangular box 41D can be calculated as P4−(P2+P3)−P1. By adding or subtracting the pixel values at the four corners of the rectangular box, it is possible to calculate the sum of brightness values in the rectangular box at a high speed.

As one of such filters is selected and the value in the case where a provided image is a face image is learned as a feature quantity from an output value acquired by filtering a learning data set, a weak hypothesis can be generated. A weak hypothesis in Adaboost, at the time of discrimination, compares the learned feature quantity with a value acquired by filtering a provided input image so as to output a binary value representing whether the provided input image is a face image (=1) or non-face image (=−1).

Alternatively, as outputs of weak hypotheses, by employing a boosting algorithm for selecting filters that realize minimum weighted square difference between output values (real values) of the filters and label values (1, −1) of samples, and their feature quantities, and adding the real values, instead of a weak hypothesis that deterministically outputs a binary value representing whether an input image is a face image or not as in Adaboost, it is possible to carry out more efficient learning. Such a boosting algorithm is called Gentleboost, which is described in, for example, J. Friedman, T, Hastie, and R. Tibshirani, "Additive logistic regression: A statistical view of boosting," ANNALS OF STATISTICS, 28(2): 337-374, 2000. There is another boosting algorithm called Real Adaboost for making probabilistic outputs as outputs of weak hypotheses, like Gentleboost.

Now, learning methods for the face detection apparatus using each of the algorithms Adaboost, Real Adaboost, and Gentleboost will be described. Prior to the explanation of these learning methods, an abort threshold value, which is characteristic data of data learned by the learner 15 in this embodiment, will be described first. An abort threshold value is a threshold value for aborting detection during the discrimination process (detection process), and is learned data that is not learned in normal boosting learning.

(3-2) Abort Threshold Value

In ensemble learning, normally, data provided by taking a weighted vote among outputs of all the weak hypotheses constituting the discriminator 14 is learned for the discriminator to discriminate whether an input is a detection target or not, as described above. The weighted vote is outputted as the result of comparison between a value (hereinafter referred to as sum value) acquired by adding the products of the result of discrimination (estimation value) of weak hypotheses and their reliability, and a discrimination boundary value. For example, when the number of weak hypotheses is t (=1, . . . , K), the weighting on a majority vote corresponding to each weak hypothesis (reliability) is at, and the output of each weak hypothesis is ht, the value (sum value) for taking a weighted vote in Adaboost can be calculated by the following equation (2). In this equation, x represents a learning sample. In this case, it is made up of the vectors of pixel values.

$$\text{Sum value}: \sum_t \alpha_t h_t(x) \quad (2)$$

Figure 9:
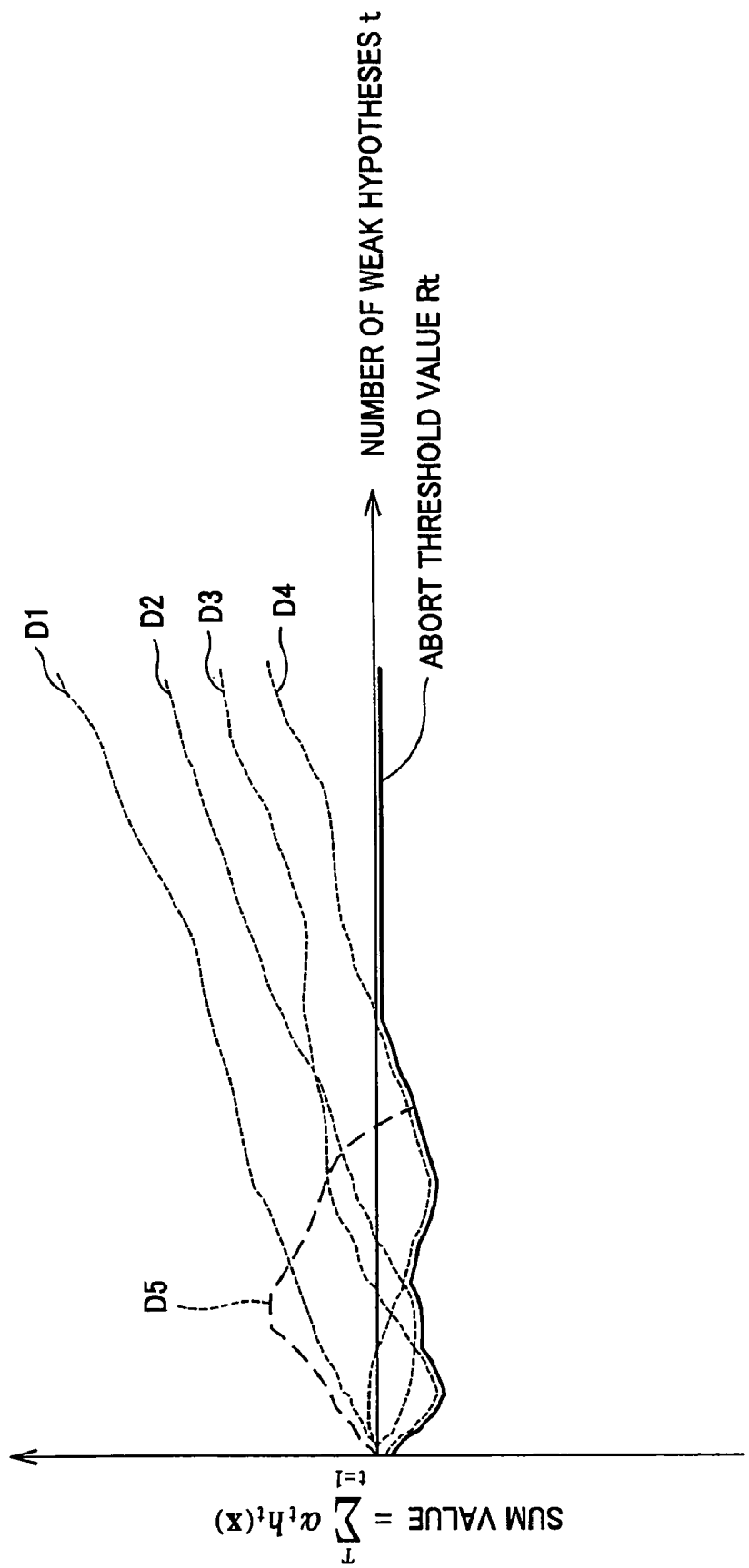
FIG. 9 is a graph with the horizontal axis representing the number of weak hypotheses t and the vertical axis representing a sum value obtained by multiplying weighting to outputs of the weak hypotheses and adding them, in which changes of the sum value in accordance with whether an inputted image is a face image or not and an abort threshold value are shown.

FIG. 9 is a graph showing changes corresponding to whether an inputted image is a detection target or not, with the horizontal axis representing the number of weak hypotheses and the vertical axis representing the value (sum value) for taking weighted vote expressed by the equation (2). In FIG. 9, for data D1 to D4 indicated by solid lines, estimation values ht(x) are sequentially calculated by weak hypotheses from images (learning samples) labeled as faces and are added. As these data D1 to D4 show, a value acquired by multiplying the estimation values ht(x) calculated by a certain number of weak hypotheses that take face images as input images by the reliability and then adding them, is positive. In Adaboost, this sum value is judged by using a discrimination boundary value 0, and if the sum value is positive, a result showing that an input is a detection target is outputted.

In this embodiment, a technique different from the normal boosting algorithm is used. Specifically, in the process of sequentially adding the results of discrimination by the weak hypotheses, if it can be discriminated that an input is obviously not a detection target, that is, not a face, discrimination of that window image is stopped even before the results of output of all the weak hypotheses are acquired. In this case, a value for deciding whether or not to stop the discrimination is learned in the learning process. Hereinafter, the value used for deciding whether or not to stop the discrimination is called the abort threshold value.

With this abort threshold value, when a non-face can be certainly estimated with respect to all the window images, the calculation of the estimation value ht(x) of the weak hypothesis can be stopped even if the results of output of all the weak hypotheses are not used. Therefore, the quantity of arithmetic operation can be significantly reduced, compared with the case of taking weighted vote using all the weak hypotheses.

As this abort threshold value, the smaller value of a minimum value that can be taken by the value of a weighted vote among the results of discrimination of learning samples (positive data) labeled as face, of the learning samples, and the discrimination boundary value, can be used. In the discrimination process, the outputs (estimation values ht(x)) from the weak hypotheses with respect to the window images are sequentially weighted and added, and the result is outputted. That is, this sum value is sequentially updated, and this updated value is compared with the abort threshold value every time an update is made, that is, every time one weak hypothesis outputs the estimation value. If the updated sum value is less than the abort threshold value, it can be decided that the window image is not a face image and the calculation of the weak hypothesis can be aborted. Therefore, redundant calculation can be omitted and the discrimination processing can be performed at a higher speed.

Specifically, an abort threshold value RK of an output hK(xi) of the K-th weak hypothesis is the smaller value of a minimum weighted vote value in the case where a learning sample (also referred to as positive sample or positive data) xj (=x1 to xJ), which is a face image, of learning samples xi (=x1 to xN), and the discrimination boundary value. It can be expressed by the following equation (3)

Abort threshold value:

$$R_K = \min\left(\sum_{t=1}^{K} \alpha_t h_t(x_1), \sum_{t=1}^{K} \alpha_t h_t(x_2), \ldots, \sum_{t=1}^{K} \alpha_t h_t(x_J), 0\right) \quad (3)$$

As shown in this equation (3), when the minimum value for taking a weighted vote of the learning samples x1 to xJ as detection targets is more than 0, 0 is set as the abort threshold value RK. 0 is not exceeded in the case of Adaboost for carrying out discrimination using a discrimination boundary value of 0. It depends on the technique of ensemble learning. In the case of Adaboost, the abort threshold value is set at the minimum possible values of the data D1 to D4 in the case where a face image as a detection target is inputted as an input image, as indicated by a bold line in FIG. 9. When the minimum values of all the data D1 to D4 exceed 0, the abort threshold value is set at 0.

In this embodiment, as the abort threshold value Rt (R1 to RT where the number of weak hypotheses to be generated is T) is learned every time a weak hypothesis is generated, estimation values are sequentially outputted by the plural weak hypotheses and a value acquired by adding these values is sequentially updated in the discrimination process, which will be described later. For example, as in the case of data D5, the discrimination processing by the subsequent weak hypothesis can be ended when the value acquired by sequentially adding values becomes lower than the abort threshold value. That is, by learning this abort threshold value Rt in advance, it is possible to decide whether or not to calculate the next weak hypothesis every time the estimation value of a weak hypothesis is calculated. When an input is obviously not a detection target, it can be judged that an input is a non-detection target without waiting for the results of discrimination of all the weak hypotheses. As the arithmetic operation is thus aborted, high-speed detection processing can be realized.

In the following description, the abort threshold value for aborting the processing on the basis of a judgment that a provided image is obviously not a detection target at the time of detection will be described. However, an abort threshold value for aborting the processing on the basis of a judgment that a provided image is obviously a detection target may be learned similarly. In this case, a larger value of a maximum possible value of weighted vote value among the results of discrimination of learning samples (also referred to as negative samples or negative data) labeled as non-face image, of learning samples, and a discrimination boundary value, can be used as the abort threshold value. In the detection processing, a sum value acquired by sequentially adding products of outputs of weak hypotheses and their reliability is compared with the abort threshold value, and when the sum value is larger than the abort threshold value, it is possible to judge that the image that is now being judged is obviously a face image and to end the discrimination processing.

(3-3) Structure of Learner

Figure 10:
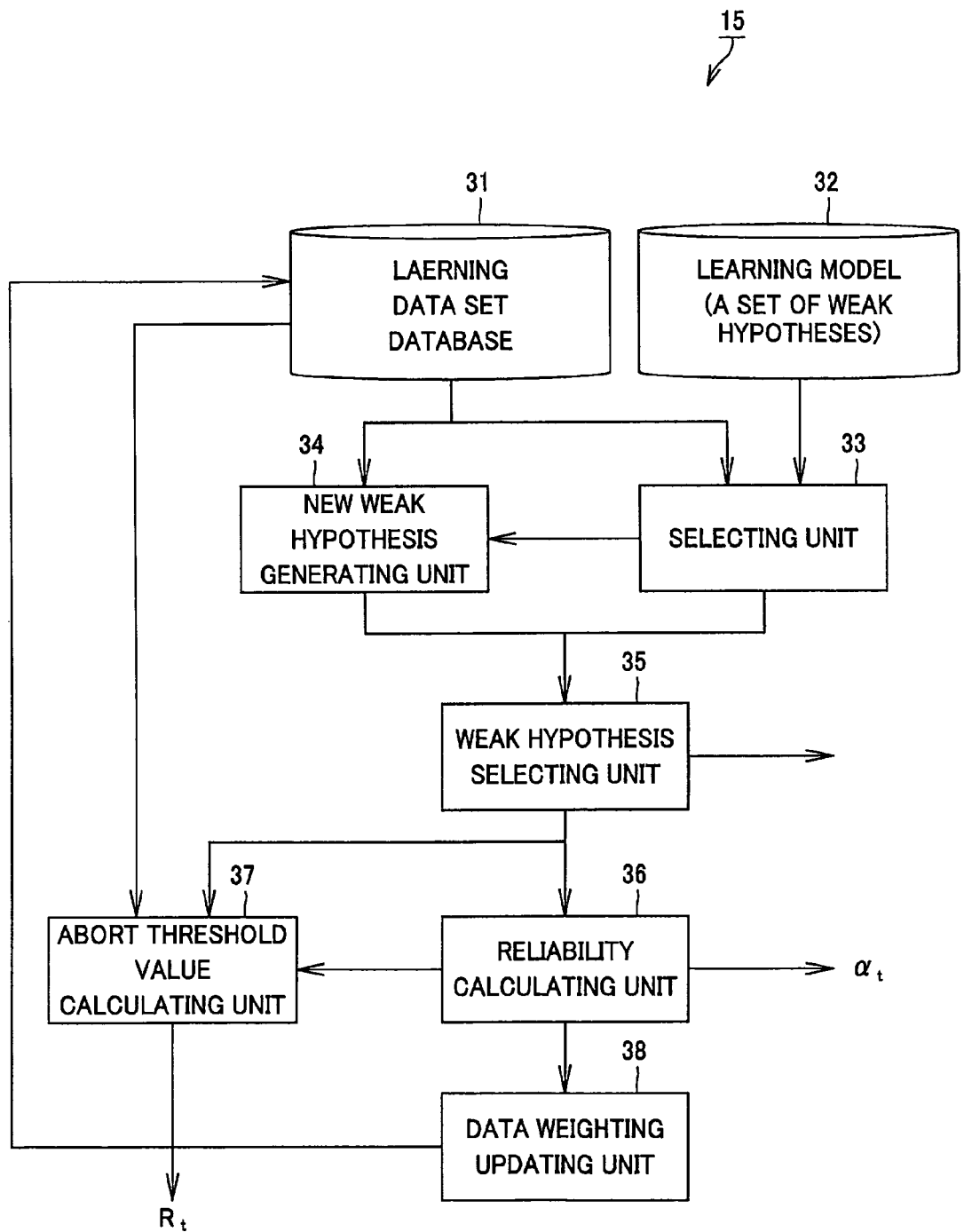
FIG. 10 is a functional block diagram showing a learner in the face detection apparatus of the facial expression recognition system according to an embodiment of this invention.

First, the structure of the learner 15 will be described. FIG. 10 is a functional block diagram showing the learner 15. As shown in FIG. 10, the learner 15 has a database 31 in which a learning data set is stored, a selecting unit 33 for selecting a desired number of weak hypotheses from a learning model 32 made up of a set of many filters, a new weak hypothesis generating unit 34 for generating a new weak hypothesis by using weak hypotheses outputted from the selecting unit 33, and a weak hypothesis selecting unit 35 for selecting one weak hypothesis having the highest discrimination performance from the weak hypotheses selected by the selecting unit 33 and the new hypothesis generated by the new weak hypothesis generating unit 34. These units constitute a weak hypothesis generation apparatus. The learner 15 also has a reliability calculating unit 36 for calculating reliability representing the discrimination performance of the weak hypothesis generated by the selection by the weak hypothesis selecting unit 35, an abort threshold value calculating unit 37 as an abort threshold value learning unit for calculating an abort threshold value to decide whether or not to abort estimation value calculation processing when the discriminator 14 performs discrimination, and a data weighting updating unit 38 for updating data weighting on each learning sample in the learning data set on the basis of the result of reliability calculation. When the data weighting on each learning sample included in the learning data set 31 is updated by the data weighting updating unit 38, the weak hypothesis generation apparatus executes the processing to generate a next weak hypothesis. The repetitive processing to update the data weighting on the learning data set and generate a weak hypothesis by the weak hypothesis generation apparatus is repeated until a final hypothesis having discrimination capability that is required by the system is acquired.

The learning data set stored in the database 31 includes a group of images formed by cutting out areas representing detection targets (in this embodiment, a face image group), and a group of random images formed by cutting out images of non-detection targets such as scenery images.

The selecting unit 33 can select weak hypotheses from the learning model at a predetermined rate, for example, approximately 5%, and output these selected weak hypotheses to the new weak hypothesis generating unit 34 and the weak hypothesis selecting unit 35. However, if the selecting unit 33 selects one or plural weak hypotheses having high discrimination performance as high-performance weak hypotheses from these hypotheses and outputs them to the new weak hypothesis generating unit 34 and the weak hypothesis selecting unit 35, a weak hypothesis having higher discrimination performance can be generated. The weak hypothesis selecting unit 35 first selects one filter from the learning model and learns the feature quantity of the filter by using the learning data set. That is, as a feature quantity that minimizes the discrimination error when the learning data set is discriminated is learned, a weak hypothesis is generated. In the case where weak hypotheses output binary values as the results of estimation, the feature quantity to be learned is a discrimination threshold. This processing is repeated for the number of times corresponding to the number of selected filters so as to generate weak hypotheses, and one or more weak hypotheses having a lower error rate are selected from the generated weak hypotheses, as high-performance weak hypotheses.

The new weak hypothesis generating unit 34 adds a predetermined modification to the filters (high-performance filters) employed for the weak hypotheses outputted from the selecting unit 33, for example, high-performance weak hypotheses, and thus generates one or more subtypes of the high-performance filters. The new weak hypothesis generating unit 34 then learns their feature quantities by using the learning data set so as to generate a new weak hypothesis, and outputs it to the weak hypothesis selecting unit 35.

The abort threshold value calculating unit 37, if the present repetition is the t-th time, multiplies the reliability calculated by the reliability calculating unit 36, by the result of estimation of positive data included in the learning data set by the weak hypothesis selected by the weak hypothesis selecting unit 35, then adds the result of multiplication to the abort threshold value learned in the previous repetitive processing ((t−1)th repetition), and takes the resulting value as an abort threshold value in the t-th repetition.

The data weighting updating unit 38 processes distribution followed by the learning samples in such a manner that the weighting on difficult learning samples is increased using the result of learning of the previously generated weak hypotheses, as described above. Therefore, the weighting on learning samples that often become incorrect and therefore cannot be discriminated as detection targets is relatively increased.

As new weak hypotheses are learned in this manner on the basis of the distribution of the updated data weighting until a final hypothesis is acquired by boosting, weak hypotheses that cause the learning samples with large weighting, that is, the learning samples that are hard to discriminate, to be correct, are sequentially generated.

In the learner 15, the weak hypothesis generated by the weak hypothesis selecting unit 35 is outputted as the result of the t-th repetitive learning, and its reliability is calculated by the reliability calculating unit 36. The abort threshold value is outputted from the abort threshold value calculating unit 37. These data are saved and used by the discriminator 14 at the time of discrimination. Specifically, in the case of using the above-described rectangle features for filters, the data outputted from the weak hypothesis selecting unit 35 are the positions and sizes of the group of rectangular boxes constituting the rectangle features, and the feature quantities acquired when subtracting, from the sum of brightness values in one or plural rectangular boxes, the sum of brightness values in the other rectangular boxes.

(3-4) Adaboost Algorithm

Now, the learning methods for the discriminator 14 by the above-described learner 15 will be described. First, a learning method according to the Adaboost algorithm will be described. The above-described learning data set including plural training data that have been manually labeled in advance is prepared as a premise of a pattern recognition problem based on typical two-class discrimination such as a problem of discriminating whether provided data is a face or not.

The learning algorithm is applied on the basis of the learning data set, thus generating learned data to be used for discrimination. In this embodiment, the learned data to be used for discrimination are the following four types of learned data including the above-described abort threshold value:

(A) weak hypotheses (T units);
(B) threshold values of weak hypotheses (T units);
(C) weighting of weighted vote (reliability of weak hypotheses) (T units); and
(D) abort threshold values (T units).

(3-4-1) Learning for Discriminator 14

Figure 11:
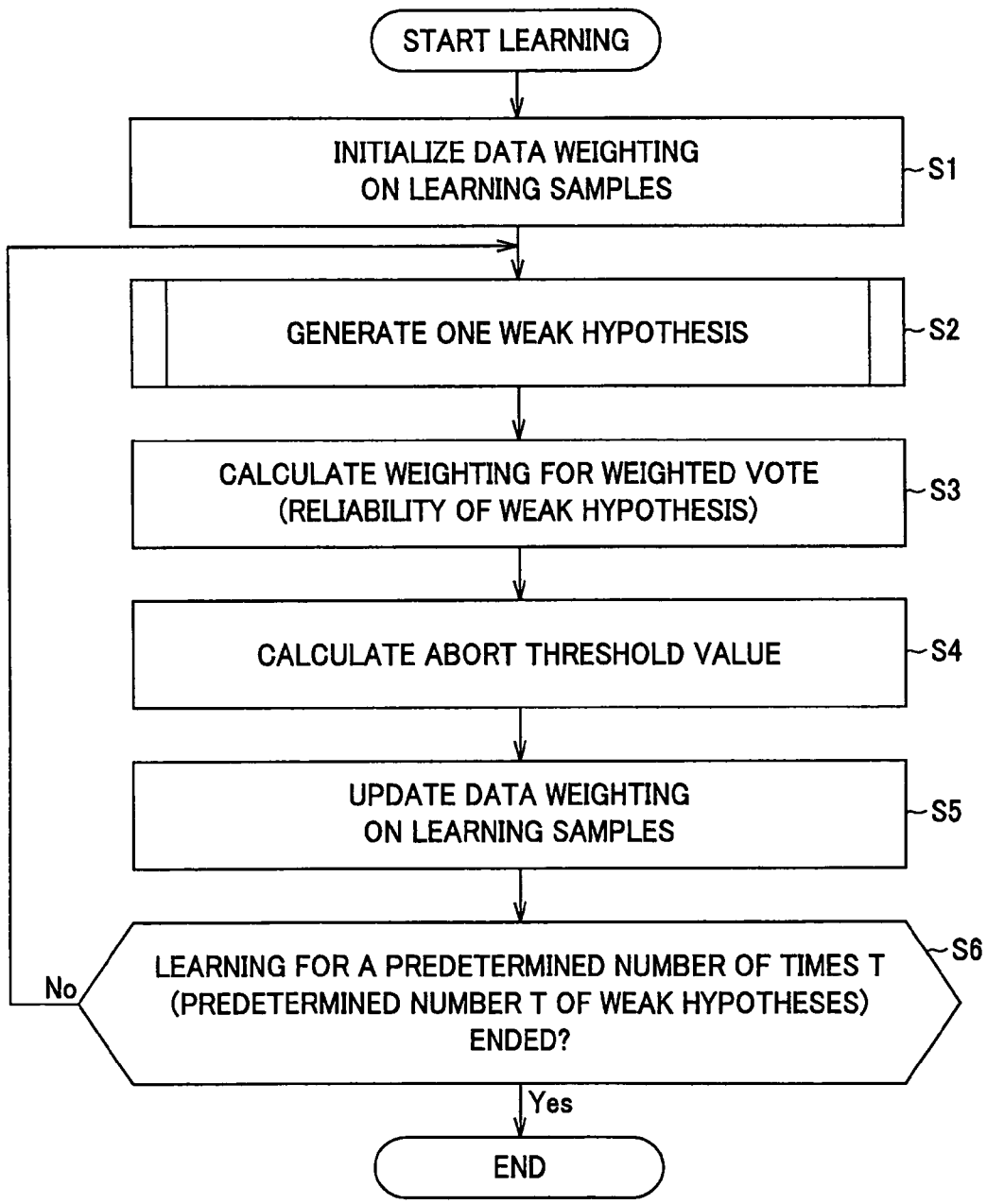
FIG. 11 is a flowchart showing a learning method for a discriminator in the face detection apparatus of the facial expression recognition system according to an embodiment of this invention.

Hereinafter, algorithms for learning the above-described four types of learned data (A) to (D) from many learning samples as described above will be described. FIG. 11 is a flowchart showing a method for learning data for the discriminator.

Procedure 0: Labeling of Learning Samples

As described above, i=N learning samples (xi, yi) are prepared, each of which has been labeled in advance as a detection target or non-detection target.

In the learning samples $(x_i, y_i):(x_1, y_1), \ldots, (x_N, y_N)$, $x_i \in X$ and $y_i \in \{-1, 1\}$ hold. X represents the data of a learning sample. Y represents the label (correct) of a learning sample. N represents the number of learning samples. That is, xi represents a feature vector constituted by all the brightness values in a learning sample image. yi=−1 represents a case where a learning sample has been labeled as a non-detection target. yi=1 represents a case where a learning sample has been labeled as a detection target.

Procedure 1) Initialization of Data Weighting

In boosting, weighting (data weighting) on the individual learning samples are varied and the data weighting on a learning sample that is difficult to discriminate is relatively increased. The result of discrimination is used for calculating an error rate for evaluating weak hypotheses. As the result of discrimination is multiplied by the data weighting, a weak hypothesis that makes an error in discriminating a more difficult learning sample is evaluated as having a discrimination rate lower than the actual discrimination rate. The data weighting is sequentially updated in this manner. First, the data weighting on the learning samples is initialized. The initialization of the data weighting on the learning samples is carried out as the data weighting updating unit 38 makes even distribution of the weighting on all the learning samples. It is defined by the following equation (4) (step S1).

$$\text{Initialization of data weighting: } D_1(i) = \frac{1}{N} \quad (4)$$

In this equation, data weighting $D1(i)$ on the learning samples represents data weighting on learning samples xi (=xi to xN) of the first repetition (the number of repetitions t=1), and N represents the number of samples.

Procedure 2) Repetitive Processing

Next, as the following processing of steps S2 to S6 is repeated, weak hypotheses are sequentially generated and data for the discriminator are learned. The number of repetitions is expressed by t=1, 2, ..., T. Every time the repetitive processing is carried out once, one weak hypothesis, that is, one filter, and a feature quantity for discriminating data provided as an input on the basis of its filter output, are learned. Therefore, weak hypotheses corresponding to the number of repetitions (T) are generated, and a discriminator made up of T weak hypotheses is generated. As the repetitive processing is carried out several hundred to several thousand times, several hundred to several thousand weak hypotheses are generated. The number of repetitions (i.e., number of weak hypotheses) t may be suitably set in accordance with the required discrimination performance and the problem (detection target) to be discriminated.

First, weak hypotheses are generated by the weak hypothesis generation apparatus (step S2). In this case, a filter that minimizes a weighted error rate εt expressed by the following equation (5) is learned from filters selected and generated by a method that will be described later.

$$\text{Weighted error rate: } \varepsilon_t = \sum_{i: h_t(x_i) \neq y_i} D_t(i) \quad (5)$$

As shown in the equation (5), the weighted error rate εt is the sum of only the data weighting Dt on learning samples such that the result of discrimination by the weak hypothesis is an error (ht(xi)≠yi), of the learning samples. If an error is made in the discrimination of a learning sample having larger data weighting (more difficult to discriminate), the weighted error rate εt is increased.

Then, the reliability calculating unit 36 calculates weighting αt for taking a weighted vote in accordance with the following equation (6) on the basis of the weighted error rate εt expressed by the equation (5) of the weak hypotheses generated by learning (step S3). The weighting αt for a weighted vote indicates discrimination performance of a weak hypothesis learned in the t-th repetitive processing. Hereinafter, the weighting set for each weak hypothesis for calculating weighted vote is called reliability.

$$\text{Reliability: } \alpha_t = \frac{1}{2} \ln\left(\frac{1 - \varepsilon_t}{\varepsilon_t}\right) \quad (6)$$

As expressed by the equation (6), the lower the weighted error rate εt is, the higher the reliability αt of the weak hypothesis is.

Next, unlike learning based on ordinary Adaboost, the abort threshold value calculating unit 37 calculates an abort threshold value Rt for aborting discrimination in the discrimination process (step S4). As the abort threshold value Rt, the smaller value of a sum value of learning samples as detection targets (positive learning samples) x1 to xJ and a discrimination boundary value 0 is selected. As described above, in the case of Adaboost where discrimination is carried out using 0 as a discrimination boundary value, a minimum value or 0 is set as the abort threshold value. The abort threshold value Rt is set to be a maximum value that at least all the positive learning samples can pass.

Then, using the reliability αt acquired by the equation (6), the data weighting updating unit 38 updates the data weighting Dt(i) on the learning samples, using the following equation (7). Zt is for normalizing the data weighting.

$$\text{Data weighting: } D_{t+1}(i) = \frac{D_t(i)\exp(-\alpha_i y_i h_t(x_i))}{Z_t} \quad (7)$$

where $Z_t$ is a normalization factor to achieve ... $\sum_{i=1}^{N} D_{t+1}(i) = 1$ $$Z_t = \sum_{i=1}^{N} D_t(i)\exp(-\alpha_i y_i h_t(x_i))$$

At step S7, whether or not boosting has been carried out a predetermined number of times (=T times) is judged. If not, the processing of steps S2 to S7 is repeated. If learning has been done the predetermined number of times, the learning processing ends. For example, using a final hypothesis at that point, made up of all the generated weak hypotheses, the processing may be repeated until the learning data set can be discriminated with desired performance. It is also possible to prepare an evaluation data set, which is different from the learning data set used for generating weak hypotheses, and to evaluate the discrimination performance of the final hypothesis by using the evaluation data set. It is also possible to evaluate the final hypothesis by cross validation of carrying out learning with the learning data set from which one sample is excluded and then repeating processing of evaluation with the excluded one sample for the number of samples, or dividing the learning data set into a predetermined number of groups, then carrying out learning with the learning samples from which one group is excluded, and repeating processing of evaluation with the excluded one group for the number of groups.

Procedure 3) Generation of Final Hypothesis (Discriminator)

A final hypothesis, which is to be the discriminator 14, is acquired by taking a weighted vote among all the hypotheses using their reliability. That is, the outputs of the weak hypotheses generated at step S2 are multiplied by the reliability calculated at step S4, and the discriminator 14 for judging the sign of the value (sum value) for taking the weighted vote expressed by the equation (2), in accordance with the following equation (8), is generated. The discriminator 14 thus acquired outputs whether an input is a face or non-face, using a discrimination function H expressed by the following equation (8). If the discrimination function H is positive, the input is a face. If it is negative, the input is a non-face.

$$H(x) = \text{sgn}\left(\sum_{t=1}^{T} \alpha_t h_t(x)\right) \quad (8)$$

(3-4-2) Generation of Weak Hypotheses

Figure 12:
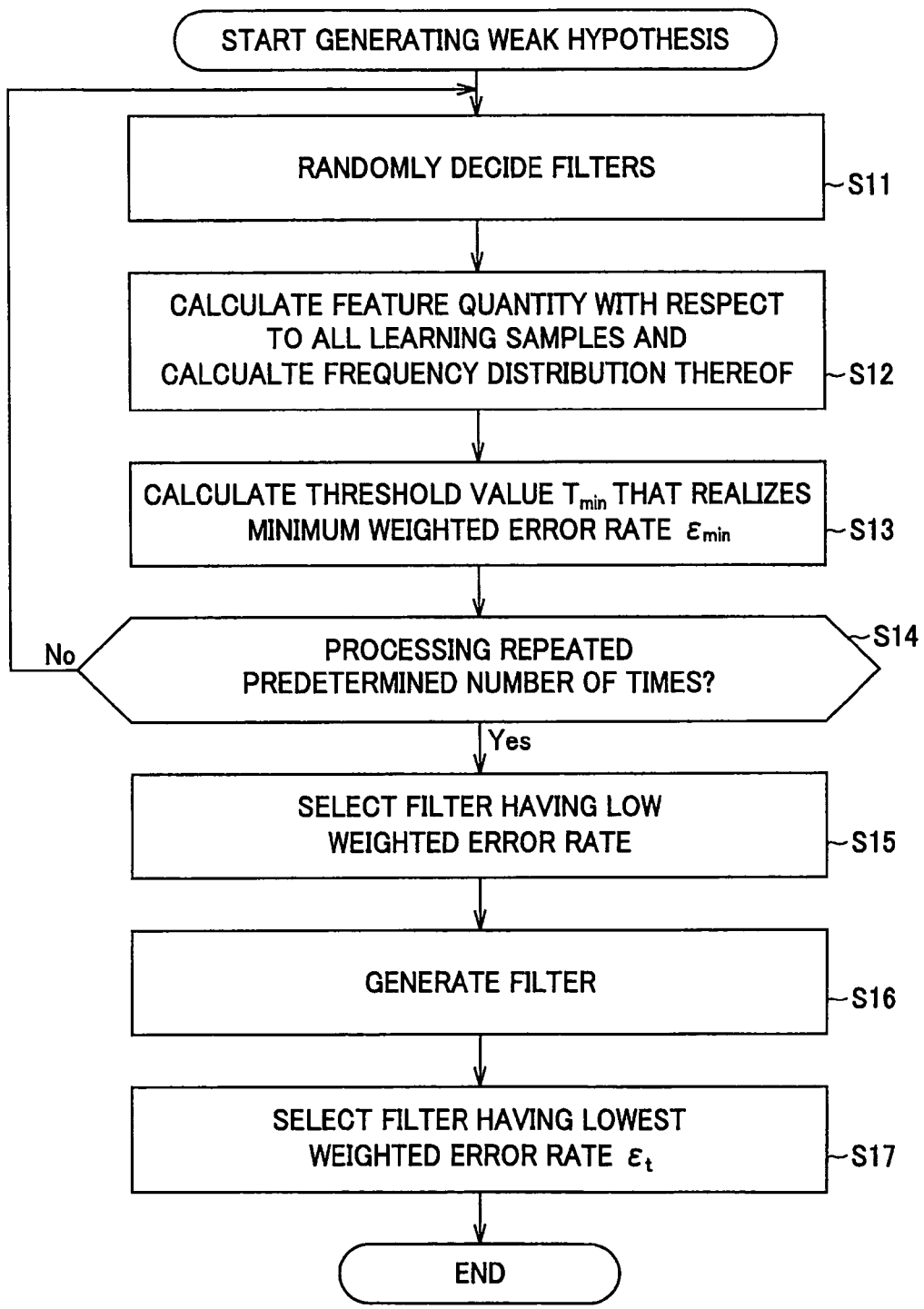
FIG. 12 is a flowchart showing a weak hypothesis generation method in the face detection apparatus of the facial expression recognition system according to an embodiment of this invention.

Next, the method for generating a weak hypothesis at the above-described step S2 (learning method) will be described. FIG. 12 is a flowchart showing a weak hypothesis generation method. In the generation of a weak hypothesis in this embodiment, first, a part of plural weak hypotheses is selected, and from this selected part, a weak hypothesis having the minimum error rate or plural weak hypotheses having low error rates in estimating or discriminating the data set (hereinafter referred to as high-performance weak hypotheses) are selected. Then, one or more new weak hypotheses formed by adding a predetermined modification to the high-performance weak hypotheses are generated. From the high-performance weak hypotheses and the new weak hypotheses, a weak hypothesis having the minimum error rate in the data set estimation value is selected as a weak hypothesis. This enables high-speed generation of a weak hypothesis. This method for generating a weak hypothesis will now be described in detail.

As described above, even when a target area (window image) is limited to a 24×24-pixel area, there are 160,000 or more possible filters to be selected, depending on the number of pixels constituting the filter (size of filter) and the type of the filter such as two-, three- or four-rectangle feature. As a method for selecting one of these 160,000 filters, for example, it is possible to learn the feature quantities of all the filters and select a filter having the highest discrimination performance. However, a very large quantity of calculation is required and it is very time-consuming even when the above-described integral images are used. Thus, in this embodiment, first, a predetermined computable number of filters, for example, approximately 5%, of all the filters are randomly selected by the selecting unit 33 shown in FIG. 10, and approximately 5% of all the weak hypotheses that can be generated are generated. For this, the following processing of steps S11 to S14 is repeated a predetermined number of times (hereinafter, M times), thus generating the predetermined number of weak hypotheses.

First, an arbitrary filter is selected from all the possible filters as described above (step S11).

Next, output values by the filter selected at step S11 with respect to all the learning samples are calculated, and their histogram (frequency distribution) is found (step S12).

Since a weak hypothesis based on Adaboost is to perform weak discrimination with a feature quantity bisected by a threshold value, a threshold value that minimizes the weighted error rate εt expressed by the equation (5) is searched for. That is, a threshold value Thmin that minimizes the weighted error rate εt (εmin) is calculated from the frequency distribution found at step S12 (step S13).

As the threshold value Thmin, in a histogram with the horizontal axis representing the filter output and the vertical axis representing the frequency, a search value may be shifted in the direction of the horizontal axis representing the filter output so as to find a value that minimizes the weighted error rate εt expressed by the equation (5). The weighted error rate εt is the smaller one of the correct answer rate and the incorrect answer rate of all the answers. In the case where the search value is changed, the sum of weighted count values of positive samples for which answers are correct, and the sum of weighted count values of negative samples for which answers are correct, increase or decrease by the amount of shifted search value. Therefore, it is not necessary to re-calculate the sum of weighted count values of all the positive samples and the sum of weighted count values of all the negative samples with respect to each search value, and high-speed calculation can be realized.

Then, whether the processing has been repeated the predetermined number of times (=M times) or not is judged (step S14). The processing from step S11 is repeated until the predetermined number of times is reached.

Conventionally, it is necessary to select a filter having the minimum weighted error rate εt, acquired from the data weighting Dt(i) on the learning samples at that point, for example, by repeating the processing of steps S11 to S14 for all the types of filters. In this embodiment, however, the repetitive processing of steps S11 to S14 is carried out, for example, for approximately 5% of all the selectable filters, as described above. To generate weak hypotheses having high performance without trying all the filters, the new weak hypothesis generating unit 34 executes the following processing of steps S15 to S17.

First, at step S15, one or plural weak hypotheses having a lower weighted error rate εt, that is, weak hypotheses having high discrimination performance with respect to the data set, are selected from the M weak hypotheses generated by the repetitive processing of steps S11 to S14 repeated M times. The selected weak hypotheses are hereinafter called high-performance weak hypotheses.

Next, a predetermined modification is added to the filters having the lower error rate used for high-performance weak hypotheses (hereinafter referred to as high-performance filters), thus generating a new filter or new filters (step S16). This new filter can be generated in accordance with a statistical characteristics or a genetic algorithm of the detection target. Specifically, the position of a high-performance filter is shifted, for example, by approximately two pixels in the vertical direction and/or the horizontal direction, thus generating a new filter. Alternatively, the scale of a high-performance filter is enlarged or contracted by approximately two pixels in the vertical direction and/or the horizontal direction, thus generating a new filter. Also, a high-performance filter is inverted with respect to a vertical line passing through a center point in the horizontal direction of an image, thus generating a new filter, or a composite filter made up of the high-performance filter and the inverted filter is used as a new filter. These methods are suitably combined to generate one or more new filters for each high-performance filter.

Figure 13:
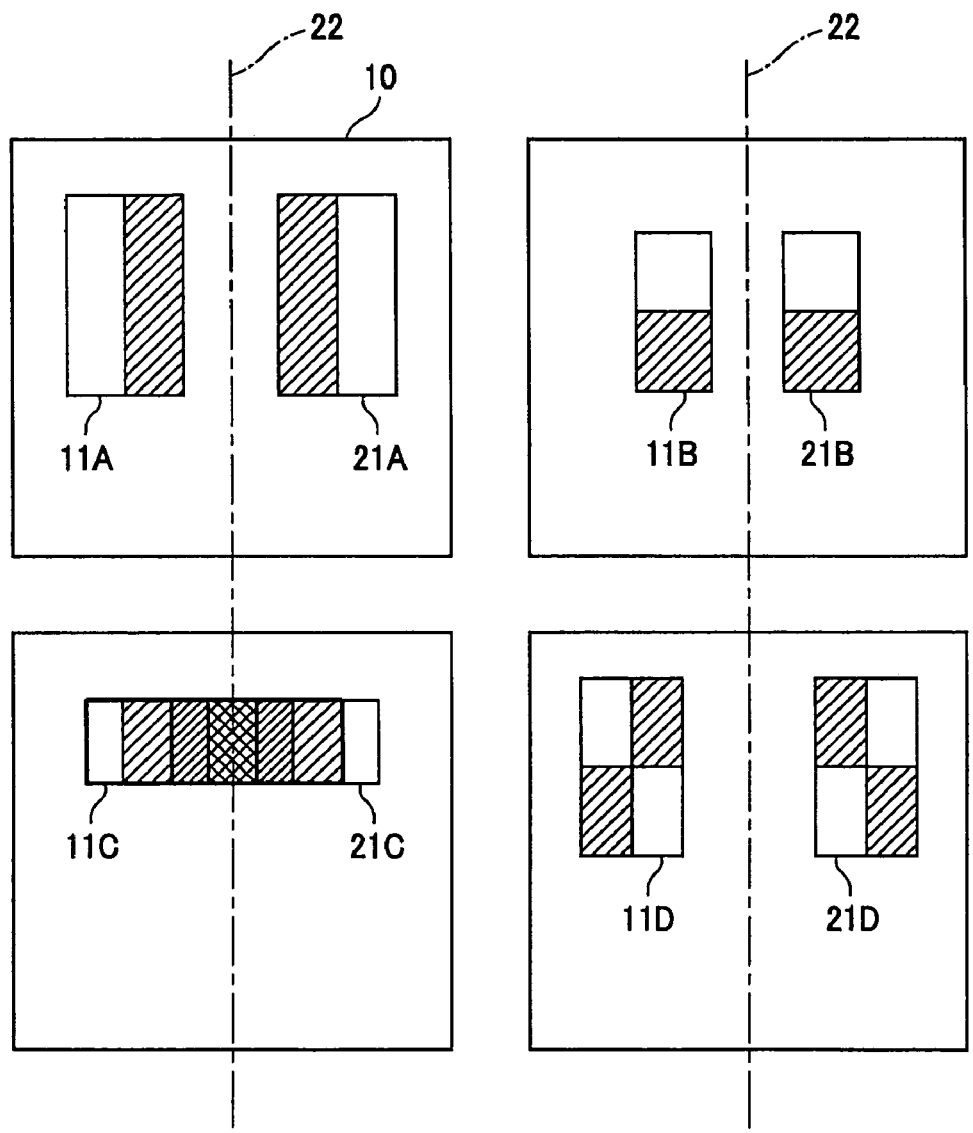
FIG. 13 is a schematic view showing examples of filters to be generated in a learning process for the face detection apparatus of the facial expression recognition system according to an embodiment of this invention.

FIG. 13 is a schematic view showing inverted filters utilizing symmetry, as new filters. Rectangle features 21A to 21D shown in FIG. 13 are formed by inverting the rectangle features 11A to 11D shown in FIG. 6 with respect to a vertical bisector 22 passing through the center in the horizontal direction (x-direction) of an image. That is, the rectangle features 11A to 11D and the rectangle features 21A to 21D are linearly symmetrical with respect to the vertical bisector 22. This utilizes the fact that since a human face is almost symmetrical on the left and right sides, there is a high possibility that a new filter generated by inverting a filter selected as having high face detection performance should be a filter having high performance. As the new filters are thus generated on the basis of the statistical characteristics of a face as a detection target or in accordance with the genetic algorithm from the high-performance filters selected as having high-performance from the part of all the filter that has been tried for performance, the generated filter can be estimated to have high discrimination performance similar to that of the selected high-performance filters. In FIG. 13, for example, in the case where the high-performance filter is the rectangle feature 11A and the inverted filter is the rectangle feature 21A, two types of new filters can be generated, that is, the inverted rectangle feature 21A, and a filter made up of the rectangle feature 11A and the inverted feature 21A.

Then, the weak hypothesis selecting unit 35 shown in FIG. 10 selects one filter that minimizes the weighted error rate $\epsilon t$, from the mixture of the high-performance filters and the generated new filters, and employs the selected one filter as a weak hypothesis (step S17). As the filter having the highest discrimination performance is selected from the mixture of the new filters and the original high-performance filters and is employed as a weak hypothesis, the filter having high discrimination performance as in the case of searching for such a filter from all the filters can be selected without searching for the filter having the highest discrimination performance from all the filters, and the processing speed in filter selection can be significantly improved.

(3-5) Real Adaboost Algorithm

Now, the Real Adaboost algorithm will be described. Also in Real Adaboost, the same procedures 0 and 1 as in Adaboost are carried out. A learning data set is prepared and data weighting on each learning sample is first initialized (i.e., evenly distributed) in accordance with the equation (4).

Procedure 2) Repetitive Processing

Next, the following processing is repeated to sequentially generate weak hypotheses, and data for the discriminator 14 is learned. Similar to Adaboost, the number of repetitions is t=1, 2, . . . , T.

First, a weak hypothesis is generated by the weak hypothesis generation apparatus. This generation method is basically similar to the above-described generation method in Adaboost. However, since a weak hypothesis is generated so as to output probability density based on data weighting Dt (data weighting distribution), the probability density Pm(x) of feature quantity expressed by the following equation (9) is calculated. The probability Pm(x) represents the correct answer rate with respect to samples (y=1) labeled as faces of all the learning samples, with the data weighting Dt.

$$p_m(x) = \hat{P}_D(y=1|x) \in [0,1] \quad (9)$$

Then, the reliability calculating unit 36 calculates the quantity of contribution fm of a weak hypothesis expressed by the following equation (10) instead of the above-described reliability $\alpha$.

$$\text{Quantity of contribution: } f_m(x) \leftarrow \frac{1}{2}\log\frac{p_m(x)}{1 - p_m(x)} \in R \quad (10)$$

R represents a set of real-number values.

This algorithm is different from Adaboost in that the weak hypothesis outputs the quantity of contribution fm indicating the probability density, instead of the deterministic binary output. However, in the generation of the weak hypothesis, the selecting unit 33 selects one or several filters having a large quantity of contribution fm of weak hypothesis expressed by the equation (10) from a part of filters on the basis of the data distribution Dt, the new weak hypothesis generating unit 34 then generates a new filter in accordance with statistical characteristics or genetic algorithm of a detection target (in this embodiment, a human face), and the weak hypothesis selecting unit 35 selects a filter having the highest discrimination performance from them. This is similar to the above-described technique. Therefore, the weak hypothesis generation processing can be carried out at a higher speed without lowering the discrimination performance.

Next, the abort threshold value calculating unit 37 calculates an abort threshold value Rt for aborting discrimination in the discrimination process, as described above. As the abort threshold value Rt, the smaller value of the sum fm of quantities of contribution with respect to learning samples that are detection targets (positive learning samples) x1 to xJ, instead of filter outputs h in Adaboost, and a discrimination boundary value 0, may be selected. That is, the abort threshold value Rt is set to be a maximum value that at least all the positive learning samples can pass.

Next, the data weighting updating unit 38 updates the data weighting Dt(i) on each learning sample i in the t-th repetitive processing in accordance with the following equation (11) using the quantity of contribution fm.

$$\text{Data weighting: } D_{t+1}(i) \leftarrow D_t(i)\exp[-y_i f_m(x_i)] \quad (11)$$

$$D_t(i) \leftarrow \frac{D_t(i)}{\sum_i D_t(i)}$$

Then, the processing is repeated a predetermined number of times (=T times), and the T weak hypotheses, their quantities of contribution fm and the abort threshold value are learned. As described above, the generation of weak hypotheses can be repeated until a final hypothesis formed by a combination of all the generated weak hypotheses can discriminate the learning data set with desired performance. The discriminator, which provides the final hypothesis, can discriminate whether an input is a face or non-face by judging whether the sign of the sum of quantities of contribution fm of all the hypotheses, that is, the discrimination function H expressed by the following equation (12), is positive or negative.

$$H(x) = \text{sgn}\left(\sum_{t=1}^{T} f_m(x)\right) \quad (12)$$

(3-6) Gentleboost Algorithm

Now, the Gentleboost algorithm will be described. Also in Gentleboost, the same procedures 0 and 1 as in Adaboost and Real Adaboost are carried out. A data set including plural labeled learning samples is prepared and data weighting on each learning sample is initialized (i.e., evenly distributed) in accordance with the equation (4).

Next, basically, the processing similar to the processing in Real Adaboost is repeated to sequentially generate weak hypotheses, and data for the discriminator is learned. However, the outputs of the weak hypotheses are different from those in Real Adaboost. In this case, similar to Adaboost and Real Adaboost, the number of repetitions is t=1, 2, ..., T.

First, a weak hypothesis is generated by the weak hypothesis generation apparatus. The weak hypothesis selects a filter on the basis of data weighting Dt (distribution of data weighting) and calculates a real function fm that minimizes a weighted square error et expressed by the following equation (13), using the feature quantity of the filter.

$$e_t = \sum_i^N D_t(i)[y_i - f_m(x)]^2 \quad (13)$$

Also in Gentleboost, like Real Adaboost, in the generation of the weak hypothesis, the selecting unit 33 selects one or several filters having a large sum of real functions fm(xi) of weak hypothesis from a part of filters on the basis of the data distribution Dt, the new weak hypothesis generating unit 34 then generates a filter in accordance with statistical characteristics or genetic algorithm of a human face, and the weak hypothesis selecting unit 35 selects a filter having the largest sum of real functions from them. Therefore, the processing can be carried out similarly at a higher speed.

Next, the abort threshold value calculating unit 37 calculates an abort threshold value Rt for aborting discrimination in the discrimination process, as described above. As the abort threshold value Rt, the smaller value of the sum fm of real functions with respect to learning samples that are detection targets (positive learning samples) x1 to xJ, instead of filter outputs f(x) in Adaboost, and a discrimination boundary value 0, may be selected. That is, the abort threshold value Rt is set to be a maximum value that at least all the positive learning samples can pass.

Next, the data weighting updating unit 38 updates the data weighting Dt(i) on each learning sample i in the t-th repetitive processing in accordance with the following equation (14), as in Real Adaboost, using the real functions fm.

$$\text{Data weighting: } D_{t+1}(i) \leftarrow D_t(i)\exp[-y_i f_m(x_i)] \quad (14)$$

$$D_t(i) \leftarrow \frac{D_t(i)}{\sum_i D_t(i)}$$

Then, the processing is repeated a predetermined number of times (=T times), and the T weak hypotheses, their real functions fm and the abort threshold value are learned. The discriminator, which provides the final hypothesis, can discriminate whether an input is a face or non-face by judging whether the sign of the sum of real functions fm of all the hypotheses, that is, the discrimination function H expressed by the following equation (15), is positive or negative.

$$H(x) = \text{sgn}\left(\sum_{t=1}^T f_m(x)\right) \quad (15)$$

(4) Face Detection Method

Figure 14:
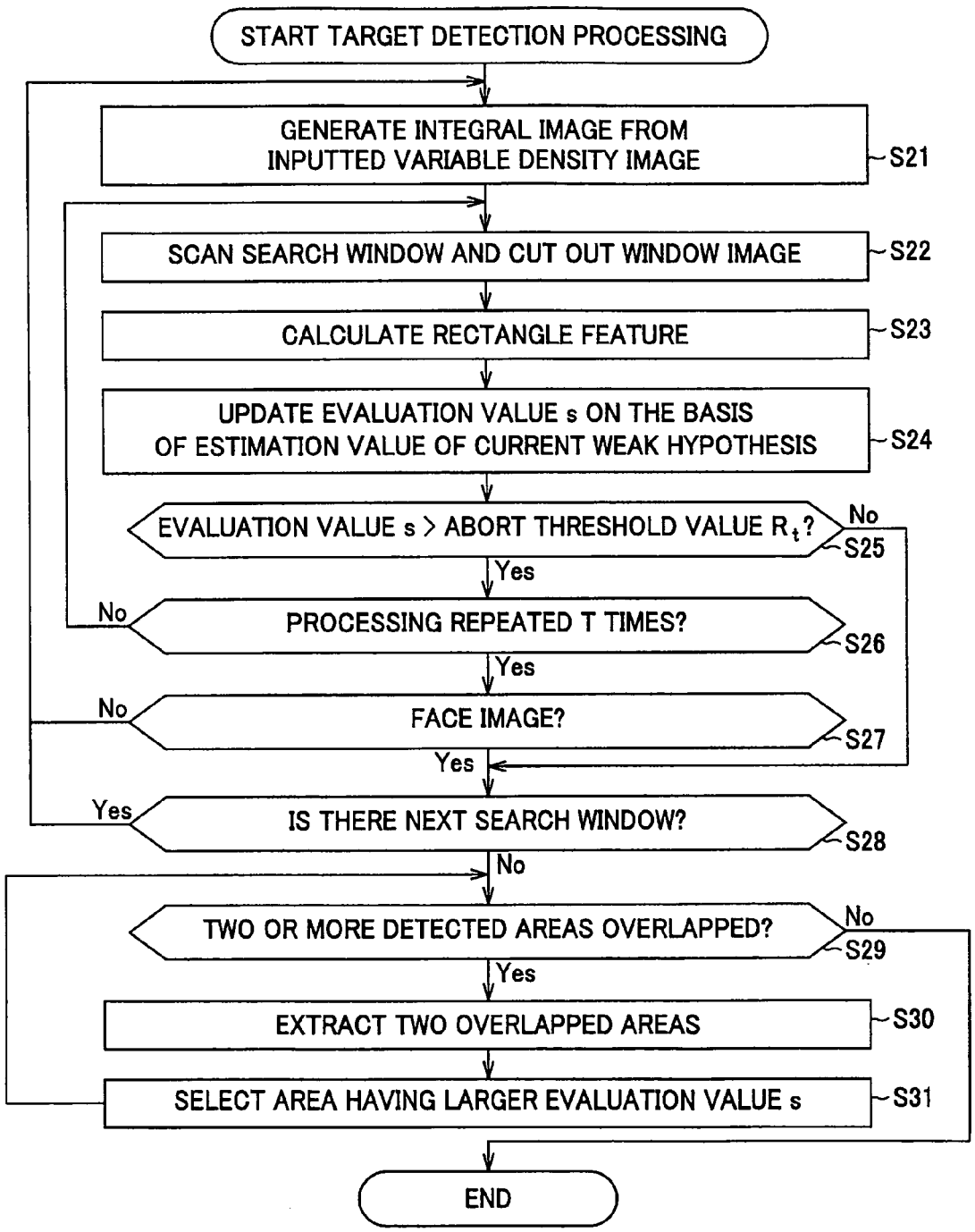
FIG. 14 is a flowchart showing a face detection method in the face detection apparatus of the facial expression recognition system according to an embodiment of this invention.

Now, the face detection method in the face detection apparatus 10 shown in FIG. 4 will be described. FIG. 14 is a flowchart showing the face detection method in the face detection apparatus of the facial expression recognition system according to an embodiment of this invention. First, the image output unit 11 shown in FIG. 4 outputs a variable density image and the integral image generating unit 12 generates an integral image expressed by the above-described equation (1) (step S21). This integral image can be formed by repeating an operation of adding the pixel value of a pixel at the same position in an input image to the sum of pixel values of the pixels above and to the left of the pixel in the image, sequentially from the upper left part. By using this integral image, it is possible to calculate the sum of pixel values in a rectangular box at an arbitrary position at a high speed on the basis of addition or subtraction of the pixels values at the four corners, as described above. This enables high-speed calculation of the feature quantity by the discriminator 14 on the subsequent stage.

Then, the scanning unit 13 vertically and horizontally scans the position of a search window with respect to the integral image and outputs a window image (step S22).

The discriminator 14 judges the size of each face and whether the rectangular box (window image) is a face image or not at each position in the image, using the discriminator 14 acquired by the above-described learning. As basic procedures for this, similar to the above-described learning, each weak hypothesis calculates the feature quantity of the provided image, and the calculated feature quantity is compared with a learned feature quantity to calculate an estimation value. Every time this estimation value is calculated, it is multiplied by the reliability of the weak hypothesis and the result is added. The resulting value of sequential weighted addition (i.e., updated value of the value for taking weighted vote) is used as an evaluation value s. That is, first, the filter output (feature quantity) of the feature quantity filter employed for the weak hypothesis that is generated first is calculated, using the integral image.

In the case of Adaboost, for each weak hypothesis, the filter output (threshold value) that minimizes the error rate in estimation value with respect to the learning data set is learned, using the learning data set, as described above. This threshold value and the filter output of the provided window image are compared with each other, and the binary result of discrimination about whether the window image is a face image or non-face image is outputted as the estimation value. This estimation value is multiplied by the reliability a of the weak hypothesis and the result is added. This processing is carried out with respect to the output of each weak hypothesis, and whether the provided image is a face image or non-face image is judged in accordance with whether the final sum value (i.e., value for finding a weighted vote) is positive or negative.

The discriminator 14 in this embodiment has an abort unit (not shown) for performing control to detect a non-face image and abort processing by using the above-described abort threshold value, without waiting for the results of output of all the weak hypotheses. The processing method in this discriminator 14 will be described in detail. First, an output of a filter (rectangle feature quantity) employed for the first weak hypothesis with respect to the current window image is calculated at a high speed from an integral image (step S23). Then, the rectangle feature quantity is compared with a threshold value that has been learned in advance for the first weak hypothesis, and the result of discrimination showing whether the current window image is a face image or not is outputted as an estimation value. Then, it is reflected on an evaluation value s, which is the product of this estimation value and the reliability of the weak hypothesis (step S24). Next, on the basis of this evaluation value s, whether the window image is a detection target or not and whether or not to abort discrimination are judged.

When a window image is inputted, the evaluation value s is first initialized to s=0. Then, estimation values outputted by the individual weak hypotheses of the discriminator are multiplied by their reliability, and the results are sequentially reflected on the evaluation value s. In the case where the weak hypotheses output binary values as estimation values, if the threshold value for feature quantity discrimination by a weak hypothesis t is Tht, and the filter output (rectangle feature quantity) corresponding to the t-th weak hypothesis with respect to a provided window image is dt, the evaluation value s is expressed by the following equation (16) using the reliability at of the weak hypothesis. That is, every time an estimation value is calculated, the product of the estimation value and the reliability is added to the evaluation value s.

$$\text{Evaluation value}: s \leftarrow s + \begin{cases} \alpha_t & \ldots \quad Th_t < d_t \\ -\alpha_t & \ldots \quad \text{otherwise} \end{cases} \quad (16)$$

In the case where probability densities or real functions are outputted as estimation values as in Real Adaboost or Gentleboost, the evaluation value s is expressed by the following equation (17). That is, every time an estimation value is calculated, that estimation value is added to the evaluation value s.

$$\text{Evaluation value}: s \leftarrow s + f(d) \quad (17)$$

The abort unit of the discriminator 14 judges whether the resulting (updated) evaluation value s is larger than the abort threshold value Rt or not (step S25). If the evaluation value s is smaller than the abort threshold value Rt at this step S25, it is judged that the current window image is obviously not a face image, and the processing is aborted. Then, the processing goes to step S28. If there is a next search window image, the processing from step S21 is repeated.

On the other hand, if the evaluation value s is larger than the threshold value Rt, whether or not the processing has been repeated a predetermined number of times (=T times) is judged (step S26). If not, the processing from step S23 is repeated. If the processing has been repeated the predetermined number of times (=T times), the processing goes to step S27, and whether the window image is a detection target or not is judged in accordance with whether the acquired evaluation value s is larger than 0 or not (step S27). If the evaluation value s is larger than 0, it is judged that the current window image is a face image of the detection target, and its position and size are stored. Then, whether there is a next search window or not is judged (step S28). If there is a next search window, the processing from step S21 is repeated. If the search windows for all the next areas have been scanned, the processing goes to step S29 and processing to delete overlapped areas is executed.

In this manner, when the discrimination processing for all the window images of one input image is completed, the processing shifts to step S29. In the case of detecting face images of difference sizes, the scanning can be repeated while suitably changing the size of the window.

In the processing after step S29, if areas that are detected as areas indicating a detection target overlap each other in one input image, the overlapped areas are eliminated. First, whether there area overlapped areas or not is judged. If there are plural areas judged and stored as a face, and these areas are overlapped, the processing goes to step S30. The two overlapped areas are taken out, and the area having a smaller evaluation value s, of these two areas, is regarded as having lower probability of being a detection target and is therefore deleted. The area having a larger evaluation value s is selected (step S31). Then, the processing from step S29 is repeated. In this manner, one area having the highest evaluation value is selected from the areas that are overlapped plural times and extracted. If two or more detection target areas are not overlapped, or if there are no detection target areas, the processing for one input image ends and the next frame processing starts. An average value of the overlapped areas may be calculated and outputted.

With the learning method for the data to be used by the discriminator 14 in this embodiment, when generating a weak hypothesis, a filter having high performance can be selected to generate a weak hypothesis without searching all the filters to select a filter having the highest discrimination performance, and the learning processing can be carried out at a high speed without lowering the discrimination performance of the weak hypothesis.

Moreover, in this embodiment, as the abort threshold value is learned in advance, the detection processing can be aborted if it can be discriminated that a window image is obviously a non-target object, and therefore the processing in the detection process can be carried out at a very high speed. That is, in the detection process, the value acquired by multiplying the result of discrimination (estimation value) from the output value (feature quantity) of the filter by the reliability of the weak hypothesis used for discrimination is added to the previous evaluation value s, thus sequentially updating the evaluation value s. Every time the evaluation value is updated, it is compared with the abort threshold value Rt to judge whether or not to continue calculation of the estimation value of the next weak hypothesis. If the evaluation value s is less than the abort threshold value, the calculation of the estimation value of the weak hypothesis is aborted and the processing shifts to the next window image. Therefore, redundant calculation can be omitted and real-time high-speed face detection can be carried out. For most window images, the probability of being a face image is lower and most window images are non-detection targets. Therefore, by aborting discrimination of the window images that are non-detection targets, it is possible to realize a very efficient discrimination process.

In the above-described non-patent reference 1, to realize high-speed processing, plural classifiers, each of which includes plural weak hypotheses, are cascaded, and when discrimination by one classifier ends, samples having low discrimination scores are judged as non-faces and the processing is aborted at this point. Thus, high-speed calculation is realized. In this case, since the next classifier uses only the samples handed over from the previous classifier, that is, the samples having high discrimination scores, for learning, the problem to be identified is gradually simplified.

On the other hand, in this embodiment, every time the value acquired by multiplying the estimation value from each filter output by the reliability, or the quantity of contribution or real function of the estimation value from the filter output, is added, the image is judged as a non-face, or the abort threshold value for judging whether or not to evaluate the next feature quantity is learned. On the basis of this, control to abort the processing is executed. Therefore, compared with the above-described non-patent reference 1, the image can be judged as a non-face by using evaluation of estimation values of less weak hypotheses, and the processing in the detection process can be carried out at a high speed.

In this embodiment, the abort threshold value for aborting the detection processing in the case where it can be judged that an image is obviously a non-detection target is introduced. However, an abort threshold value for aborting detection processing in the case where it can be judged that an image is obviously a detection target may be introduced, as described above. Alternatively, these two abort threshold values may be introduced at the same time.

(5) Facial Expression Recognition Apparatus

The facial expression recognition apparatus will now be described. The apparatus 20 including the face feature extracting unit 21 and the expression recognizing unit 22 shown in FIG. 4 identifies whether inputted face images have specific expressions or not by using specific expression identifiers for which data have been learned by a method that will be described later, on the basis of a Gabor output calculated by a method that will be described later as a feature quantity, and thus classifies the inputted face images into seven emotions or expressions.

By combining this facial expression recognition apparatus 20 with the above-described face detection apparatus, it is possible to realize a facial expression recognition system that performs fully automatic facial expression recognition. This is different from the conventional technique in that the facial expression recognition is carried out very accurately and in real time. For example, in an experiment conducted by the inventors of this application, generalization performance of 93% was achieved in the case of 7-way forced choice with respect to new learning samples.

Figure 15:
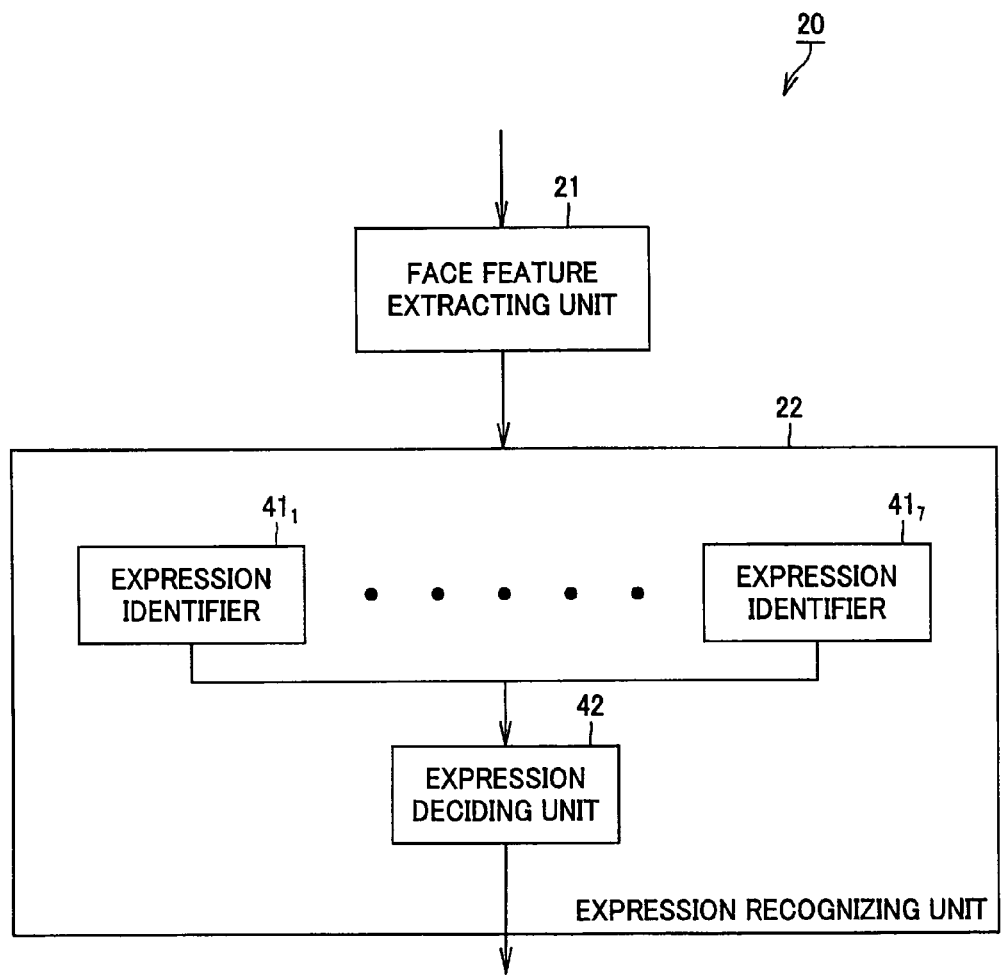
FIG. 15 is a functional block diagram showing a facial expression recognition apparatus 20 of the facial expression recognition system according to an embodiment of this invention.

FIG. 15 is a functional block diagram showing the facial expression recognition apparatus 20. As shown in FIG. 15, the facial expression recognition apparatus 20 has the face feature extracting unit 21 and the expression recognizing unit 22 for recognizing an expression from face features extracted by the face feature extracting unit 21. The expression recognizing unit 22 has expression identifiers $41_1$ to $41_7$ (=expression identifiers 41x) for identifying whether provided data is a specific expression or not, and a expression deciding unit 42 for deciding and outputting one expression on the basis of the result of identification from each expression identifier 41x.

The face feature extracting unit 21 extracts face features from a face image by using a Gabor filter, which is robust against a shift of the image. Therefore, processing such as clear function detection or inner face feature alignment is not necessary as preprocessing. Since the preprocessing is not required, the processing time can be largely saved, which is important to real-time applications.

The expression identifiers $41_1$ to $41_7$ identify specific expressions of happiness, sadness, surprise, disgust, fear, anger, and neutral, as their respective identification targets, and each of them outputs a result of identification indicating whether a provided face has the specific expression or not. Data for the expression identifiers 41x have been ensemble-learned by support vector machines (SVMs) or by the above-described boosting such as Adaboost. Alternatively, by combining feature selection based on Adaboost and feature integration based on SVMs, it is possible to learn data so that the expression identifiers 41x can operate accurately and at a high speed.

The expression deciding unit 42 receives, as its input, the result of discrimination by each expression identifier indicating whether a provided face has the specific expression or not. The expression deciding unit 42 employs one of the expression identifiers that has the best result of discrimination and thus decides one expression. In the case where the expression identifiers 41x are constituted by SVMs, discrimination functions are calculated from support vectors learned at the time of learning, and of these, the discrimination function of the largest value is outputted as the expression of the face image inputted from the face detection apparatus 10. In the case where the data for the expression identifiers 41x have been ensemble-learned by boosting or the like, an expression having the largest output (hereinafter referred to as discrimination evaluation value) such as the sum of products of outputs and reliability of weak hypotheses (value for taking weighted vote), the sum of quantities of contribution, the sum of real functions or the like, is outputted as the recognized expression. For example, weighted vote is not taken among the expression identifiers 41x for which data have been learned by boosting, because two or more expressions may be detected at a time. Also in this case, an expression having the highest discrimination evaluation value can be outputted as the most likely result.

This facial expression recognition apparatus 20 performs learning for and recognition at each expression identifier 41x, using a rectangular face box outputted from the face detection apparatus 10, that is, the position and size of a window image judged as a face image. The method for learning data for the facial expression recognition apparatus 20 will be described first, and then, the identification method by the facial expression recognition apparatus 20 will be described.

(6) Facial Expression Learning Method

In learning, first, face images are cut out from a provided image database, using the above-described face detection apparatus. Learning may also be carried out using prepared face images. Next, the face images are classified into emotion categories as expression recognition targets, for example, by a manual operation. In this embodiment, face images of a face image group are classified into the above-described seven emotion categories, and labels corresponding to these categories are allocated the face images that have been cut out. Samples are generated, each of which is labeled with one of the expressions. In this embodiment, these samples are used as an expression database for expression learning. The expression recognizing unit 22 generates (learns) one expression identifier 41x for each of the seven expression categories. Now, the procedure for learning data for the expression identifier 41x related to one expression will be described. Actually, however, data is replaced and learning of data for the expression identifier 41x is repeated X=7 times in order to learn data for the seven expression identifiers 41x corresponding to the seven emotion categories, respectively. Although human faces are classified into seven types of emotions in this embodiment, expressions to be recognized are not limited to the seven types and data for expression identifiers corresponding to the number of necessary expressions can be learned.

First, in this embodiment, to acquire feature quantities for the expression identifiers 41x to identify each expression, Gabor filtering for extracting face features from face images is carried out, for example, using 40 types of Gabor filter defined by eight directions and five frequencies. Gabor filter outputs differ, depending on not only the direction and frequency but also the pixel position to which the Gabor filters are applied. In this embodiment, Gabor filters are applied to, for example, an image of 48×48 pixels, and 92160 Gabor outputs are acquired in total.

As the expression identifiers 41x, either SVMs or Adaboost learners are used. As will be described later, it is possible to provide more efficient expression identifiers 41x by SVM-learning only the feature quantities of filters selected by Adaboost from the 92160 filters (features).

For each of the seven expression identifiers 41x prepared for identifying the predetermined expressions as recognition targets, a learning operation to output a result indicating whether a provided face has one expression that is an identification target (hereinafter referred to as specific expression) is carried out, and then, learning (or training) for the seven expression identifiers 41x is carried out in order to discriminate each expression from the others. In this case, an emotion category is decided by selecting an expression identifier 41x providing a maximum margin for data that is being learned now.

The learning for the expression recognizing unit 22 is carried out by three methods. The first learning method is to learn data for SVMs that perform classification into the emotion categories on the basis of Gabor filter outputs. The second learning method is to learn data for a final hypothesis (strong discriminator) for each emotion category, using Gabor filters as weak hypotheses, in accordance with the above-described Adaboost algorithm. The third learning method is to repeat the processing to select a filter having high discrimination performance to generate a weak hypothesis from all the Gabor filters by using a boosting technique, and then learn data for SVMs by using only the Gabor filters selected as weak hypotheses. In this manner, the learning efficiency is improved, compared with the first and second learning methods. Hereinafter, these three learning methods for expression identification will be described.

(6-1) First Learning Method

Figure 16:
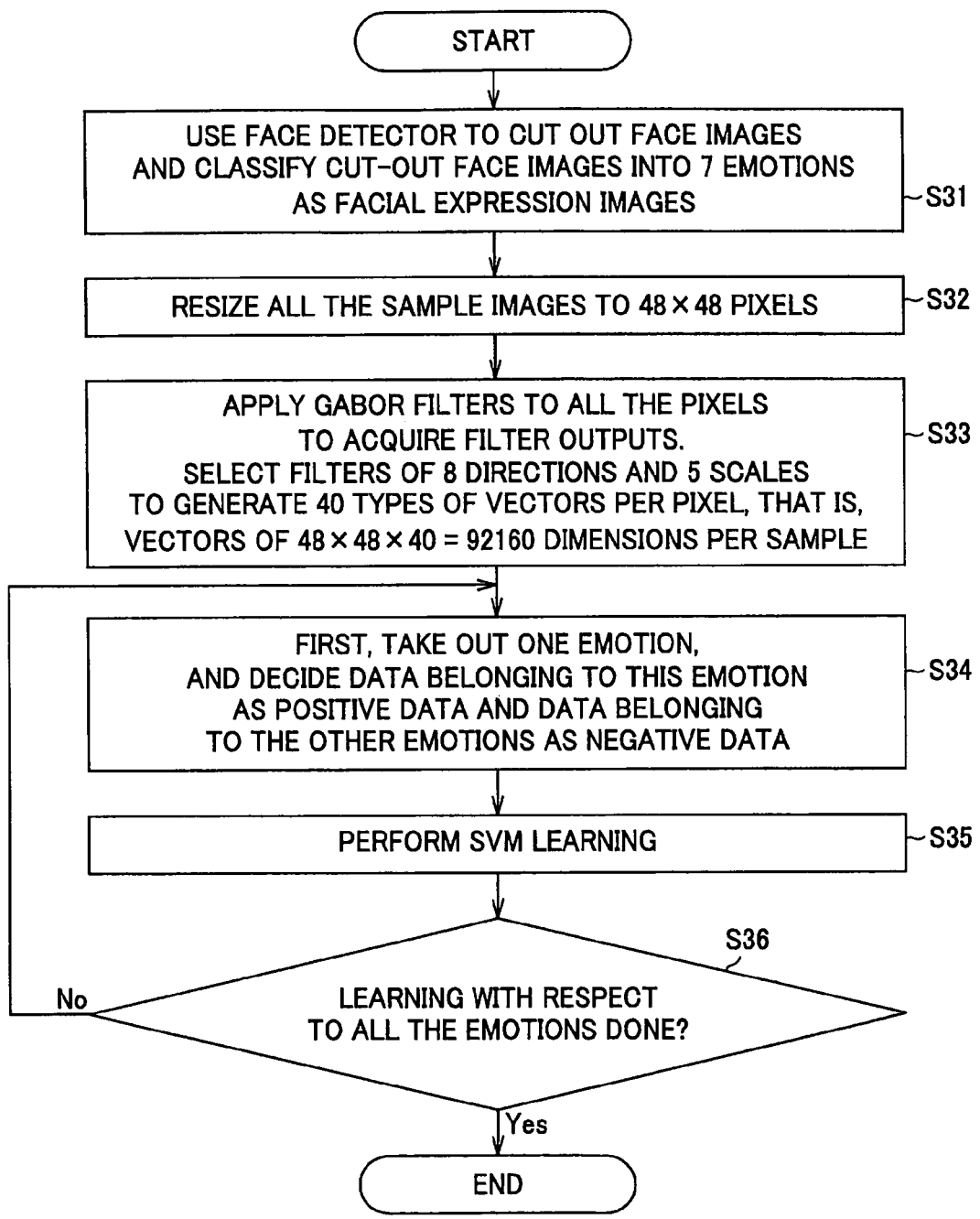
FIG. 16 is a flowchart showing a first learning method for the facial expression recognition apparatus of the facial expression recognition system according to an embodiment of this invention.

FIG. 16 is a flowchart showing the first learning method. In any method, the following operations (preprocessing) of steps S31 to S33 are carried out on a face detection image.

First, learning samples labeled with an expression as a classification target are gathered (step S31). As described above, for example, face images detected by the face detection apparatus 10 shown in FIG. 4 are used. These face images are classified, for example, into face images judged as expressing "happiness" and faces images expressing the other emotions, for example, by a manual operation. A face image group including a group of target expression images representing the target expression and a group of non-target expression images representing the other expressions is thus prepared.

Next, since the detected face images have different sizes, each face image prepared as described above is resized, for example, to approximately 48×48 pixels (step S32). Since Gabor filter outputs are robust against shifts of images, the outputs of face detection can be used without performing particularly fine positioning.

Then, conversion to intensity signal representation is performed, using Gabor filters of eight directions and five scales. In this embodiment, all the 40 types of Gabor filters are applied to all the pixels to acquire filter outputs. The Gabor filters will be later described in detail. In this manner, 40 types of vectors per pixel are provided, that is, vectors of 48×48 pixels×8 directions×5 scales=92160 dimensions, are provided per learning sample.

In this embodiment, the three machine-learning methods can be employed, as described above. The first learning method is to learn on the basis of support vector machines (SVMs). First, of the vectors preprocessed at steps S31 to S33, vectors belonging to the emotion category selected as a learning target are regarded as positive data, and vectors belonging to the other emotion categories are regarded as negative data (step S34).

Next, using the learning data set including the positive data and the negative data, support vectors for identifying the positive data and the negative data are learned (step S35).

SVMs acquire provisional identification functions, using learning data supplied from outside, that is, an expression learning data set including data representing labeled detection targets and non-detection targets (also referred to as teacher data or training data). In the identification, the results of face extraction from inputted face images by Gabor filtering are inputted to SVMs. As kernel functions for non-linearly extending linear identifiers as expression identifiers 41x by kernel trick, linear, polynomial, RBF kernels with Laplacian, and Gaussian basis functions can be used. The inventor of this application has confirmed that the best identification performance is achieved with linear and RBF kernels using Gaussian basis functions, as will be described later.

To improve identification performance, a boot strap method can be employed. Images are picked up separately from the images used for learning, and the picked-up images are used for boot strap. This means that when the expression identifier 41x for which data has been learned outputs an erroneous recognition result, the input data can be put into the learning data set and learning can be performed again.

As a result of this SVM learning, N supports vectors of 92160 dimensions, N coefficients α of these support vectors, and labels y of the samples that have become support vectors are acquired for each expression identifier 41x corresponding to each emotion category. These are saved and will be used at the time of expression recognition, as will be described later.

In this embodiment, since data for the expression identifiers 41x corresponding to the seven emotion categories are learned, as described above, learning with respect to all the emotions is performed for each expression. When learning with respect to all the emotions is completed (step S36), the processing ends.

(6-2) Second Learning Method

Figure 17:
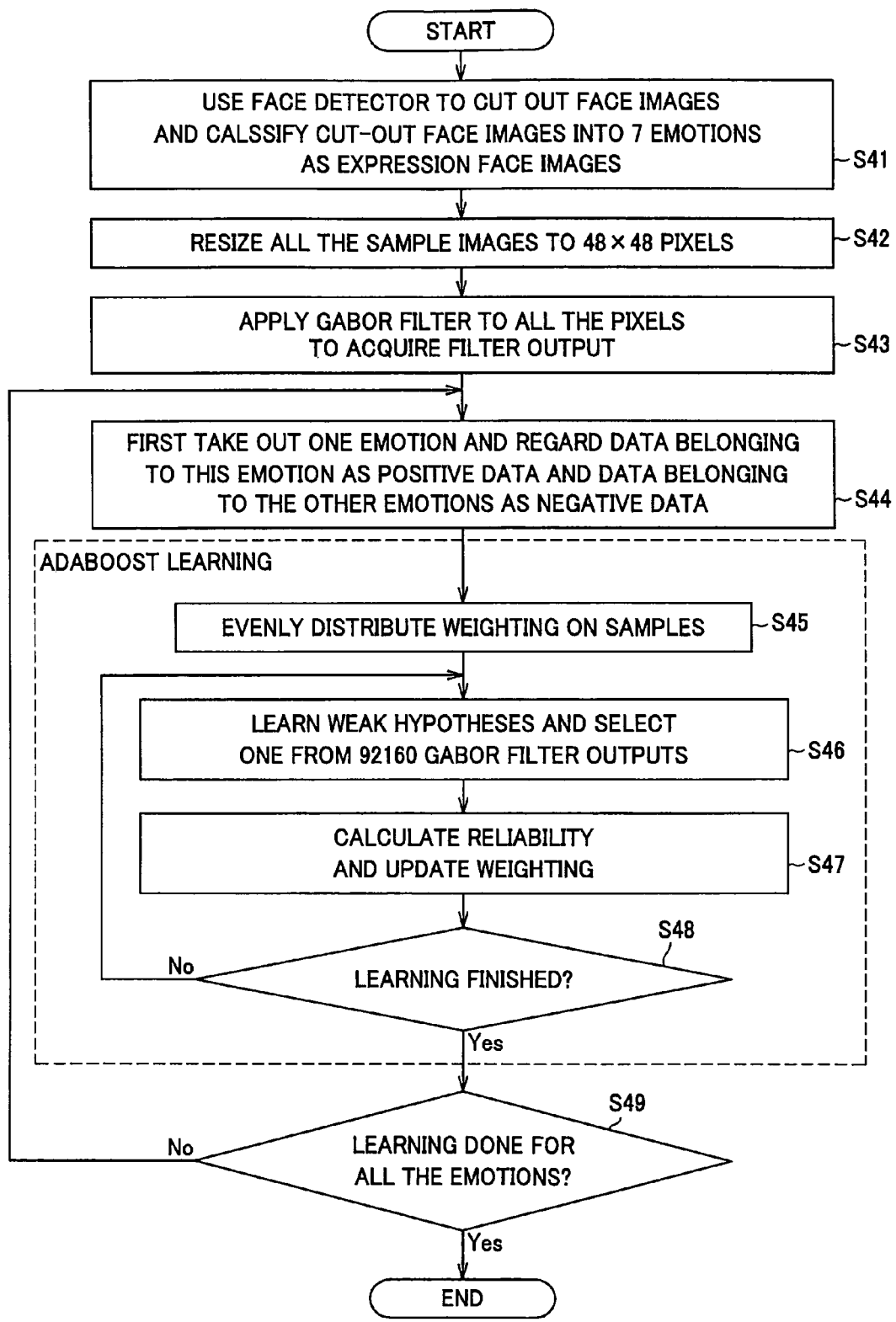
FIG. 17 is a flowchart showing a second learning method for the facial expression recognition apparatus of the facial expression recognition system according to an embodiment of this invention.

FIG. 17 is a flowchart showing the second learning method for facial expression recognition. In FIG. 17, preprocessing of steps S41 to S43 is similar to the processing of steps S31 to S33 shown in FIG. 16. That is, many face images (sample images) are gathered by the face detection apparatus 10 or the like, and they are classified into seven expressions as identification targets. Then, all the sample images are resized to the same size and Gabor filters are applied to all the pixels to acquire filter outputs. In short, a set of Gabor filter outputs defined by the direction, frequency, and pixel position to which the filter is applied, is used as a learning model for acquiring the expression identifiers.

Data belonging to an emotion category selected as a learning target are regarded as positive data, and data belonging to the other emotion categories are regarded as negative data (step S44). Machine-learning is performed using this expression learning data set.

In the second learning method, boosting is used for machine-learning. While machine-learning using Adaboost will described here, learning may also be performed by using the above-described Real Adaboost or Gentleboost.

In Adaboost, as weak hypotheses sequentially generated at the time of learning, 48×48 pixels×8 directions×5 scales=92160 Gabor filter outputs acquired by preprocessing are used. That is, one of the 92160 Gabor filters is selected and a feature quantity (Gabor filter output) for outputting an estimation value indicating whether the data of the expression learning data set are of a discrimination target expression or non-target expression is learned, thus generating a weak hypothesis. The reliability of the weak hypothesis is thus learned. This learning method can be basically similar to the learning method shown in FIG. 11.

First, similar to step S1 of FIG. 11, data weighting is initialized in accordance with the equation (4) so that the data weighting on each learning data of the expression learning data set acquired at step S44 as described above is evenly distributed (step S45).

In this embodiment, there are 92160 Gabor filters, that is, 92160 filters that can be selected as weak hypotheses. Thus, one of the 92160 Gabor filters is selected to generate a weak hypothesis (step S46).

Then, similar to steps S3 and S5, a weighted error rate $\epsilon$ is calculated in accordance with the equations (5) and (6), and reliability $\alpha$ is calculated on the basis of the weighted error rate. On the basis of the reliability $\alpha$, the data weighting on each learning data of the expression learning data set is updated in accordance with the equation (7) (step S47). As the processing of steps S46 and S47 is repeated a necessary number of times, a necessary number of weak hypotheses are generated. Then, learning is continued until a final hypothesis formed by plural learned weak hypotheses perfectly separates the positive data and the negative data of the expression learning data set and the gap between them becomes larger than a predetermined quantity with respect to the size of distribution of these data (step S48). As described above, there are 92160 Gabor filter outputs. For example, by learning several hundred weak hypotheses, it is possible to classify the learning samples into positive data and negative data.

In the above-described learning process shown in FIG. 11, the abort threshold value is calculated in order to realize high-speed processing in discrimination. Also in this method, an abort threshold value for aborting the identification processing on the basis of a judgment that a provided expression is obviously not the specific expression of the identification target, or an abort threshold value for aborting the identification processing on the basis of a judgment that a provided expression is obviously the specific expression of the identification target, may be learned in advance and used for realizing high-speed processing in identification.

Now, the weak hypothesis generation method of step S46 will be described. In generating a weak hypothesis, a filter that minimizes the weighted error rate acquired from data weighting on each learning data of the expression learning data set at that time is selected, and a feature quantity (in the case of Adaboost, a value to be a discrimination threshold value) for discriminating whether the data of the data set is of the specific expression or not is learned.

As described above, 92160 Gabor filter outputs are acquired for each learning sample. With respect to positive data p of i learning samples, the j-th Gabor filter output, of all the Gabor filter outputs J (in this embodiment, J=92160), is represented by pij. With respect to negative data n of the i learning samples, the j-th Gabor filter of the 92160 Gabor filter outputs is represented by nij.

Figure 18:
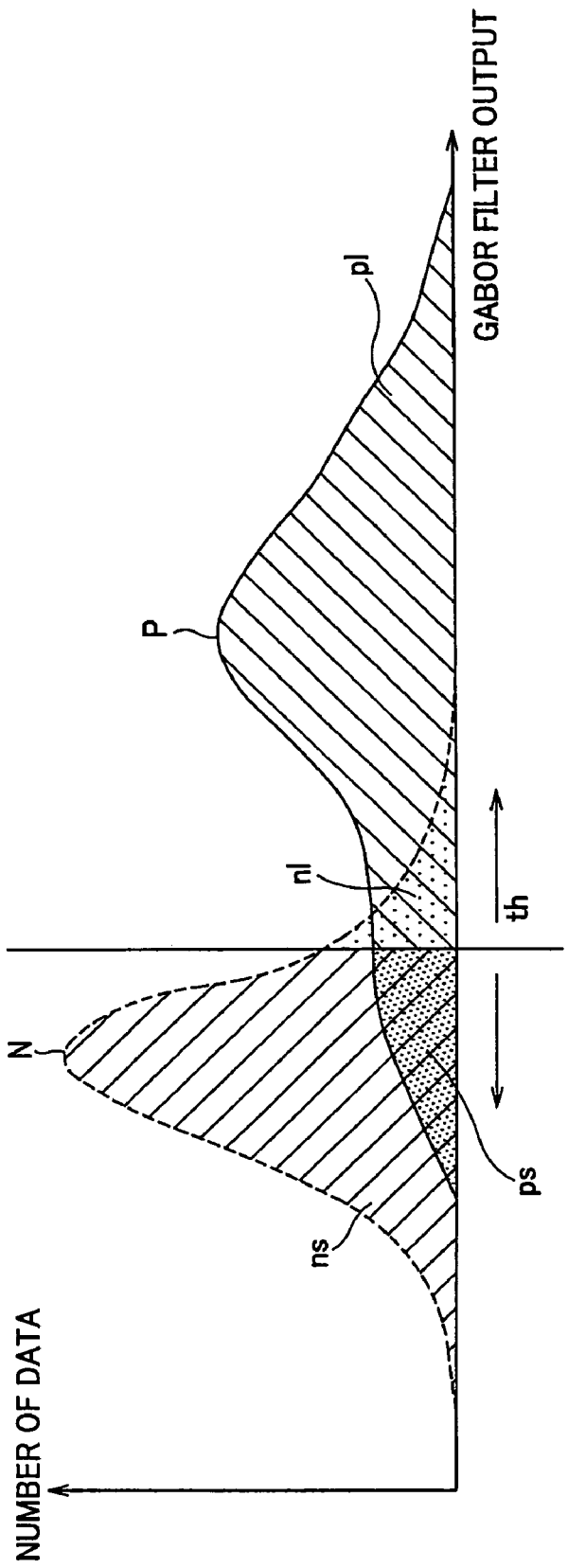
FIG. 18 is a graph with the horizontal axis representing output of the j-th Gabor filter and the vertical axis representing the number of positive data p or negative data n in the output of the j-th Gabor filter.

First, histograms are formed by multiplying each the positive data p and the negative data n of the j-th Gabor filter output by data weighting Di of Adaboost. FIG. 18 is a graph showing the histograms. That is, in FIG. 18, the horizontal axis represents the j-th Gabor filter output, and the vertical axis represents the number of positive data p or negative data n in the j-th Gabor filter output. In FIG. 18, a solid line shows a histogram P of the positive data p and a broken line shows a histogram N of the negative data n.

Next, identification of the positive data p or the negative data n is carried out using a search value th for searching for a threshold value Th. The sum of weighted count values of the positive data p at and above the search value th is represented by pl, and the sum of weighted count values of the positive data p below the search value th is represented by ps. The sum of weighted count values of the negative data n at and above the search value th is represented by nl, and the sum of weighted count values of the negative data n below the search value th is represented by ns. Using these values pi, ps, nl, ns and the search value th, the identification error e can be calculated by the following equation (18).

$$e_j(T_h) = \min\left(\frac{ps+nl}{ps+pl+ns+nl}, \frac{pl+ns}{ps+pl+ns+nl}\right) \quad (18)$$
$$= \min\left(\frac{ps+nl}{ps+pl+ns+nl}, 1 - \frac{ps+nl}{ps+pl+ns+nl}\right)$$

Specifically, the search value th is shifted in the direction of the horizontal axis represented by the j-th Gabor filter output, and the search value th that minimizes the error e is found. This search value th that minimizes the error e is used as the threshold value Th(j) of this Gabor filter output. As shown in the upper part of the equation (18), error ej(th) is the smaller one of the correct answer rate ((ps+nl)/(ps+pl+ns+nl)) and the incorrect answer rate ((pl+ns)/(ps+pl+ns+nl)) of all the answers. However, as shown in the lower part of the equation (18), when the search value th is changed, the sum pl of weighted count values of the positive data of correct answers and the sum ns of weighted count values of negative data of correct answers increase or decrease by the amount of the shifted search value th. Therefore, all pl and ns need not be counted for each search value th, and the processing can be carried out at a high speed.

In this manner, the error ej(Th) is calculated for all the J Gabor filter outputs, and one weak hypothesis that provides the least error ej(Th) is employed. This error ej(Th) is the error rate of the weak hypothesis.

The weak hypothesis generation method shown in FIG. 12 may be applied, for example, to a case where face images used for learning have a very large number of pixels, requiring many filters. Specifically, filters are selected a predetermined rate from all the selectable filters, and of the selected filters, one or plural high-performance filters having high discrimination performance are selected. Then, new filters are generated by adding a predetermined modification to the high-performance filters. Of the high-performance filters and the new filters, a filter having the best discrimination performance, that is, a filter that minimizes the above-described error ej(Th), is selected to generate a weak hypothesis. In this case, the new filters can be generated, for example, by changing the frequencies and directions of the filters selected as high-performance filters or by shifting the pixel position by one.

It is also possible to select filters from all the selectable filters at a predetermined rate, generate new filters from the selected filters, and select one filter having the best discrimination performance from the selected filters and new filters so as to generate a weak hypothesis.

Using the error ej(Th) of the weak hypothesis selected in this manner on the basis of the Adaboost learning method, the reliability of the weak hypothesis is calculated as described at step S47, and the data weighting Di on learning data i is updated in accordance with the correct answer or incorrect answer of the weak hypothesis. This processing is repeated.

Next, when the expression identifier 41x based on the sum of T weak hypotheses acquired as described above is applied to the learning samples, if the positive data and the negative data are separated with a sufficient margin, learning is aborted at this point (step S48). The expression identifier 41x is adapted for discriminating whether a provided expression is an identification target expression or non-target expression on the basis of the result of multiplication and addition of the outputs of the T weak hypotheses and their reliability. At the time of identification, which will be described later, unlike the above-described face detection, each expression identifier 41x outputs a sum value acquired by sequentially adding the products of outputs and reliability of the weak hypotheses, instead of taking a weighted vote from the sum value of the products of outputs and reliability of the weak hypotheses. Thus, for example, when the outputs of two expression identifiers 41x show positive values, the expression deciding unit 42 can employ the result of the expression identifier 41x with a larger sum value and output it as the result of identification. If the positive data and the negative data cannot be separated sufficiently, the processing goes back to step S46 and a new weak hypothesis is generated. In this embodiment, a final hypothesis can be provided by selecting approximately 1/200 of all the Gabor filters (92160. Gabor filters) to generate weak hypotheses.

As a result of the above-described learning, the directions and scales of the selected weak hypotheses, that is, the Gabor filters, the information about image position (pixel position), the output values of the filters (feature quantities), and the reliability a of the weak hypotheses are acquired. These are saved and will be used for recognition, which will be described later.

(6-3) Third Learning Method

The identifiers for which data are learned by the first learning method using SVMs have non-linearity based on kernels and therefore have excellent performance. However, it is necessary to calculate, for example, vectors of 92160 dimensions and the calculation time for discrimination may be longer than in the case of the expression identifiers 41x for which data is learned by boosting of the second learning method. Thus, in the third learning method, in order to reduce the calculation time for discrimination, SVM learning (hereinafter also referred to as AdaSVM) is performed using only the feature quantities (Gabor filters) employed in Adaboost learning.

In this third learning method, first, a data set is prepared which includes weighted specific expression face image data representing a specific expression and weighted non-specific face image data representing expressions different from the expression shown by the specific expression face image, and from plural Gabor filters, a Gabor filter having a minimum error rate in discriminating the specific expression face image data and the non-specific expression face image data is selected as a first weak hypothesis. Then, reliability of this first weak hypothesis with respect to the data set is calculated, and the weighting on the specific expression face image data and the non-specific expression face image data is updated on the basis of the reliability.

Next, of the plural Gabor filters, a Gabor filter having a minimum error rate in discriminating the specific expression face image data and the non-specific expression face image data with the updated weighting is selected as a second weak hypothesis.

In this manner, support vectors are learned by SVMs to which feature quantities of the specific expression face image data and the non-specific expression face image data extracted by at least the Gabor filters selected as the first weak hypothesis and the second weak hypothesis, and a hypothesis (expression identifier) for discriminating the specific expression face image data and the non-specific expression face image data is generated. This third learning method will now be described in detail.

Figure 19:
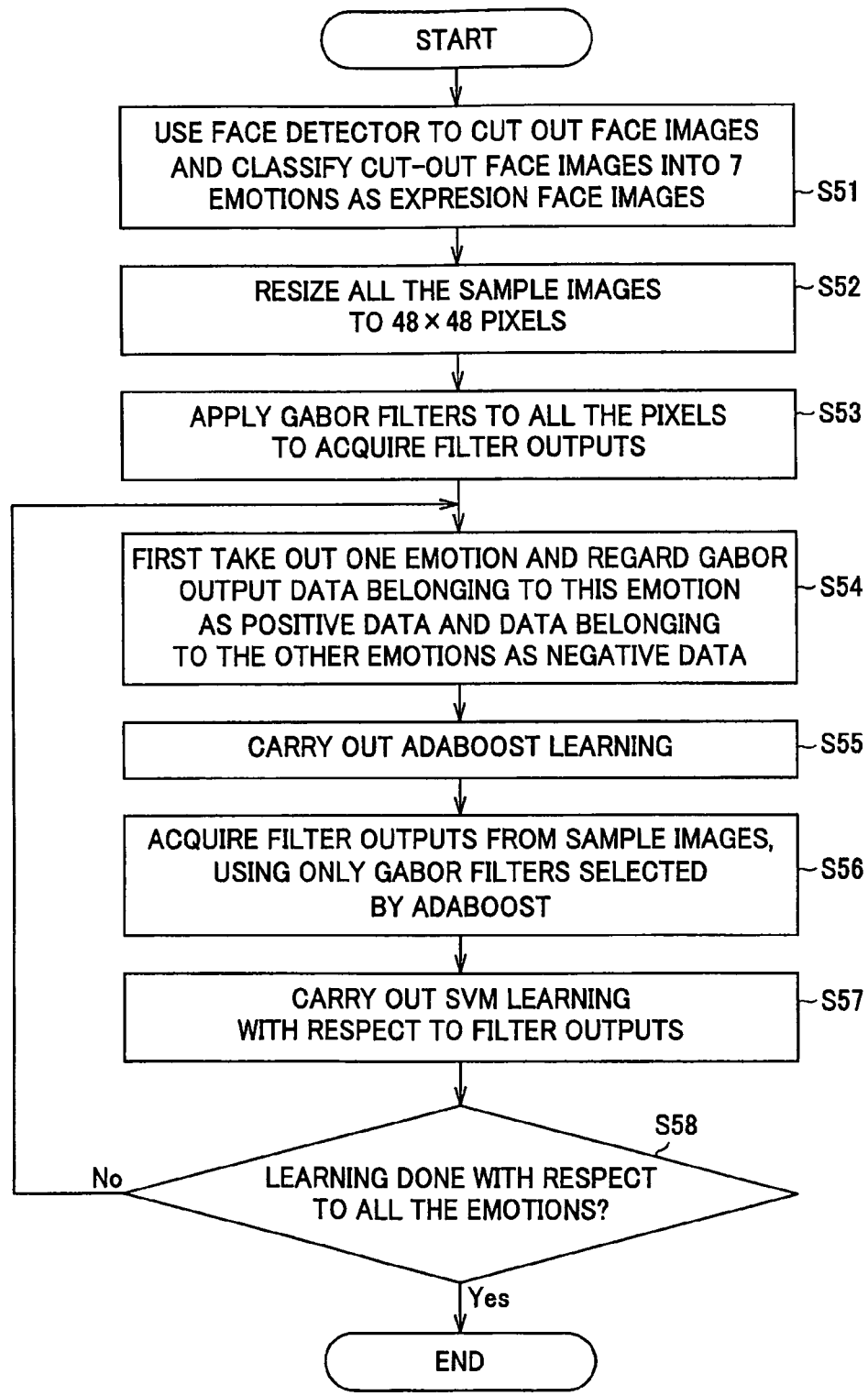
FIG. 19 is a flowchart showing a third learning method for the facial expression recognition apparatus of the facial expression recognition system according to an embodiment of this invention.

FIG. 19 is a flowchart showing the third learning method for face expression recognition. In FIG. 19, preprocessing of steps S51 to S53 is similar to the processing of steps S31 to S33 shown in FIG. 16.

Then, data belonging to an emotion category selected as a learning target are regarded as positive data, and data belonging to the other emotion categories are regarded as negative data (step S54). Machine-learning is carried out using this expression learning data set.

First, Adaboost learning is executed (step S55). The processing of this step S55 is similar to the processing of steps S45 to S48 of the above-described second method. That is, first, as weak hypotheses are sequentially generated, combinations of frequencies and directions of Gabor filters and pixel positions in the sample image are sequentially learned. At this step S55, for example, approximately 538 filters are selected from all the Gabor filter outputs (92160 Gabor filter outputs), that is, approximately 1/200 of the filters is selected, until a final hypothesis is acquired. In this manner, in Adaboost, if approximately 1/200 of the 92160 filters is selected to generated weak hypotheses, an identifier for identifying whether a provided expression is the target expression or non-target expression can be generated. At this step S55, when the negative data and the positive data of the learning data set are perfectly separated and the gap between them becomes larger than a predetermined quantity with respect to the size of distribution of these data, learning is stopped.

Next, SVM learning is carried out using only the outputs of the Gabor filters employed for weak hypotheses generated by boosting learning of step S55. First, using only the Gabor filters employed for weak hypotheses in Adaboost, each learning face image labeled with a predetermined expression is filtered to extract face features. Therefore, while support vectors must be learned from the 92160-dimensional vectors in the first learning method, in this third learning method, support vectors are learned from, for example, 538-dimensional vectors, which is approximately 1/200 of the 92160-dimensional vectors. That is, SVM learning is carried out using the 538-dimensional vectors as new learning data. This enables high-speed calculation both in learning and in identification. As boosting is combined with SVMs for learning, generalization performance improves.

As a result of learning, the directions and scales of the Gabor filters employed for generated weak hypotheses, and information about pixel positions, are acquired. If the number of weak hypotheses is T, support vectors of T-dimensional Gabor filter outputs, their coefficients $\alpha$, and labels y of the corresponding learning samples are saved and will be used in recognition, which will be described later.

Gabor filtering and SVMs will now be described in detail.

(6-4) Gabor Filtering

It is already known that human visual cells include cells having selectivity with respect to specific orientations. These cells are cells that respond to vertical lines and cells that respond to horizontal lines. Similarly, Gabor filtering is based on a spatial filter formed by plural filters having orientation selectivity.

A Gabor filter is spatially represented by a Gabor function. A Gabor function $g(x,y)$ is constituted by a carrier $s(x,y)$ consisting of a cosine component and an envelope $w_r(x,y)$ in the form of two-dimensional Gaussian distribution, as expressed by the following equation (19)

$$g(x,y) = s(x,y) w_r(x,y) \quad (19)$$

The carrier $s(x,y)$ is expressed as in the following equation (20), using complex numbers. In this equation, the coordinate value (u0, v0) represents the spatial frequency and P represents the phase of the cosine component.

$$s(x,y)=\exp(j(2\pi(u_0 x+v_0 y)+P)) \quad (20)$$

The carrier s(x,y) shown in the equation (20) can be split into a real component Re(s(x,y)) and an imaginary component Im(s(x,y)), as expressed by the following equation (21).

$$\begin{cases} \text{Re}(s(x, y)) = \cos(2\pi(u_0 x + v_0 y) + P) \\ \text{Im}(s(x, y)) = \sin(2\pi(u_0 x + v_0 y) + P) \end{cases} \quad (21)$$

On the other hand, the envelope of two-dimensional Gaussian distribution is expressed by the following equation (22).

$$w_r(x,y)=K\exp(-\pi(a^2(x-x_0)_r^2+b^2(y-y_0)_r^2)) \quad (22)$$

In this equation, the coordinate value (x0, y0) represents the peak of this function, and constants a and b are scale parameters of Gaussian distribution. The subscript r indicates a rotating operation as expressed by the following equation (23).

$$\begin{cases} (x - x_0)_r = (x - x_0)\cos\theta + (y - y_0)\sin\theta \\ (y - y_0)_r = -(x - x_0)\sin\theta + (y - y_0)\cos\theta \end{cases} \quad (23)$$

Therefore, a Gabor filter is expressed as a spatial function as shown in the following equation (24) based on the equations (20) and (22).

$$g(x,y)=K\exp(-\pi(a^2(x-x_0)_r^2+b^2(y-y_0)_r^2))\exp(j(2\pi(u_0 x+u_0 y)+P)) \quad (24)$$

Figure 20A:
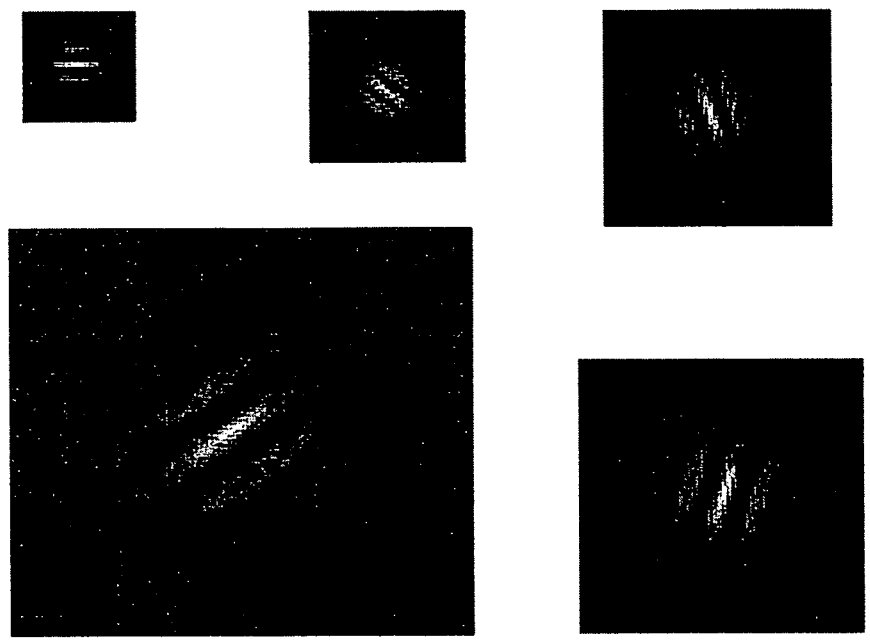
FIG. 20A is a view showing Gabor filters of difference frequency components.
Figure 20B:
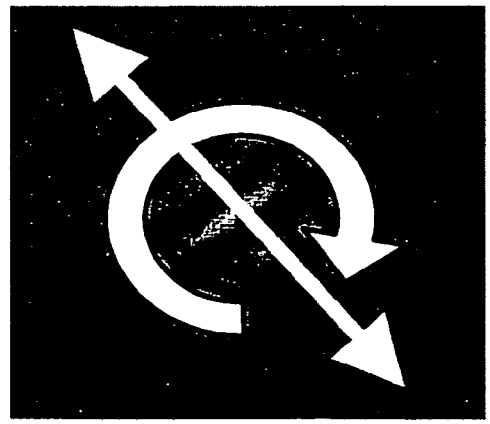
FIG. 20B is a view showing eight directions of a Gabor filter.

The face feature extracting unit 21 of this embodiment carries out face extraction processing using 40 Gabor filters in total in eight directions and five spatial frequencies. FIGS. 20A and 20B show models in the spatial domain of Gabor filters used in this embodiment. FIG. 20A shows examples of Gabor filters of different frequency components. FIG. 20B shows eight directions of the Gabor filters. The density in FIGS. 20A and 20B corresponds to a component in the direction of the coordinate axis orthogonal to the sheet.

The response of a Gabor filter is expressed by the following equation (25), where Gi represents the i-th Gabor filter, Ji represents the result of the i-th Gabor filter (Gabor Jet) and I represents the input image. Actually, the equation (25) can be calculated at a high speed by using fast Fourier transform.

$$J_i(x,y)=G_i(x,y)\otimes I(x,y) \quad (25)$$

That is, for example, when a learning sample including 48×48 pixels is used, 48×48=2304 outputs are acquired as Gabor Jets Ji from the i-th Gabor filter.

To examine the performance of the prepared Gabor filter, the image acquired by filtering is reconstructed. The reconstructed image H is expressed by the following equation (26).

$$H(x, y) = \sum_{i=1}^{n} a_i J_i(x, y) \quad (26)$$

Then, an error E of the reconstructed image H with respect to the input image I is expressed by the following equation (27).

$$\begin{aligned} E &= \frac{1}{2}\|I(x, y) - H(x, y)\|^2 \\ &= \frac{1}{2}\sum_{x,y}(I(x, y) - H(x, y))^2 \\ &= \frac{1}{2}\sum_{x,y}\left(I(x, y) - \sum_{i=0}^{Q} a_i J_i(x, y)\right)^2 \\ &= \frac{1}{2}\sum_{x,y}\left(I(x, y) - \sum_{i=0}^{Q} a_i G_i \times I\right)^2 \end{aligned} \quad (27)$$

As an optimum parameter a that minimizes this error E is found, the H image can be reconstructed and the performance of the Gabor filter can be examined.

(6-5) Support Vector Machines

SVMs will now be described. SVMs are considered to have the highest learning generalization performance in the field of pattern recognition. Using SVMs, whether a facial expression is a certain expression or not is identified.

SVMs are described, for example, in B. Sholkopf, C. Burges, A. Smola, "Advance in Kernel Methods Support Vector Learning," The MIT Press, 1999.

The result of the preliminary experiment conducted by the inventors shows that the recognition method using SVMs provides better results than principal component analysis (PCA) and techniques using neural networks.

The SVM technique is a technique of classifying a provided data set into two classes, as expressed by the following equation (28). In this case, if a data set belongs to class A, y is 1. If a data set belongs to class B, y is −1. It is assumed that a sample x belongs to a set R(N) of N-dimensional real vectors.

$$y=f(x), x \in R(N), y=\pm 1 \quad (28)$$

SVMs are learners using linear identifiers (perceptrons) for the identification function f and can be extended to a non-linear space by using kernel functions. In learning the identification function, a maximum margin for class separation is taken and its solution is acquired by solving a quadratic mathematical planning problem. Therefore, it can be theoretically guaranteed that a global solution can be reached.

Figure 21:
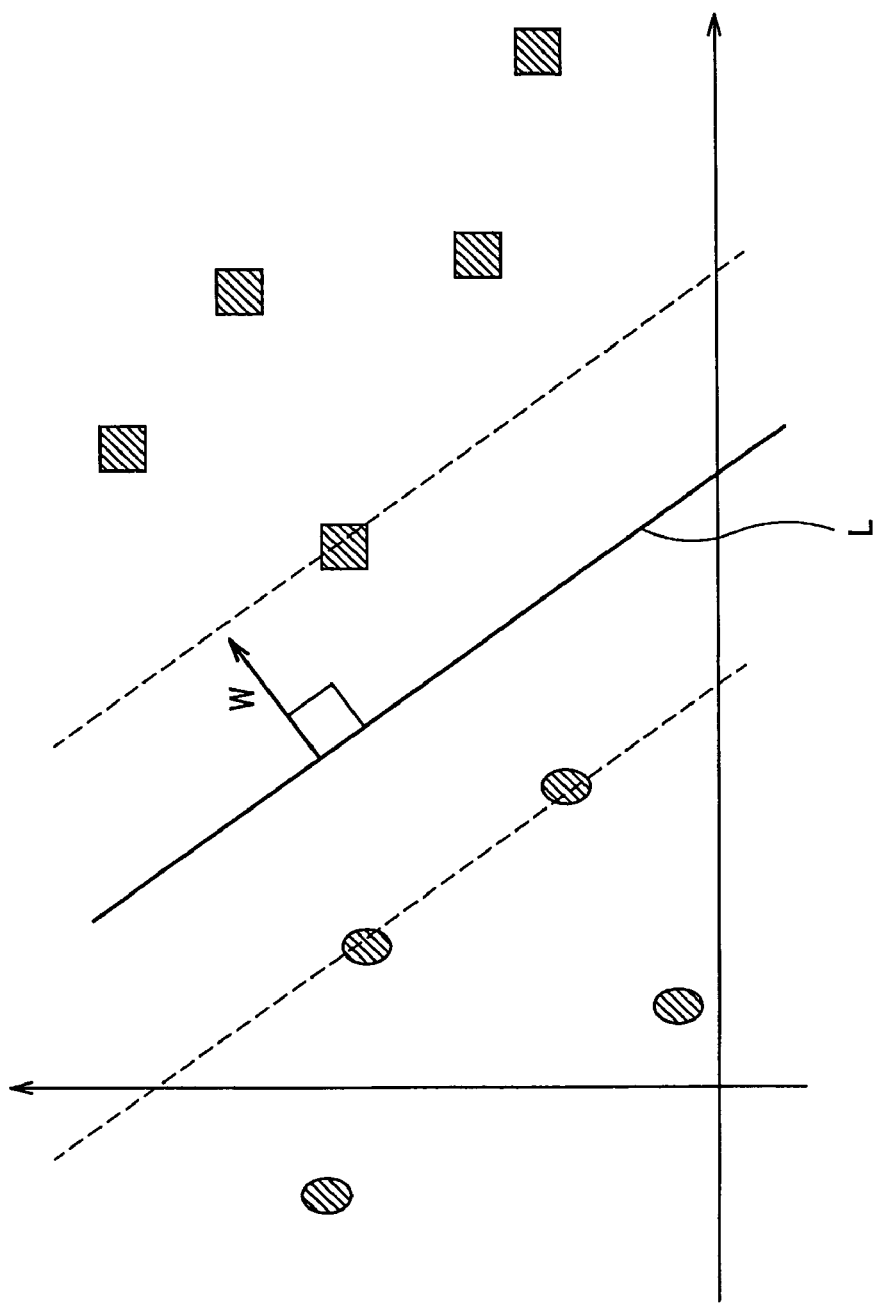
FIG. 21 is a view showing an identification plane of soft margin SVM.

Normally, the problem of pattern recognition is to find the identification function f of the following equation (29) with respect to test samples x=(x1, x2, ..., xn).

$$f(x) = \sum_{j=1}^{n} w_j x_j + b = w \cdot x + b \quad (29)$$

parameter $w_j$: weighting of linear identifier parameter b: bias term w: weighting vector A set of points satisfying f(x)=0 of this identifier (i.e., identification plane) is a (d−1)-dimensional hyperplane L. As shown in FIG. 21, an identification plane for identifying class A indicated by ○ and class B indicated by □ in an SVM is the hyperplane L passing the middle between class A and class B.

The class labels (teacher labels) of learning samples (vector x) for SVMs are expressed by the following equation (30)

$$y=(y1, y2, \ldots, yn) \qquad (30)$$

Since the parameters w and b have redundancy, if a restriction that |w×x+b| (where w and x are vectors) of the equation (29) is 1 is added to a sample that is closest to the hyperplane, face pattern recognition in SVMs can be considered to be a problem of minimizing the square of the weighting element w under the restricting condition expressed by the following formula (31).

$$y_i(w \cdot x + b) \geq 1 \qquad (31)$$

The problem with such a restriction can be solved by using the Lagrange's undefined constant method. That is, the Lagrange's expressed by the following equation (32) is first introduced.

$$L(w, b, a) = \frac{1}{2}\|w\|^2 - \sum_{j=1}^{l} \alpha_i(y_i((w \cdot x_i + b) - 1)) \qquad (32)$$

Next, each of b and w is partially differentiated, as expressed by the following equation (33).

$$\frac{\partial L}{\partial b} = \frac{\partial L}{\partial w} = 0 \qquad (33)$$

$$\rightarrow \sum_{i=1}^{l} \alpha_i y_i = 0, \, w = \sum_{i=1}^{l} \alpha_i y_i x_i$$

As a result, face pattern identification in SVMs can be considered to be a quadratic planning problem expressed by the following formula (34).

$$\max_\alpha \sum_{i=1}^{l} \alpha_i - \frac{1}{2}\sum_{i,j=1}^{l} \alpha_i \alpha_j y_i y_j x_i^T x_j \qquad (34)$$

restricting condition: $\alpha_i \geq 0$, $\Sigma \alpha_i y_i = 0$

In the case where the number of dimensions in the feature space is less than the number of samples, a slack variable $\xi \geq 0$ is introduced in order to relax the restricting condition, and the restricting condition is changed as expressed in the following formula (35).

$$y_i(w \cdot x + b) \geq 1 - \xi_i$$

$$\xi \geq 0, i = 1, \ldots l \qquad (35)$$

For optimization, the objective function of the following formula (36) is minimized.

$$\frac{1}{2}\|w\|^2 + C\sum_{i=1}^{l} \xi_i \qquad (36)$$

In the formula (36), C is a coefficient designating the extent to which the restricting condition should be relaxed and its value must be decided experimentally. The problem related to the Lagrange's constant α is changed as expressed by the following formula (37).

$$\max_\alpha \sum_{i=1}^{l} \alpha_i - \frac{1}{2}\sum_{i,j=1}^{l} \alpha_i \alpha_j y_i y_j x_i^T x_j \qquad (37)$$

restricting condition: $0 \leq \alpha_i \leq C$, $\Sigma \alpha_i y_i = 0$

However, the formula (37) itself cannot solve the non-linear problem. Thus, in this embodiment, a kernel function K is introduced to carrying out mapping in a high-dimensional space (kernel trick) and linear separation is carried out in that space. Therefore, it is equivalent to non-linear separation in the original space.

The kernel function is expressed by the following equation (38) using a certain map Φ.

$$K(x, y) = \Phi(x)\Phi(y) \qquad (38)$$

The identification function f of the equation (29) can also be expressed by the following equation (39).

$$f(\Phi(x)) = \sum_{i=1}^{l} \alpha_i y_i \Phi(x)^T \Phi(x_i) + b \qquad (39)$$

$$= \sum_{i=1}^{l} \alpha_i y_i K(x, x_i) + b$$

Moreover, learning can be considered to be the quadratic planning problem expressed by the following formula (40).

$$\max_\alpha \sum_{i=1}^{l} \alpha_i - \frac{1}{2}\sum_{j=1}^{l} \alpha_i \alpha_j y_i y_j K(x_i, x_j) \qquad (40)$$

restricting condition: $0 \leq \alpha_i \leq C$, $\Sigma \alpha_i y_i = 0$

As the objective function si minimized under the restricting condition expressed by the formula (40), the identification function f of the equation (29) can be calculated as expressed by the following equation (41).

$$f(x) = \text{sgn}\left(\sum_{i=1}^{l} \alpha_i y_i K(x_i, x) + b\right) \qquad (41)$$

$$b = -\sum_{i=1}^{l} \alpha_i y_i K(x_i, x)$$

As exemplary kernel functions, for example, polynomial kernel, sigmoid kernel, and Gaussian kernel (RBF or radius basic function) expressed by the following equations (42) to (44) can be used.

$$K(x, y) = (x \cdot y + 1)^p \qquad (42)$$

$$K(x, y) = \tanh(ax \cdot y + b) \qquad (43)$$

$$K(x, y) = \exp\left(-\frac{|x - y|^2}{a^2}\right) \qquad (44)$$

(7) Facial Expression Recognition Method

The facial expression recognition method will now be described. As described above, the learning methods for the expression recognizing unit 22 includes the first method of SVM-learning Gabor filter outputs for each expression identifier 41x constituting the expression recognizing unit 22, the second method of learning Gabor filter outputs by boosting, and the third method of selecting some of all the Gabor filters by boosting and SVM-learning their outputs. Recognition methods in the expression recognizing unit 22 acquired by these three learning methods will be described hereinafter as first to third recognition methods.

(7-1) First Recognition Method (Gabor Filter with SVM)

First, the first recognition method will be described. An input image from an image pickup unit such as a camera is inputted to the face detection apparatus 10 shown in FIG. 4 and a face image is detected by the above-described method. When a face is found in the input image, the image at the position of the face is cut out and inputted to the facial expression recognition apparatus 20.

Next, as in the case of learning, the face image is resized to 48×48 pixels. The resized face image is supplied to the face feature extracting unit 21, and 92160-dimensional Gabor filter outputs are generated by using Gabor filters. The Gabor filter outputs are supplied to the expression recognizing unit 22. The expression recognizing unit 22 is adapted for classifying face images into seven expressions and has the expression identifiers 41x corresponding to the seven expressions to be identified, respectively. The Gabor filter outputs are inputted to the seven expression identifiers 41x and each expression identifier 41x identifies whether the expression of the face is a specific expression as an identification target or an expression different from the specific expression.

Discrimination function outputs are acquired with respect to the seven expression identifiers 41x based on SVM learning. Each of the expression identifiers 41x has acquired N support vectors, N coefficients α and labels y of the individual support vectors from learning, and finds the result of recognition from the identification function of the equation (39) using the Gaussian kernel function of the equation (44). In this operation, 92160-dimensional kernel function calculation is carried out N times. Then, the expression deciding unit 42 shown in FIG. 15 outputs an expression that is the identification target of the expression identifier 41x having the largest value of the identification results (discrimination function outputs) of the seven expression identifiers 41x, as the result of judgment of the facial expression recognition apparatus 20.

(7-2) Second Recognition Method (Gabor Filter with Adaboost)

Next, the second recognition method will be described. As in the first recognition method, a face image detected and cut out by the face detection apparatus 10 is inputted and this face image is resized to 48×48 pixels. Then, discrimination function outputs are acquired with respect to the seven expression identifiers 41x based on Adaboost learning of the above-described second learning method. The discrimination function H is expressed by the following equation (45).

$$H(x) \sum_{t=1}^{T} \alpha_t h_t(x) \quad (45)$$

In accordance with a Gabor filter selected by Adaboost learning, a weak hypothesis that outputs ht in the equation (45) is decided. That is, the equation (23) is determined in accordance with the direction of the selected Gabor filter, and the scale parameter of the equation (22) is decided from the scale of the selected Gabor filter. A Gabor kernel is thus acquired.

The result of application of this Gabor kernel to an image around a selected pixel (Gabor filter output) is discriminated by using the threshold value Th calculated in learning. The result of discrimination from which its sign (sgn) has been removed is the output ht of the weak hypothesis. This output is multiplied by the reliability a of the weak hypothesis decided in learning, and the result is added. This calculation is carried out for all the weak hypotheses to acquire outputs of discrimination functions H (sum value for taking weighted vote). Then, the expression deciding unit 42 shown in FIG. 15 outputs the largest one of the outputs of discrimination functions H of the seven expression identifiers 41x, as the expression of the input face image. The discrimination function H may discriminate whether the expression of the input face is the expression regarded as the identification target by the expression identifier 41x in accordance with weighted vote (with respect to whether the sign of the equation (45) is positive or negative) acquired in each expression identifier 41x. However, for example, in the case of identifying plural expressions by plural expression identifiers 41x, two or more expression identifiers 41x can identify expressions simultaneously. That is, the outputs of discrimination functions H in two or more expression identifiers 41x can be positive. In such a case, the expression of the larger output value of discrimination function H, which is the sum value of multiplied and added weighting, is used as the result of recognition.

(7-3) Third Recognition Method (Gabor Filter with Adaboost and SVM)

Next, the third recognition method will be described. As in the first recognition method, a face image detected and cut out by the face detection apparatus 10 is inputted and this face image is resized to 48×48 pixels. Then, discrimination function outputs are acquired with respect to the seven expression identifiers 41x based on the learning of the above-described third learning method (hereinafter referred to as AdaSVM).

First, using a Gabor filter selected by AdaSVM learning, vectors of dimensions corresponding to the number of filters employed for weak hypotheses generated by Adaboost learning are generated from the input image. That is, the Gabor filter acquired in accordance with the equations (22) and (23) for one of the scale and direction selected by the above-described Adaboost learning is applied to an image around a selected pixel selected by the same learning, and one filter output is thus acquired. This operation is repeated a number of times corresponding to the number of filters, thus generating input vectors corresponding to the number of filters.

Then, using the support vectors of the filter outputs, their coefficients and labels, acquired by SVM learning of AdaSVM learning, the input vectors are substituted into the equations (44) and (39) to acquire discrimination function outputs f. Then, the expression deciding unit 42 outputs an expression of the largest one of the outputs of discrimination functions H of the seven expression identifiers 41x, as the expression of the input face.

Since such a facial expression recognition apparatus 20 uses Gabor filters robust against shifts of images, it can carry out expression recognition without performing processing such as positioning of the result of face detection and can recognize a facial expression at a high speed.

As identification can be made by SVMs using Gabor filter outputs as feature quantities, seven expressions can be accurately identified. Similarly, as expressions are identified by using plural weak hypotheses generated by boosting using Gabor filter outputs as feature quantities, recognition can be carried out at a higher speed.

Moreover, if only a filter selected in learning based on Adaboost learning using Gabor filter outputs as feature quantities is used, and expression identification is carried out by SVMs with vectors of reduced dimensions, arithmetic processing in learning and recognition can be reduced and high-speed processing can be realized. If Adaboost and SVMs are combined for learning, generalization errors can be reduced further and generalization performance can be improved.

Furthermore, while learning and identification are carried out with face images rescaled 48×48 pixels in this embodiment, increase in resolution enables further improvement in performance.

By combining this face recognition with the above-described face detection apparatus 10, it is possible to detect faces in real time from inputted dynamic images or the like and to recognize the expressions of the detected face images.

(8) Other Embodiments

The facial expression recognition system in this embodiment can cut out face areas from input images in real time and classify facial expressions. Therefore, if this facial expression recognition system is provided on a robot apparatus of various purposes such as entertainment and nursing, real-time interaction between humans and the robot apparatus is possible. The robot apparatus, equipped with this facial expression recognition system, can recognize facial expressions of users and thus can carry out new emotional expressions to the users. Moreover, if such a facial expression recognition system is interlocked with an apparatus having an animation generation and display function, the apparatus can recognize facial expressions of humans and display animations responding to the facial expressions.

Such a robot apparatus or animation generation apparatus can understand facial expressions of users and show certain responses in accordance with the facial expressions of the users. For example, when the user's expression of "happiness" is recognized, the robot apparatus can similarly shows the expression of "happiness" or the animation apparatus can display an animation representing the expression of "happiness". When the user's expression of "sadness" is recognized, the apparatus can react to cheer up the user.

In this manner, the facial expression recognition system in this embodiment can automatically recognize facial expressions and can be easily used on the basis facial expressions as action measurement criteria. As detailed analysis of dynamic changes of faces is made possible, which was impossible in the conventional technique, it has significant effects on basic research. A computer system having such capability can be broadly used in various fields of basic and applied research such as man-machine communications, security, law enforcement, psychiatry, education, and telecommunications.

(9) Robot Apparatus

A specific example of the robot apparatus equipped with the above-described facial expression recognition system will now be described. In this embodiment, a two-legged walking robot apparatus is described as an example. However, the system can be applied not only to a two-legged walking robot apparatus but a lso a four-legged, wheeled or otherwise movable robot apparatus.

Figure 22:
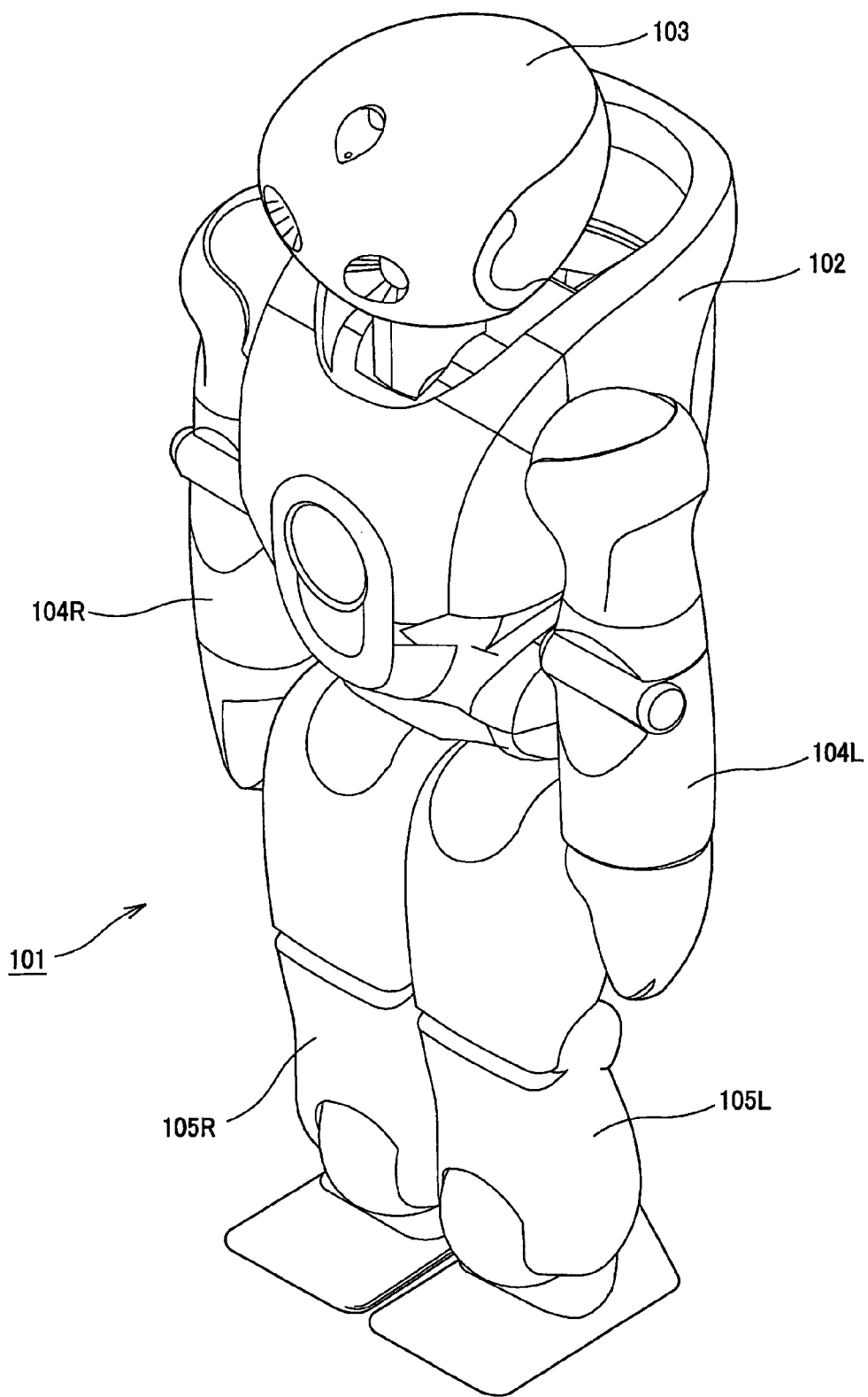
FIG. 22 is a perspective view showing an outlook of a robot apparatus according to an embodiment of this invention.

This humanoid robot apparatus is a practical robot that assists human activities in living environment and various situations of daily life. It is an entertainment robot that can act in accordance with its internal state (anger, sadness, joy, pleasure, etc.) and can also exhibit basic actions of humans. It is adapted for exhibiting actions in accordance with facial expressions of users recognized by the above-described facial expression recognition system. FIG. 22 is a perspective view showing an outlook of the robot apparatus in this embodiment.

As shown in FIG. 22, a robot apparatus 101 is constructed by connecting a head unit 103, left and right arm units 104R, L, and left and right leg units 105R, L to predetermined positions on a trunk unit 102. (R and L are suffixes representing right and left, respectively. These suffixes will be similarly used hereinafter.)

Figure 23:
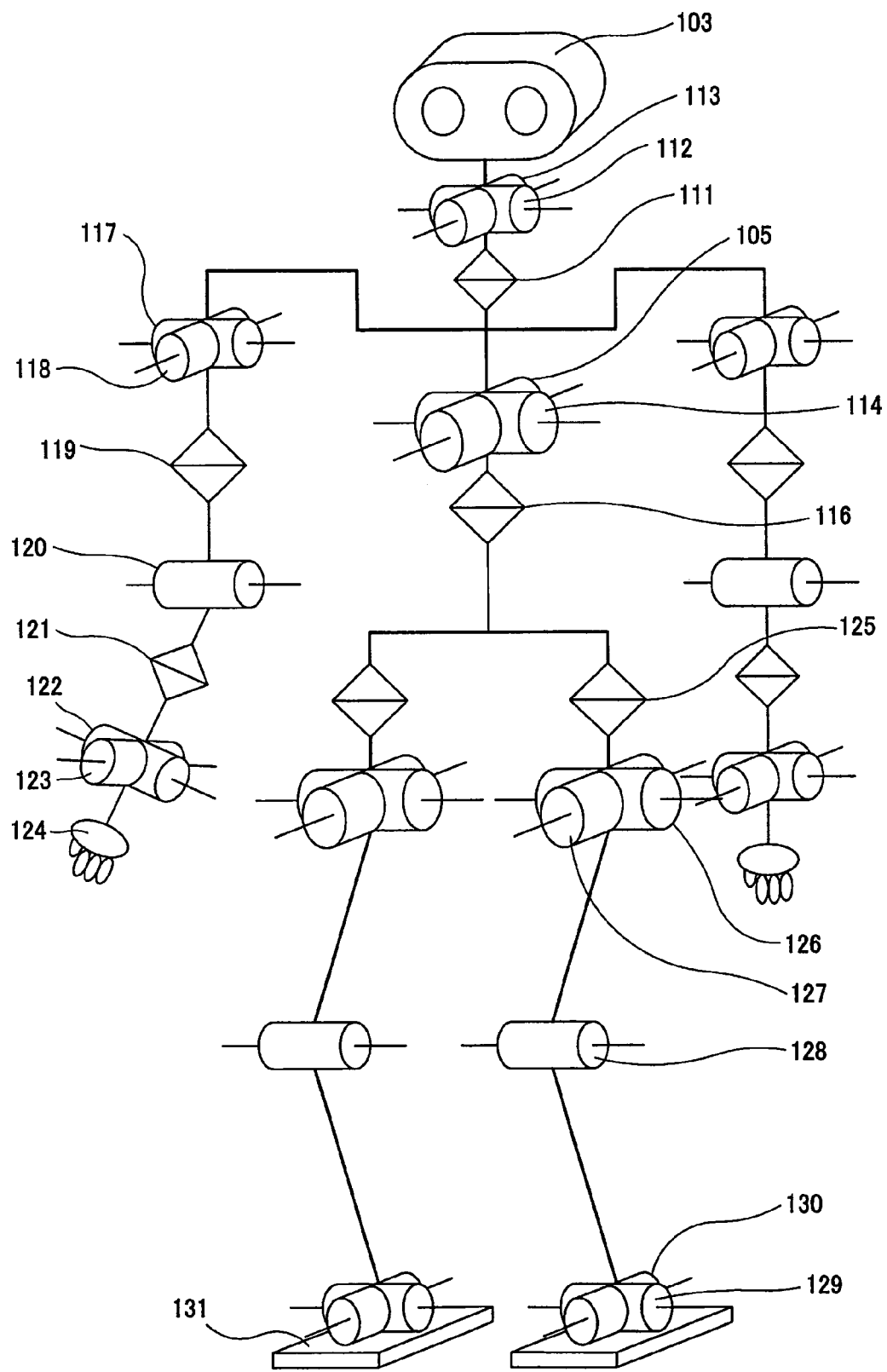
FIG. 23 is a view schematically showing a joint degree-of-freedom structure of the robot apparatus.

FIG. 23 schematically shows a joint degree-of-freedom structure of the robot apparatus 101. The neck joint supporting the head unit 103 has three degrees of freedom based on a neck joint-yaw shaft 111, a neck joint pitch shaft 112 and a neck joint roll shaft 113.

Each of the arm units 104R, L forming the upper limbs has a shoulder joint pitch shaft 117, a shoulder joint roll shaft 118, an upper arm yaw shaft 119, an elbow joint pitch shaft 120, a forearm yaw shaft 121, a wrist joint pitch shaft 122, a wrist joint roll shaft 123, and a hand part 124. The hand part 124 is actually a multi-joint multi-degree of freedom structure including plural fingers. However, since the operations of the hand part 124 provide less contribution to or effects on attitude control or walking control of the robot apparatus 101, to simplify the explanation, the hand part 124 is assumed to have zero degree of freedom in this specification. Therefore, each arm has seven degrees of freedom.

The trunk unit 102 has three degrees of freedom based on a trunk pitch shaft 114, a trunk roll shaft 115 and a trunk yaw shaft 116.

Each of the leg units 105R, L forming the lower limbs has a hip joint yaw shaft 125, a hip joint pitch shaft 126, a hip joint roll shaft 127, a knee joint pitch shaft 128, an ankle joint pitch shaft 129, an ankle joint roll shaft 130, and a foot part 131. In this specification, the point of intersection between the hip joint pitch shaft 126 and the hip joint roll shaft 127 defines the position of the hip joint of the robot apparatus 101. The human foot part 131 is actually a structure including a multi-joint multi-degree of freedom sole. However, in this specification, the sole of the robot apparatus 101 is assumed to have zero degrees of freedom in order to simplify the explanation. Therefore, each leg has six degrees of freedom.

To summarize the above-described structure, the robot apparatus 101 has 3+7×2+3+6×2=32 degrees of freedom in total. However, the robot apparatus for entertainment is not necessarily limited to the 32 degrees of freedom. In accordance with restrictions in design and production and required specifications, the number of degrees of freedom, that is, the number of joints, can be increased or decreased appropriately.

The degrees of freedom of the robot apparatus 101 as described above are actually provided by using an actuator. Since elimination of unwanted bulges on the appearance, formation of a shape close to the natural shape of a human body, and attitude control of the two-legged unstable structure are demanded, it is preferred that the actuator is small-sized and light-weight.

Figure 24:
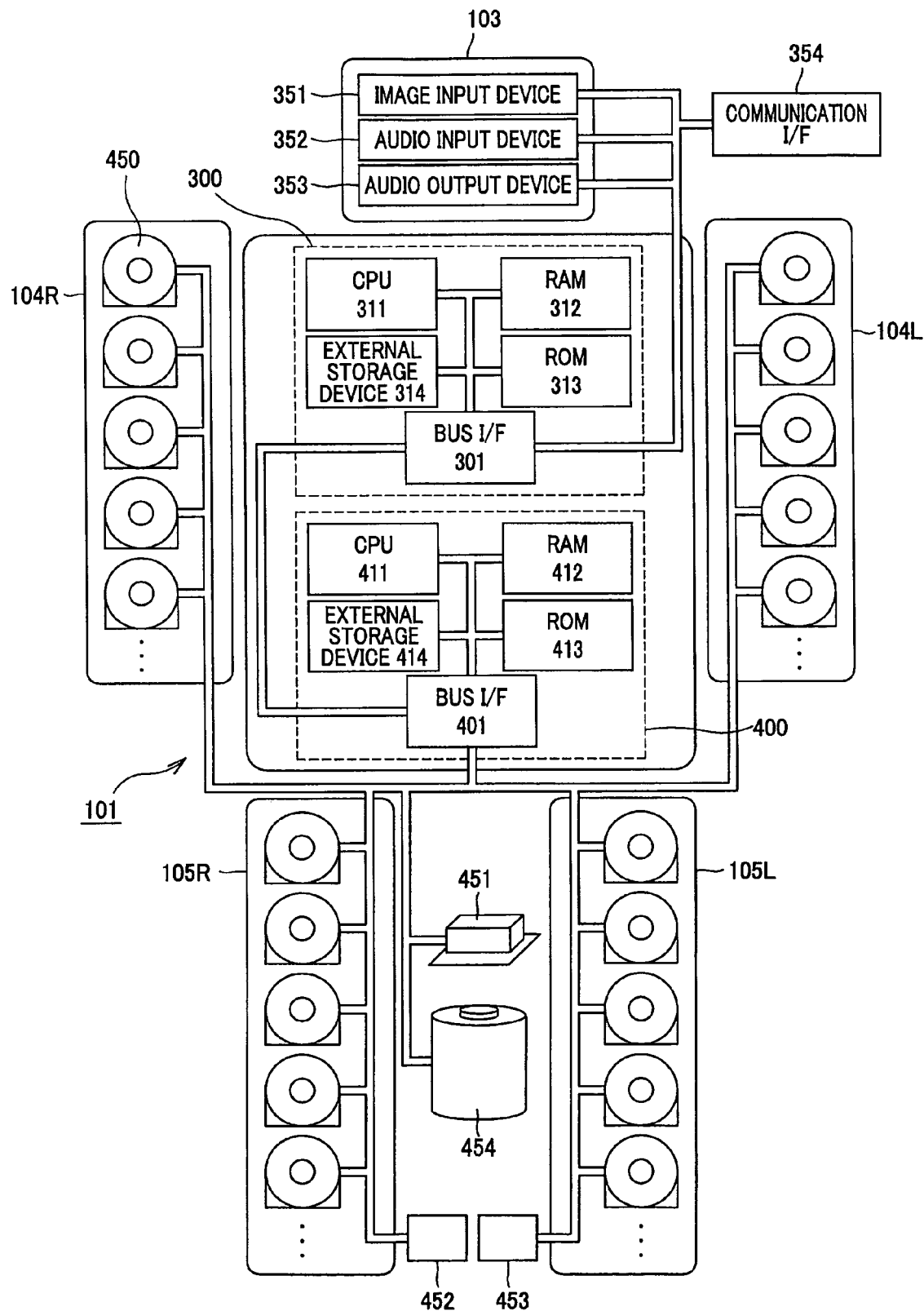
FIG. 24 is a schematic view showing a control system structure of the robot apparatus.

In such a robot apparatus, a control system for controlling the operations of the whole robot apparatus is provided in the trunk unit 102 or the like. FIG. 24 is a schematic view showing the control system structure of the robot apparatus 101. As shown in FIG. 24, the control system includes a thought control module 300 for dynamically responding to user inputs or the like and controlling judgment of emotions and expression of emotions, and an action control module 400 for controlling general coordination of the robot apparatus 101 such as driving of actuators 450.

The thought control module 300 includes a central processing unit (CPU) 311 for executing arithmetic processing related to judgment and expression of emotions, a random access memory (RAM) 312, a read-only memory (ROM) 313, and an external storage device (hard disk drive or the like) 314. The thought control module 300 is an independently driven information processing device capable of performing self-complete processing within the module.

This thought control module 300 decides the current emotion and will of the robot apparatus 101 in accordance with external stimulations such as image data inputted from an image input device 351 and audio data inputted from an audio input device 352. That is, it can recognize a user's facial expression from inputted image data and reflect this information on the emotion and will of the robot apparatus 101 so as to exhibit an action corresponding to the user's facial expression, as described above. The image input device 351 has, for example, plural CCD (charge-coupled device) cameras. The audio input device 352 has, for example, plural microphones.

The thought control module 300 issues commands to the action control module 400 to execute operation or action sequences based on the decision of the will, that is, movement of the four limbs.

The action control module 400 includes a CPU 411 for controlling general coordination of the robot apparatus 101, a RAM 412, a ROM 413, and an external storage device (hard disk drive or the like) 414. The action control module 400 is an independently driven information processing device capable of performing self-complete processing within the module. In the external storage device 414, for example, walking patterns calculated off-line, target ZMP orbit, and other action plans can be stored.

Various devices such as actuators 450 for realizing the degrees of freedom of the joints dispersed in the whole body of the robot apparatus 101 shown in FIG. 23, a distance measuring sensor (not shown) for measuring the distance from a target object, an attitude sensor 451 for measuring the attitude and inclination of the trunk unit 102, grounding confirmation sensors 452, 453 for detecting takeoff or landing of the left and right soles, load sensors provided on the soles 131, and a power control device 454 for controlling the power supply such as a battery, are connected to the action control module 400 via a bus interface (I/F) 401. The attitude sensor 451 is formed, for example, by a combination of an acceleration sensor and a gyro sensor. Each of the grounding confirmation sensors 452, 453 is formed by a proximity sensor, micro switch or the like.

The thought control module 300 and the action control module 400 are constructed on a common platform and are interconnected via bus interfaces 301, 401.

In the action control module 400, the actuators 450 control general coordination of the body in order to exhibit an action designated by the thought control module 300. Specifically, the CPU 411 takes out an operation pattern corresponding to the action designated by the thought control module 300 from the external storage device 414, or internally generates an operation pattern. Then, the CPU 411 sets foot movement, ZMP orbit, trunk movement, upper limb movement, horizontal position and height of waist and the like in accordance with the designated operation pattern, and transfers a command value designating an operation corresponding to these settings to each actuator 450.

The CPU 411 also detects the attitude and inclination of the trunk unit 102 of the robot apparatus 101 from an output signal of the attitude sensor 451 and detects whether the leg units 105R, L are in an idling state or standing state from output signals of the grounding confirmation sensors 452, 453. The CPU 411 thus can adaptively control general coordination of the robot apparatus 101. Moreover, the CPU 411 controls the attitude and operation of the robot apparatus 101 so that the ZMP position constantly moves toward the center of a ZMP stable area.

The action control module 400 sends the processing state, that is, the extent to which the action corresponding to the will decided by the thought control module 300 was exhibited, to the thought control module 300. In this manner, the robot apparatus 101 can judge the states of itself and its surroundings on the basis of the control program and can act autonomously.

For such a robot apparatus, a human interface technique is required that enables the robot apparatus to respond within a predetermined time period in a dynamically changing work environment. As the above-described face detection and facial expression recognition techniques are applied to the robot apparatus 101 according to this embodiment, the robot apparatus 101 can identify the facial expressions of users in the surroundings (owner, his/her friends, or authorized user) and control reactions based on the result of recognition (that is, in accordance with the users). Therefore, a high entertainment property can be realized.

This invention is not limited to the above-described embodiment and various changes and modifications can be made without departing from the scope of this invention. One or more arbitrary processing of the above-described learning processing, face detection processing, facial expression learning processing and facial expression recognition processing in the above-described face detection apparatus may be realized by hardware or by causing an arithmetic unit (CPU) to execute computer programs. In the case of using computer programs, the programs recorded on a recording medium can be provided or the programs can be provided by transmission via the Internet or other transmission media.

(10) EXAMPLE

Now, an example of the facial expression recognition system described in the above-described embodiment will be described in detail with reference to the results of actual experiment in the facial expression recognition system.

(10-1) Face Detection (10-1-1) Training Data

First, the inventors of this application used Cohn and Kanade's DFAT-504 data set (T. Kanade, J. F. Cohn, and Y. Tian, Comprehensive database for facial expression analysis. In Proceedings of the 4$^{th}$ international conference on automatic face and gesture recognition (FG'00), pages 46-53, Grenoble, France, 2000), as learning samples for the facial expression recognition system. The face detection apparatus was trained and tested (evaluated) on this data set. The data set consists of 100 university students ranging in age from 18 to 30 years. 65% were female, 15% were African-American, and 3% were Asian or Latino.

Videos were recorded in analog S-video using a camera located directly in front of the subject. Subjects were instructed by an experimenter to perform a series of 23 facial expressions. Subjects began and ended each display with a neutral face. Before performing each display, an experimenter described and modeled the desired display.

Of the face images thus acquired, image sequences from neutral to target display were digitized into 640×480 pixel arrays with 8-bit precision for grayscale values.

In this example, 313 sequences were selected form the data set. The only selection criterion was that a sequence should be labeled as one of the six basic emotions (basic expressions), that is, anger, hatred, fear, happiness, sadness, and surprise. The sequences came from 90 subjects, with one to six emotions per subject. The first and last frames (neutral and peak) were used as training images and for testing generalization to new subjects, for a total of 625 data. The trained classifiers were later applied to the entire sequence.

(10-1-2) Location of Faces

The face detection apparatus can scan all possible 24×24 pixel patches (windows) in the image and classify each as face or non-face in real time. In order to detect face images of arbitrary sizes, the scale of the patches in the input image are converted using a scale factor of 1.2. In the case where the detected patches have a significant overlap, these patches are averaged together as a detection window. The learning method for the face detection apparatus of this example will now be described.

First, the face detection apparatus was trained on 5000 face image samples (face patches) and 10000 non-face image samples (non-face patches) from about 8000 images collected from the web.

In a 24×24 pixel patch, there are over 160,000 possible filters, as described above. In this example, a subset (filter group) of 2 to 200 filters was selected from these 160,000 filters. Since the integral images shown in FIG. 5 are used for calculation of the filters, high-speed calculation of rectangular boxes can be carried out.

To improve the calculation efficiency further, the filters were selected by the method described in the above-described embodiment. Specifically, 5% of all the possible filters were randomly selected, and one filter having the best face discrimination performance that minimizes the weighted classification error on the sample was selected. Then, a filter made by shifting the selected filter by two pixels in each direction, a filter made by scaling the selected filter, and filters made by reflecting each shifted and scaled filter horizontally about the center (vertical bisector) of the image and superimposing it on the original, were generated. Of the selected filter and the newly generated filters, one filter with the best performance that minimizes the weighted classification error on the sample was selected, and the single-filter classifier was thus trained as a weak classifier (or "weak learner") for face discrimination.

This can be thought of as a single-generation genetic algorithm. Using this, a filter of equivalent performance can be selected much faster than exhaustively searching for the best classifier among all 160,000 possible filter and their reflection-based equivalents.

Using the selected classifier as the weak learner for boosting, the weights on the data were adjusted according to its performance on each data using the Adaboost rule.

This feature selection process was repeated with the new weights, and the entire boosting procedure was continued until the "strong classifier" (i.e., the combined classifier using all the weak learners for that stage) could achieve a minimum desired performance rate on a data set.

Finally, after training each strong classifier, a boot-strap round was performed (Kah Kay Sung and Tomaso Poggio, Example based learning for view-based human face detection, IEEE Trans. Pattern Anal. Mach. Intelligence, 20: 3951, 1998).

In this boot-strap round, the whole apparatus up to that point was scanned across a database of non-face images, and false alarms (images on which discrimination was incorrect) were collected and used as the non-faces for training the subsequent strong classifier in the sequence.

Figure 25A:
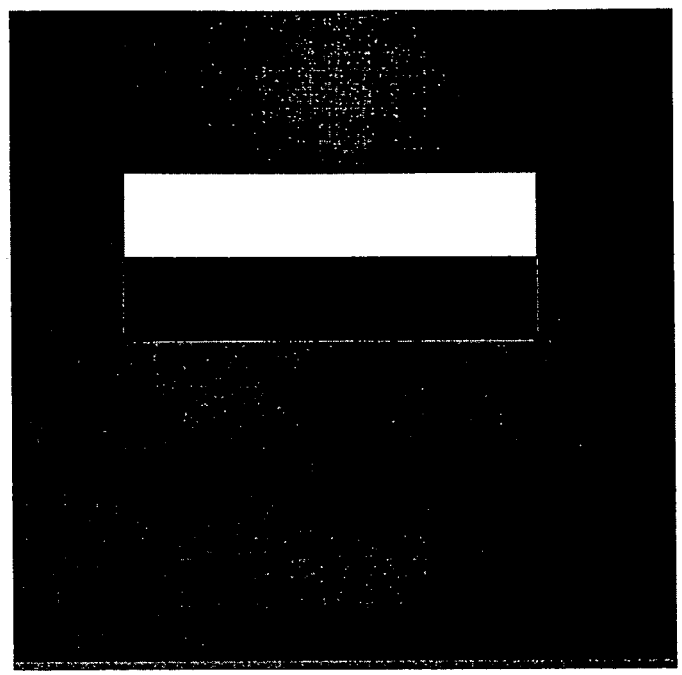
FIG. 25A is a view showing a first filter selected by a face detection apparatus in an example of this invention.
Figure 25B:
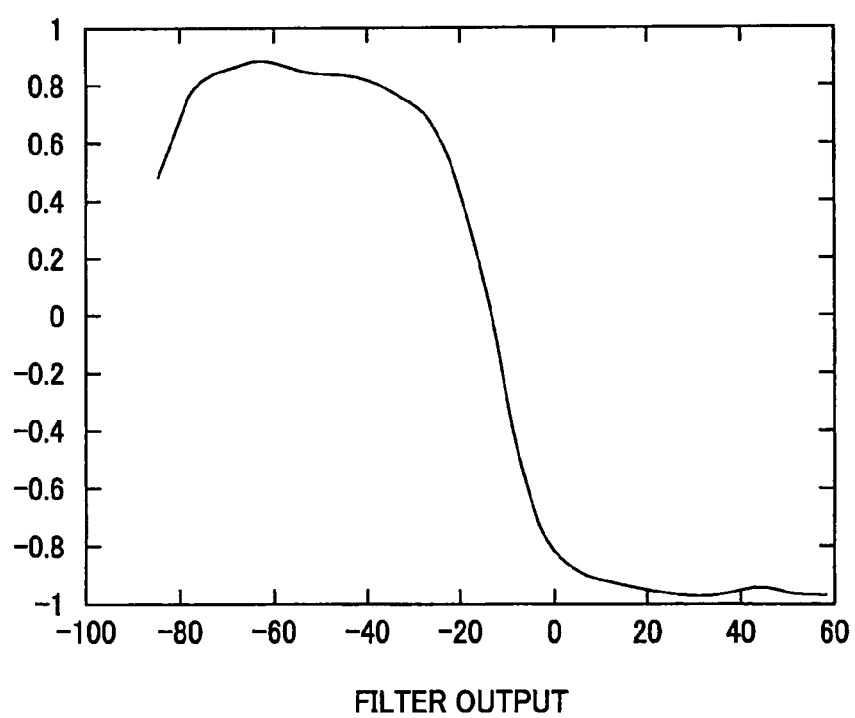
FIG. 25B is a view showing an actual-value output (or tuning curve) of a weak learner with respect to all the samples acquired by the filter shown in FIG. 25A, that is, an average face.
Figure 26A:
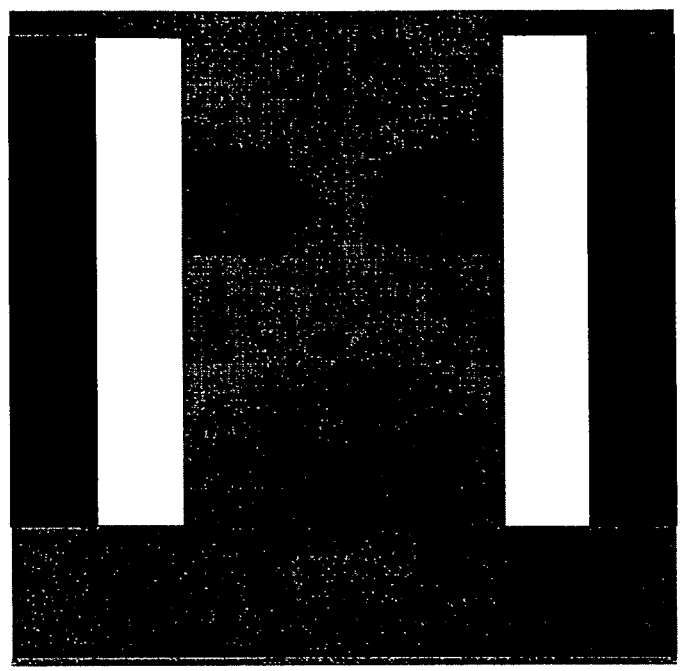
FIG. 26A is a view showing a second filter selected by the face detection apparatus in an example of this invention.
Figure 26B:
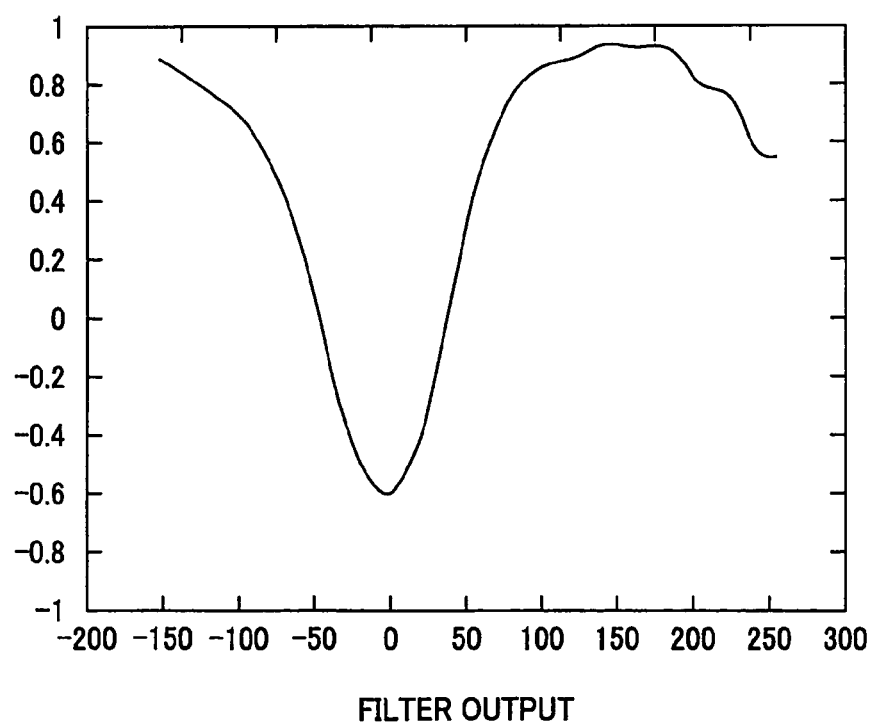
FIG. 26B is a view showing an actual-value output (or tuning curve) of a weak learner with respect to all the samples acquired by the filter shown in FIG. 25A, that is, an average face.

While Adaboost is used in the feature selection algorithm in the conventional example 1, which requires binary classifiers, an experiment was conducted in this example using "Gentleboost" to output real functions as outputs of weak discriminators as described in the above-described embodiment (J. Friedman, T. Hastie, and R. Tibshirani, Additive logistic regression: A statistical view of boosting, ANNALS OF STATISTICS, 28(2): 337-374, 2000). FIGS. 25A and 26A show the first two filters selected by the apparatus that learns in accordance with Gentleboost. FIGS. 25B and 26B show real-valued outputs (or tuning curves) of the weak learners on all the samples acquired by these filter, that is, on the average face.

On the tuning curves, a large value on the vertical axis indicates a face and a small value indicates a non-face. The first tuning curve shown in FIG. 25B shows that a white rectangular box over a black horizontal region (rectangular box) in the center of the window is evidence of a face, and for non-face otherwise. That is, a value acquired by subtracting the sum of brightness values in the lower black rectangular box from the sum of brightness values in the upper white rectangular box is the filter output, and an image on which the filter output is negative is a face image.

The second tuning curve shown in FIG. 26B shows bimodal distribution. Both the left and right rectangle features are the results of subtraction of the sum of brightness values in the outer rectangular box from the sum of brightness values in the inner rectangular box.

Both rectangle features 34A, 34B show that the filter output is positive, for example, for black hair, and negative for white hair. An image on which there is no change in brightness value across the rectangular boxes (the filter output is close to zero) in the rectangle features 34A, 34B, is a non-face.

Moreover, the inventors of this application discovered a method for eliminating the cascade of classifiers as in the conventional example 1. That is, the output results of the weak discriminators are sequentially judged and whether or not to continue the processing is decided. This is the technique of judging whether the output of each single weak discriminator is less than the abort threshold value or not after the output of each weak discriminator is made, and stopping discrimination (feature test) in the next weak discriminator if the output is less than the abort threshold value, as described above. As a result of preliminary testing conducted by the inventors of this application, the speed was dramatically improved with no loss of accuracy over the current apparatus.

The strong classifiers early in the sequence (the combined classifiers using all the weak classifiers for that stage) need very few features to achieve good performance. For example, the first stage can reject 60% of the non-faces, using only two features and using only 20 simple operations or about 60 microprocessor instructions. Therefore, the average number of features that need to be judged for each window is very small, making the overall processing in the apparatus very fast. The face detection apparatus of this example can achieve very high speed as well as very high accuracy.

In the face detection apparatus in this example, performance on a standard, public data set for benchmarking a frontal face detection apparatus such as the CMU-MIT data set was comparable to the above-described conventional example 1. While the data set used for this example contains wide variability in the images due to illumination, occlusions, and differences in image quality, the performance was much more accurate on the data set used for learning in this example, because the faces were frontal, focused and well lit, with simple background. All faces were detected for this data set.

(10-2) Facial Expression Recognition (10-2-1) Preprocessing

Next, the automatically located faces were rescaled to 48×48 pixels. A comparison was also made at double resolution (faces rescaled to 96×96 pixels). The typical distance between the centers of the eyes was roughly 24 pixels. These rescaled images were converted into a Gabor magnitude representation, using a bank of Gabor filters at eight orientations and five spatial frequencies (4:16 pixels per cycle at ½ octave steps).

(10-2-2) Facial Expression Classification

Facial expression classification was based on support vector machines (SVMs). SVMs are suited to this task because the high dimensionality of the Gabor representation does not affect training time for kernel classifiers (facial expression identifiers). The facial expression classifiers performed a 7-way forced choice between the following emotion categories: happiness, sadness, surprise, disgust, fear, anger, and neutral.

The classification was performed in two stages. First, support vector machines performed binary decision tasks. Seven SVMs were trained to discriminate each emotion from everything else. The emotion category decision was then implemented by choosing the classifier that provided maximum margin for the data of the detection target expression. As linear, polynomial, and RBF kernels with Laplacian and Gaussian basis functions were explored, linear and RBF kernels employing a unit-width Gaussian performed best. The examples using linear and RBF kernels will now be described.

The inventors of this application compared expression recognition performance using the output of the above-described automatic face detection apparatus, with expression recognition performance on images with explicit feature alignment using hand-labeled features. For the manually aligned face images, the faces were rotated so that the eyes were horizontal and then warped so that the eyes and mouth were aligned in each face.

Generalization to novel subjects was tested using leave-one-sample-out cross validation. The results are given in the following Table 1. These results are on 96×96 pixel samples.

TABLE 1

| SVM | Automatic | Manually aligned |
| --- | --- | --- |
| Linear kernels | 84.8 | 85.3 |
| RBF kernels | 87.5 | 87.6 |

As shown in Table 1, there was no significant difference between expression recognition performance on the automatically detected faces and expression recognition performance on the manually aligned faces (z=0.25, p=0.4).

(10-3) Comparison of SVMs and Adaboost

Next, performance of the emotion classifier (expression identifier) that performs expression recognition based on SVMs was compared with performance of an emotion classifier using Adaboost.

The Adaboost emotion classifier used Gabor filter outputs. There were 48×48×40=92160 possible features. A subset of these filters was selected using Adaboost. On each training (learning) round of repetitive processing, the threshold value and scale parameter of each filter were optimized and the feature (Gabor filter) that provided the best performance on the boosted data weight distribution was selected.

In evaluation at the time of learning, since Adaboost is significantly slower to train than SVMs, "leave-one-subject-out" cross validation (hereinafter referred to as leave-one-sample-out method) was not carried out. Instead, the learning samples were separated randomly into ten groups of roughly equal size and "leave-one-group-out" cross validation (hereinafter referred to as leave-one-group-out method) was carried out.

In the leave-one-sample-out method, all the samples except for one are used for learning and the excluded one sample is used for learning evaluation, and this is performed for the number of samples. In the leave-one-group-out method, all the samples except for one group of samples are used for learning and the excluded one group is used for learning evaluation, and this is performed for the number of groups.

In Adaboost, training for each emotion classifier continued until the distributions for the positive and negative samples were completely separated by a gap proportional to the widths of the two distributions. The total number of filters selected using this procedure was 538.

Figure 27A:
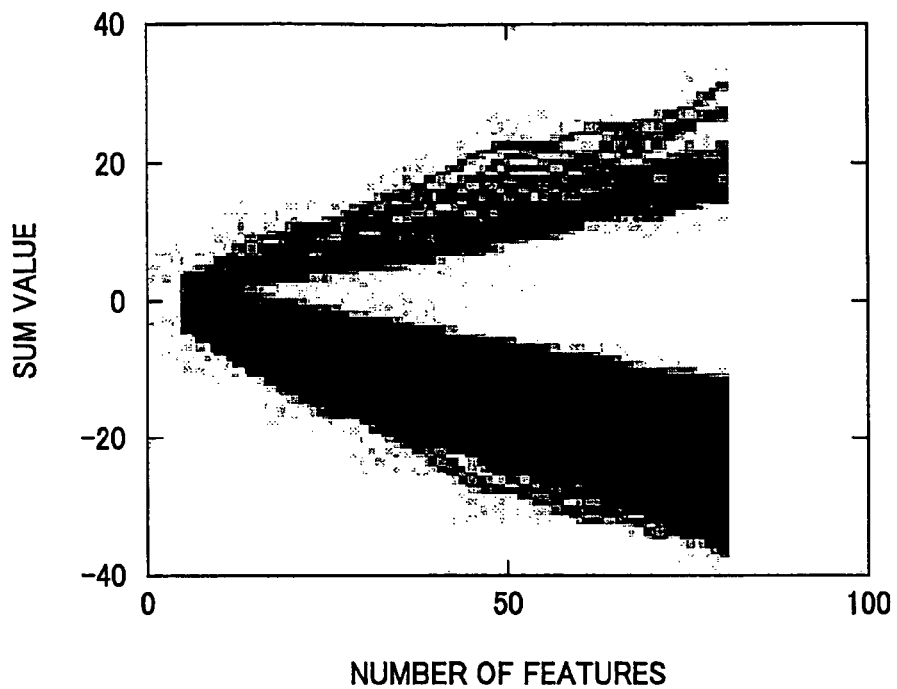
FIG. 27A is a graph showing an output of one emotion classifier during Adaboost training in an example of this invention.
Figure 27B:
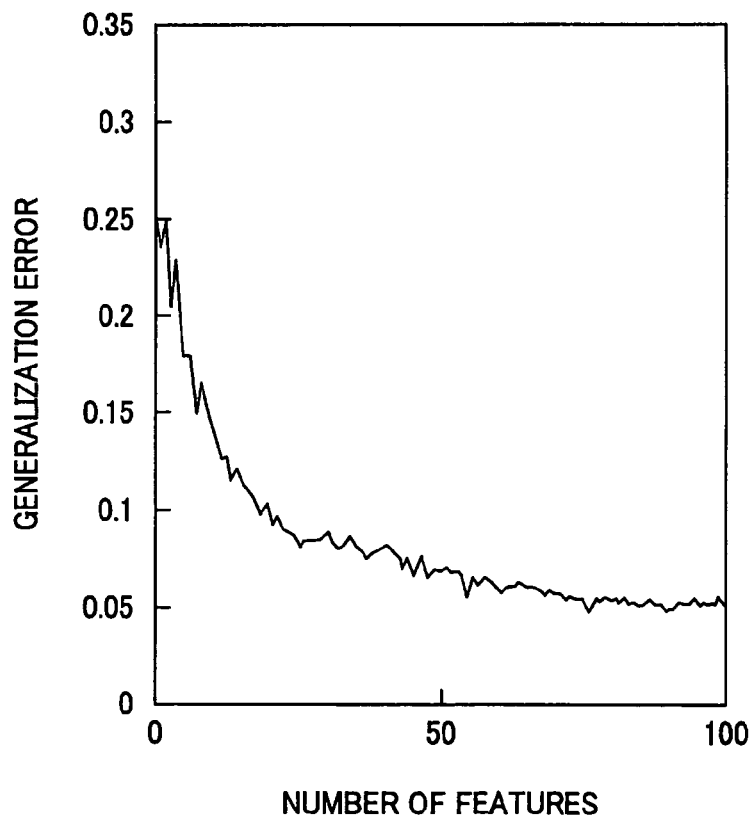
FIG. 27B is a graph showing a generalization error as a function of the number of features selected by Adaboost in the example of this invention.

FIG. 27A is a graph showing output of one expression classifier during Adaboost training. FIG. 27B is a graph showing generalization error as a function of the number of features selected by Adaboost. Response to each of training data is shown as a function of the number of features in accordance with improvement in skill of the classifier. Stopping criteria for Adaboost training can be thus found. The generalization error did not increase with "overtraining".

This apparatus calculated the output of Gabor filters less efficiently because the convolutions were done in pixel space rather than Fourier space, but the use of 200 times fewer Gabor filters nevertheless enabled sufficient expression identification and thus realized a substantially high speed. The following Table 2 shows comparison of performance of Adaboost, SVMs, and AdaSVMs (48×48 images). As shown in Table 2, the generalization performance of Adaboost was 85.0%, which was comparable to linear SVM performance on the leave-one-group-out testing paradigm, but Adaboost was substantially faster, as shown in the following Table 3. Table 3 shows the result of processing time and memory considerations.

Figure 28:
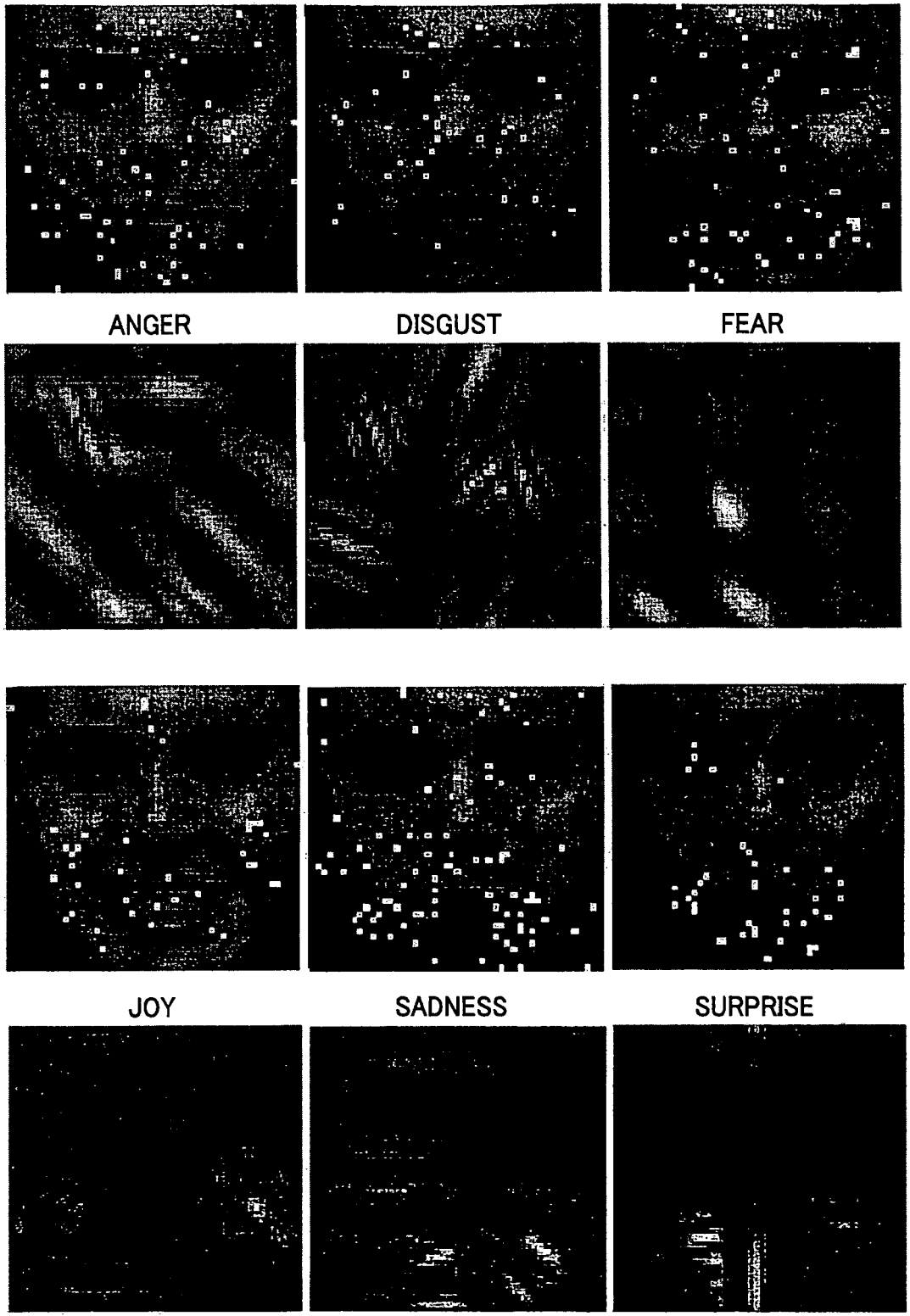
FIG. 28 is a view showing first five Gabor filers (Gabor features) selected for each emotion in an example of this invention.

Adaboost provides an added value of choosing which features (filters) are most informative to test at each round of repetitive learning for weak discriminators. FIG. 28 shows the first five Gabor filters (Gabor features) selected for each emotion. That is, FIG. 28 shows the output results of the first five filters with their frequencies and orientations sequentially selected in accordance with the Adaboost algorithm, for each of the expression identifiers corresponding to anger, disgust, fear, happiness, sadness, and surprise.

In FIG. 28, white dots indicate pixel positions of all the Gabor featured selected by learning. Below the face image of each expression, a linear combination of the real part of the first five Adaboost features selected for that expression is shown.

Figure 29:
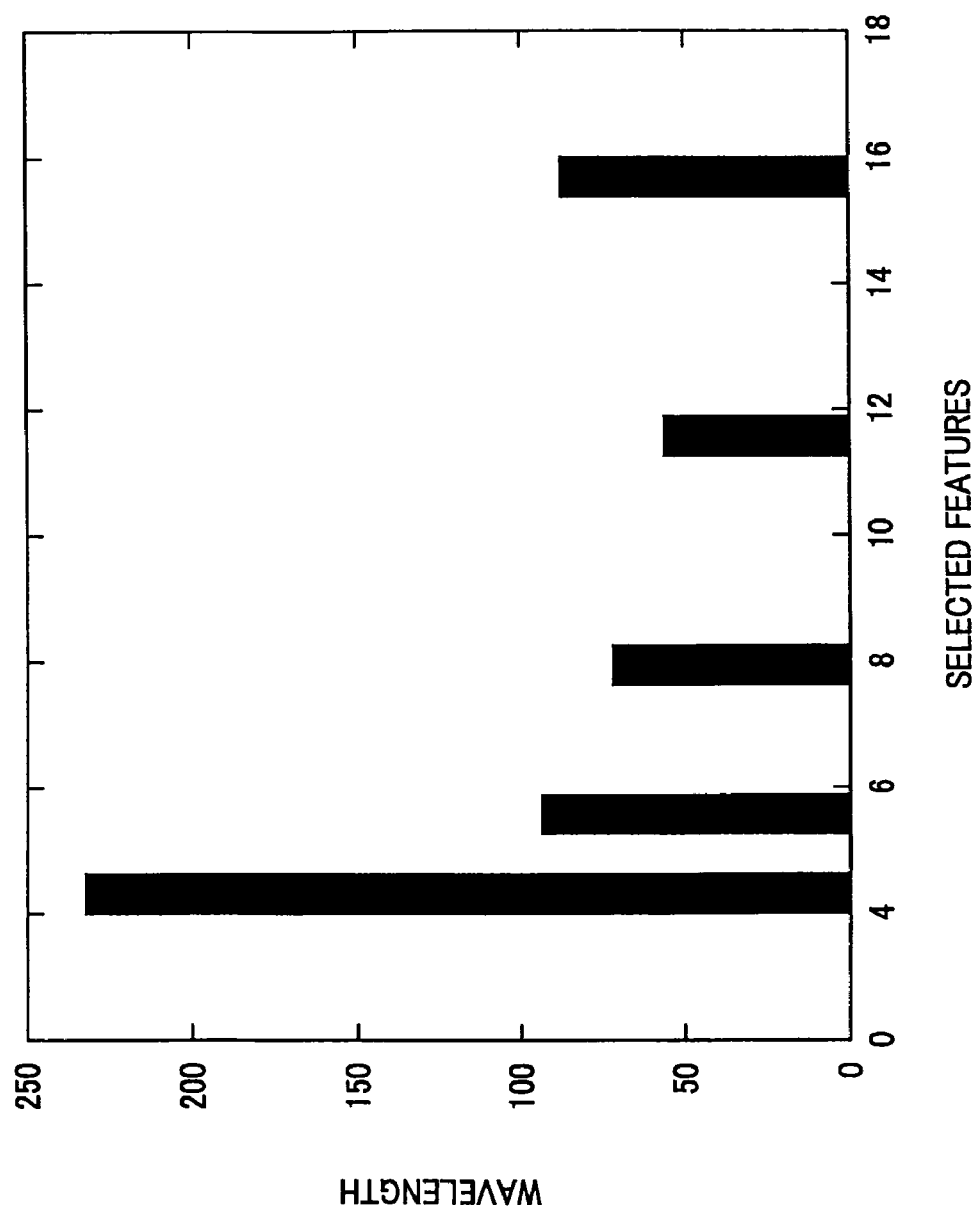
FIG. 29 is a graph showing wavelength distribution of a feature selected by Adaboost with respect to five frequencies that are used.

FIG. 29 is a graph showing wavelength distribution of the featured selected by Adaboost, with respect to the five frequencies used for the Gabor filters. In FIG. 29, the selected Gabor features show no preference for direction, but the wavelengths of the highest frequencies are selected more often.

(10-4) AdaSVMs

Moreover, the inventors of this application used a combination approach (AdaSVMs), in which the Gabor features selected by Adaboost were used as a reduced representation for training SVMs. This AdaSVMs outperformed Adaboost by 3.8 percent points. This was a statistically significant difference ($z=1.99$, $p=0.02$). AdaSVMs outperformed SVMs by an average of 2.7 percent points ($z=1.55$, $p=0.06$).

As shown in FIG. 29, as the inventors of this application examined the frequency distribution of the Gabor filters selected by Adaboost, it became apparent that Gabor filters of higher spatial frequency and images of higher resolution images could potentially improve performance of the emotion classifiers. Doubling the resolution of images to 96×96 pixels and increasing the number of Gabor wavelengths from 5 to 9 so that they spanned 2:32 pixels in 1/2 octave steps, improved performance of the nonlinear AdaSVMs to 93.3%. As the resolution increased, the speed benefit of AdaSVMs became even more apparent. At the highest resolution, the full Gabor representation increased by a factor of 7, whereas the number of Gabor filters selected by Adaboost only increased by a factor of 1.75.

TABLE 2

|        | Leave-group-out | | Leave-subject-out | |
| --- | --- | --- | --- | --- |
|        | Adaboost | SVM | SVM | AdaSVM |
| Linear | 85.0 | 84.8 | 86.2 | 88.8 |
| RBF    |      | 86.9 | 88.0 | 90.7 |

TABLE 3

|        | SVM | | AdaSVM | | |
| --- | --- | --- | --- | --- | --- |
|        | Linear | RBF | Adaboost | Linear | RBF |
| Time t  | t | 90 t | 0.01 t | 0.01 t | 0.0125 t |
| Time t' | t | 90 t | 0.16 t | 0.16 t | 0.2 t |
| Memory  | m | 90 m | 3 m | 3 m | 3.3 m |

In Table 3, time t' includes the extra time to calculate the outputs of the 538 Gabor filters in pixel space for Adaboost and AdaSVMs, rather than the full FFT employed by the SVMs.

(10-5) Real-Time Emotion Mirroring

Figure 30A:
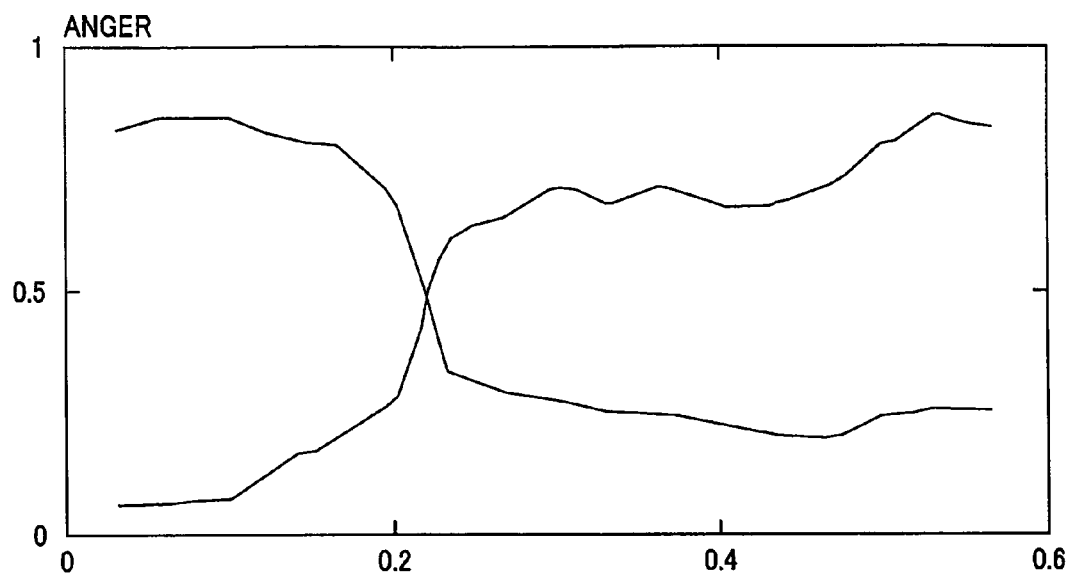
FIGS. 30A and 30B are graphs showing the results of output by an expression identifier that identifies emotions of "anger" and "disgust", respectively, in an example of this invention.
Figure 30B:
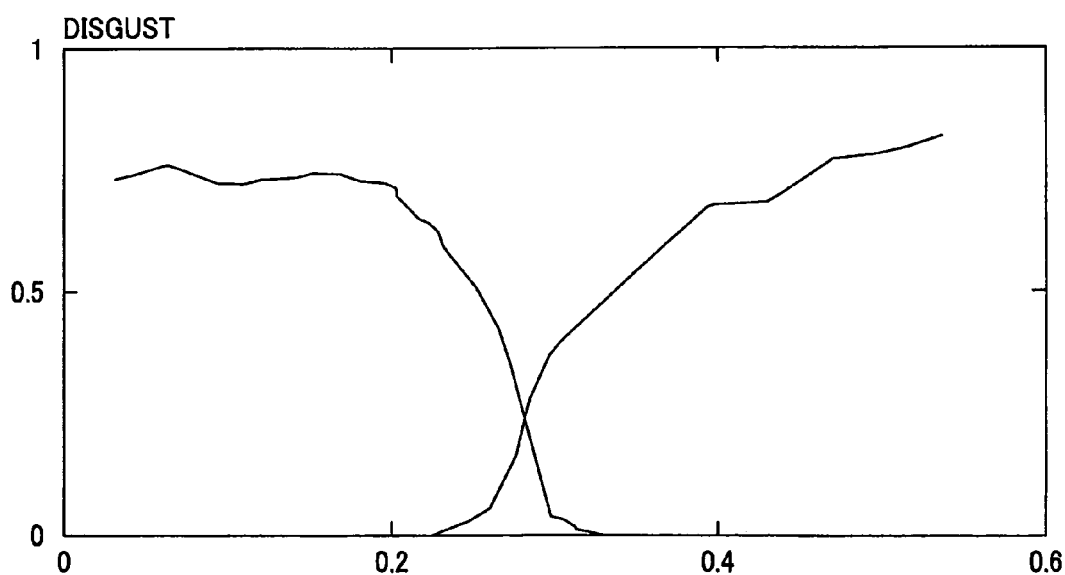

Although each individual image inputted to the emotion classifier is separately processed and classified, the output of the apparatus for a sequence of video frames changes smoothly as a function of time. FIGS. 30A and 30B show two test sequences for one learning sample (sample 32). FIG. 30A shows the output result of the emotion classifier that identifies the emotion of "anger". FIG. 30B shows the output result of the emotion classifier that identifies the emotion of "disgust". As shown in FIGS. 30A and 30B, the neutral output decreases and the output for the relevant emotion increases as a function of time. This provides a potentially valuable representation to code facial expressions in real time.

To demonstrate the potential effect of real-time coding of facial expressions, the inventors of this application developed a real-time "emotion mirror" device. The emotion mirror device is adapted for displaying a 3D character in real time that mimics the emotional expression of a person.

Figure 31:
FIG. 31 is a view showing an exemplary output of an emotion mirror apparatus utilizing the facial expression recognition system in an example of this invention.
Figure 31:
Figure 31:

FIG. 31 shows exemplary outputs of the emotion mirror device utilizing the facial expression recognition system according to the example of this invention. The animated character on the right side mirrors the facial expression of the user.

The emotion mirror device comprises a face detector, an emotion classifier, and an animation generator. The face detector detects a face image of the user and sends it to the emotion classifier. The emotion classifier in this example employed the linear AdaSVM. The outputs of the emotion classifier that classifies emotions into seven categories constitute a 7-D emotion code. This emotion code was sent to the animation generator. The animation generator is a software tool for displaying 3D computer animated character images in real time. The 7-D emotion code gave a weighted combination of morph targets for each emotion.

The inventors of this application also demonstrated, at NIPS 2002, a prototype of the emotion mirror device that recognized the emotion of the user and responded in an engaging way.

With this device, the present system can be incorporated into robotic and computer applications in which it is important to engage the user at an emotional level and have the computer recognize and adapt to the emotions of the user.

The use of the present system is currently considered at homes, schools and in laboratory environments. For example, at schools, the system can be used as an automated tutoring system adapted to the emotional and cognitive state of the student. Moreover, automatic face tracking and expression analysis are getting integrated into automatic animated tutoring systems. Such automated tutoring systems may be more effective if they adapt to the emotional and cognitive state of the student, like real teachers do. Face detection and expression recognition may make robot apparatuses more attractive to users. This system also provides a method for measuring the goodness of interaction between humans and robots. The inventors of this application measured the response of the user during interaction with the robot apparatus, using the automatic expression recognition system of this example. Whether or not the expression recognition function enhances user enjoyment with the robot apparatus can be thus evaluated.

The expression recognition system in this example can perform user-independent and fully automatic coding of expressions. At least for applications in which frontal views are assumed, it enables real-time recognition of facial expressions with the existing computer power. The problem of classification into seven basic expressions can be solved with high accuracy by a simple linear system, using outputs of a bank of Gabor filters filtered from face images by preprocessing. The use of SVMs for this identification enables highly accurate classification. The results of this example are consistent with those reported by Padgett and Cottrell on a smaller data set (C. Padgett and G. Cottrell, Representing face images for emotion classification. In M. Mozer, M. Jordan, and T Petsche, editors, Advances in Neural Information Processing Systems, volume 9, Cambridge, Mass., 1997, MIT Press). For example, a conventional system described in M. Lyons, J. Budynek, A. Plante, and S. Akamatsu, Classifying facial attributes using a 2d gabor wavelet representation and discriminant analysis, In Proceedings of the $4^{th}$ international conference on automatic face and gesture recognition, pages 202-207, 2000, employed discriminant analysis (LDA) to classify facial expressions from Gabor representations.

On the other hand, the inventors of this application tried SVMs for facial expression classification. While LDA is optimal when the class distributions are Gaussian, SVMs may be more effective when the class distributions are not Gaussian.

Good performance results were obtained for directly processing the output of an automatic face detection apparatus without the need for explicit detection and registration of facial features. Emotion identification performance of a non-linear SVM on the output of the automatic face detection apparatus was almost identical to emotion identification performance on the same set of faces using explicit feature alignment with hand-labeled features.

Using Adaboost to perform feature selection greatly speeded up the application. Moreover, SVMs that were trained using features selected by Adaboost showed improved classification performance over Adaboost.

While the invention has been described in accordance with certain preferred embodiments thereof illustrated in the accompanying drawings and described in the above description in detail, it should be understood by those ordinarily skilled in the art that the invention is not limited to those embodiments, but various modifications, alternative constructions or equivalents can be implemented without departing from the scope and spirit of the present invention as set forth and defined by the appended claims.

What is claimed is:

1. A facial expression learning apparatus for learning data to be used by a facial expression recognition apparatus, the facial expression recognition apparatus being adapted for recognizing an expression of a provided face image by using an expression learning data set including plural face images representing specific expressions as recognition targets and plural face images representing expressions different from the specific expressions, the facial expression learning apparatus comprising an expression learning unit for learning data to be used by the facial expression recognition apparatus, the facial expression recognition apparatus identifying the face images representing the specific expressions from provided face images on the basis of a face feature extracted from the expression learning data set by using a Gabor filter.

2. The facial expression learning apparatus as claimed in claim 1, wherein the expression learning unit learns a support vector for identifying a face image representing the specific expression on the basis of the face feature extracted from the expression learning data set by using the Gabor filter.

3. The facial expression learning apparatus as claimed in claim 1, wherein the expression learning unit has:

a weak hypothesis generation unit for repeating processing to generate a weak hypothesis for estimating whether a provided face image is of the specific expression or not on the basis of the result of filtering by one Gabor filter selected from plural Gabor filters;

a reliability calculation unit for calculating reliability of the weak hypothesis generated by the weak hypothesis generation unit on the basis of estimation performance of the weak hypothesis with respect to the expression learning data set; and a data weighting update unit for updating data weighting set for the expression learning data set on the basis of the reliability, and wherein the weak hypothesis generation unit repeats processing to generate the weak hypothesis while selecting one Gabor filter having the highest estimation performance with respect to the expression learning data set every time the data weighting is updated.

4. The facial expression learning apparatus as claimed in claim 1, wherein the expression learning unit has:

a weak hypothesis generation unit for repeating processing to generate a weak hypothesis for estimating whether a provided face image is of the specific expression or not on the basis of the result of filtering by one Gabor filter selected from plural Gabor filters;

a reliability calculation unit for calculating reliability of the weak hypothesis generated by the weak hypothesis generation unit on the basis of estimation performance of the weak hypothesis with respect to the expression learning data set;

a data weighting update unit for updating data weighting set for the expression learning data set on the basis of the reliability; and a support vector learning unit for learning a support vector for identifying a face image representing the specific expression on the basis of the face feature extracted form the expression learning data set by a predetermined Gabor filter, and wherein the weak hypothesis generation unit repeats processing to generate the weak hypothesis while selecting one Gabor filter having the highest estimation performance with respect to the expression learning data set every time the data weighting is updated, and the support vector learning unit extracts the face feature by using the Gabor filter selected by the weak hypothesis generated by the weak hypothesis generation unit, and thus learns the support vector.

5. A facial expression learning method for learning data to be used by a facial expression recognition apparatus, the facial expression recognition apparatus being adapted for recognizing an expression of a provided face image by using an expression learning data set including plural face images representing specific expressions as recognition targets and plural face images representing expressions different from the specific expressions, the facial expression learning method, performed by a processor, comprising an expression learning step of learning data to be used by the facial expression recognition apparatus, the facial expression recognition apparatus identifying the face images representing the specific expressions from provided face images on the basis of a face feature extracted from the expression learning data set by using a Gabor filter.

6. The facial expression learning method, performed by a processor, as claimed in claim 5, wherein the expression learning step includes learning a support vector for identifying a face image representing the specific expression on the basis of the face feature extracted from the expression learning data set by using the Gabor filter.

7. The facial expression learning method, performed by a processor, as claimed in claim 5, wherein the expression learning step includes:

a weak hypothesis generation step of repeating processing to generate a weak hypothesis for estimating whether a provided face image is of the specific expression or not on the basis of the result of filtering by one Gabor filter selected from plural Gabor filters;

a reliability calculation step of calculating reliability of the weak hypothesis generated at the weak hypothesis generation step on the basis of estimation performance of the weak hypothesis with respect to the expression learning data set; and a data weighting update step of updating data weighting set for the expression learning data set on the basis of the reliability, and wherein the weak hypothesis generation step includes generating the weak hypothesis while selecting one Gabor filter having the highest estimation performance with respect to the expression learning data set every time the data weighting is updated.

8. The facial expression learning method, performed by a processor, as claimed in claim 5 wherein the expression learning step includes:

a weak hypothesis generation step of repeating processing to generate a weak hypothesis for estimating whether a provided face image is of the specific expression or not on the basis of the result of filtering by one Gabor filter selected from plural Gabor filters;

a reliability calculation step of calculating reliability of the weak hypothesis generated at the weak hypothesis generation step on the basis of estimation performance of the weak hypothesis with respect to the expression learning data set;

a data weighting update step of updating data weighting set for the expression learning data set on the basis of the reliability; and a support vector learning step of learning a support vector for identifying a face image representing the specific expression on the basis of the face feature extracted form the expression learning data set by a predetermined Gabor filter, and wherein the weak hypothesis generation step includes generating the weak hypothesis while selecting one Gabor filter having the highest estimation performance with respect to the expression learning data set every time the data weighting is updated, and the support vector learning step includes extracting the face feature by using the Gabor filter selected by the weak hypothesis generated by the weak hypothesis generation unit, and thus learning the support vector.

* * * * *

UNITED STATES PATENT AND TRADEMARK OFFICE
CERTIFICATE OF CORRECTION

PATENT NO. : 7,587,069 B2 Page 1 of 1
APPLICATION NO. : 12/075080
DATED : September 8, 2009
INVENTOR(S) : Javier R. Movellan et al.

It is certified that error appears in the above-identified patent and that said Letters Patent is hereby corrected as shown below:

On The Title page Add

Item

--(30)   Foreign Application Priority Data

December 15, 2003   JP   2003-417191.--

Signed and Sealed this

Twentieth Day of October, 2009

David J. Kappos
*Director of the United States Patent and Trademark Office*